US012657249B2

(12) United States Patent
Ashok et al.

(10) Patent No.: US 12,657,249 B2
(45) Date of Patent: Jun. 16, 2026

(54) AI-DRIVEN QUERY GENERATION SYSTEM

(71) Applicant: Expedia, Inc., Seattle, WA (US)

(72) Inventors: Abi Ashok, Seattle, WA (US); Goli Cobbe, Seattle, WA (US); Jeff Miller, Seattle, WA (US); Rathi Murthy, Seattle, WA (US); Jonathan Scott Noblit, Seattle, WA (US); Bradley Wethington, Seattle, WA (US)

(73) Assignee: Expedia, Inc., Seattle, WA (US)

( * ) Notice: Subject to any disclaimer, the term of this patent is extended or adjusted under 35 U.S.C. 154(b) by 0 days.

(21) Appl. No.: 19/193,590

(22) Filed: Apr. 29, 2025

(65) Prior Publication Data

US 2025/0335523 A1     Oct. 30, 2025

Related U.S. Application Data

(60) Provisional application No. 63/640,752, filed on Apr. 30, 2024.

(51) Int. Cl.
G06F 16/00        (2019.01)
G06F 16/9535      (2019.01)
(Continued)

(52) U.S. Cl.
CPC ......... G06F 16/9535 (2019.01); G06Q 10/02 (2013.01); G06Q 30/0617 (2013.01);
(Continued)

(58) Field of Classification Search
CPC .................................................. G06F 16/9535
(Continued)

(56) References Cited

U.S. PATENT DOCUMENTS 7,925,540 B1     4/2011  Orttung et al.
8,090,707 B1     1/2012  Orttung et al.
(Continued)

FOREIGN PATENT DOCUMENTS

CN         116992985        11/2023

OTHER PUBLICATIONS

International Search Report and Written Opinion dated Aug. 18, 2025 for PCT/US2025/026882.
(Continued)

*Primary Examiner* — Alexandria Y Bromell
(74) *Attorney, Agent, or Firm* — Foley & Lardner LLP

(57)                ABSTRACT

One embodiment relates to a method for searching for travel items. The method includes obtaining interaction data indicating a set of interactions of a first user across a plurality of platforms. The method includes generating a dynamic user profile indicating a plurality of travel preferences for the first user. The method includes generating search suggestions for the first user based on the dynamic user profile, the search suggestions specific to the first user and generated based at least in part on characteristics of the dynamic user profile. The search suggestions include at least one of suggested search queries or suggested filters. The method includes receiving a selection from the first user of a first search suggestion. The method includes identifying a first plurality of travel items using the selected first search suggestion. The method includes providing, to the first user, the first plurality of travel items.

18 Claims, 40 Drawing Sheets

(51) Int. Cl.
| | |
|---|---|
| *G06Q 10/02* | (2012.01) |
| *G06Q 30/0601* | (2023.01) |
| *G06Q 50/14* | (2012.01) |
| *H04L 67/306* | (2022.01) |

(52) U.S. Cl.
CPC ......... *G06Q 30/0629* (2013.01); *G06Q 50/14* (2013.01); *H04L 67/306* (2013.01); *G06Q 30/0641* (2013.01)

(58) Field of Classification Search
USPC ....................................................... 707/706
See application file for complete search history.

(56) References Cited

U.S. PATENT DOCUMENTS

| | | | |
|---|---|---|---|
| 8,725,612 B2 | 5/2014 | Mundinger et al. | |
| 8,744,769 B1 | 6/2014 | Bell et al. | |
| 8,756,109 B1 * | 6/2014 | Frank ................... | G06Q 10/025 705/26.1 |
| 9,009,167 B2 | 4/2015 | Cerny | |
| 9,170,863 B2 * | 10/2015 | Varoglu ................. | G06F 16/29 707/707 |
| 9,261,374 B2 | 2/2016 | Mundinger et al. | |
| 9,389,086 B2 | 7/2016 | Hashem et al. | |
| 9,396,492 B2 | 7/2016 | Schiff et al. | |
| 9,820,094 B2 | 11/2017 | Zhang et al. | |
| 9,910,909 B2 | 3/2018 | Hegde et al. | |
| 9,939,281 B2 | 4/2018 | Duale et al. | |
| 9,939,282 B2 | 4/2018 | Liebinger et al. | |
| 10,089,639 B2 | 10/2018 | Kannan et al. | |
| 10,260,891 B2 | 4/2019 | Tuukkanen | |
| 10,317,230 B2 | 6/2019 | Rangan et al. | |
| 10,408,631 B2 | 9/2019 | Delaney et al. | |
| 10,430,829 B2 | 10/2019 | Gould et al. | |
| 10,445,666 B1 * | 10/2019 | Lopez ................. | G06Q 10/025 707/707 |
| 10,511,933 B2 | 12/2019 | Zhang et al. | |
| 10,643,292 B1 | 5/2020 | Gorman-Ladd et al. | |
| 10,673,786 B2 | 6/2020 | Naydonov | |
| 10,726,427 B2 | 7/2020 | Kannan et al. | |
| 10,839,467 B2 | 11/2020 | Ghaddar et al. | |
| 10,902,534 B2 | 1/2021 | Ray et al. | |
| 11,062,314 B1 | 7/2021 | Ramanathan et al. | |
| 11,085,784 B2 | 8/2021 | Delaney et al. | |
| 11,188,990 B2 | 11/2021 | Jafri | |
| 11,262,203 B2 * | 3/2022 | Valverde, Jr. .......... | G06Q 10/02 707/707 |
| 11,276,077 B2 | 3/2022 | Gould et al. | |
| 11,423,462 B2 | 8/2022 | Schiff et al. | |
| 11,521,135 B2 | 12/2022 | Hou et al. | |
| 11,551,158 B1 | 1/2023 | Hinkins | |
| 11,620,656 B2 | 4/2023 | Hayes et al. | |
| 11,625,650 B2 | 4/2023 | Gonzalez et al. | |
| 11,710,418 B2 | 7/2023 | Reis et al. | |
| 11,734,780 B2 | 8/2023 | Reis et al. | |
| 11,755,963 B1 | 9/2023 | Avital | |
| 11,775,884 B2 | 10/2023 | Hou et al. | |
| 11,790,371 B1 | 10/2023 | Ramanathan et al. | |
| 11,893,605 B2 | 2/2024 | Gould et al. | |
| 11,900,489 B2 | 2/2024 | Jafri | |
| 2010/0017238 A1 * | 1/2010 | Johnson ............... | G06Q 10/025 705/26.1 |
| 2012/0330698 A2 * | 12/2012 | Gilliam .................. | G06Q 10/02 705/6 |
| 2014/0236647 A1 * | 8/2014 | Wettan ................... | G06Q 50/14 705/6 |
| 2015/0276419 A1 | 10/2015 | Hashem et al. | |
| 2017/0098242 A1 | 4/2017 | Gould et al. | |
| 2017/0103442 A1 | 4/2017 | Wright | |
| 2017/0191839 A1 * | 7/2017 | Mysen ............... | G01C 21/3484 707/707 |
| 2017/0200127 A1 * | 7/2017 | Dhondse ........... | G06Q 10/1093 707/707 |
| 2018/0107951 A1 | 4/2018 | Mowatt | |
| 2019/0139165 A1 | 5/2019 | Valecha et al. | |
| 2022/0292575 A1 | 9/2022 | Schiff et al. | |
| 2022/0335513 A1 | 10/2022 | Thompson et al. | |
| 2023/0385717 A1 * | 11/2023 | Eade ...................... | G06Q 10/02 707/707 |
| 2024/0112287 A1 | 4/2024 | Jafri | |
| 2024/0127286 A1 | 4/2024 | Gould et al. | |
| 2025/0208971 A1 * | 6/2025 | Bryant .................. | G06Q 50/14 707/707 |

OTHER PUBLICATIONS

International Search Report and Written Opinion dated Aug. 18, 2025 for PCT/US2025/026897.

International Search Report and Written Opinion dated Jul. 30, 2025 for PCT/US2025/026889.

Kesorn et al, "Personalized Attraction Recommendation System for Tourists Through Check-In_Data", IEEE Access, vol. 5, Nov. 20, 2017 (Nov. 28, 2017) pp. 26703-26721.

Thiengburanathum et al, "Overview of Personalized Travel Recommendation Systems", 2016 22nd International Conference on Automation and Computing (ICAC), Chinese Automation and Computing Society, Sep. 7, 2016 (Sep. 7, 2016), pp. 415-422.

* cited by examiner

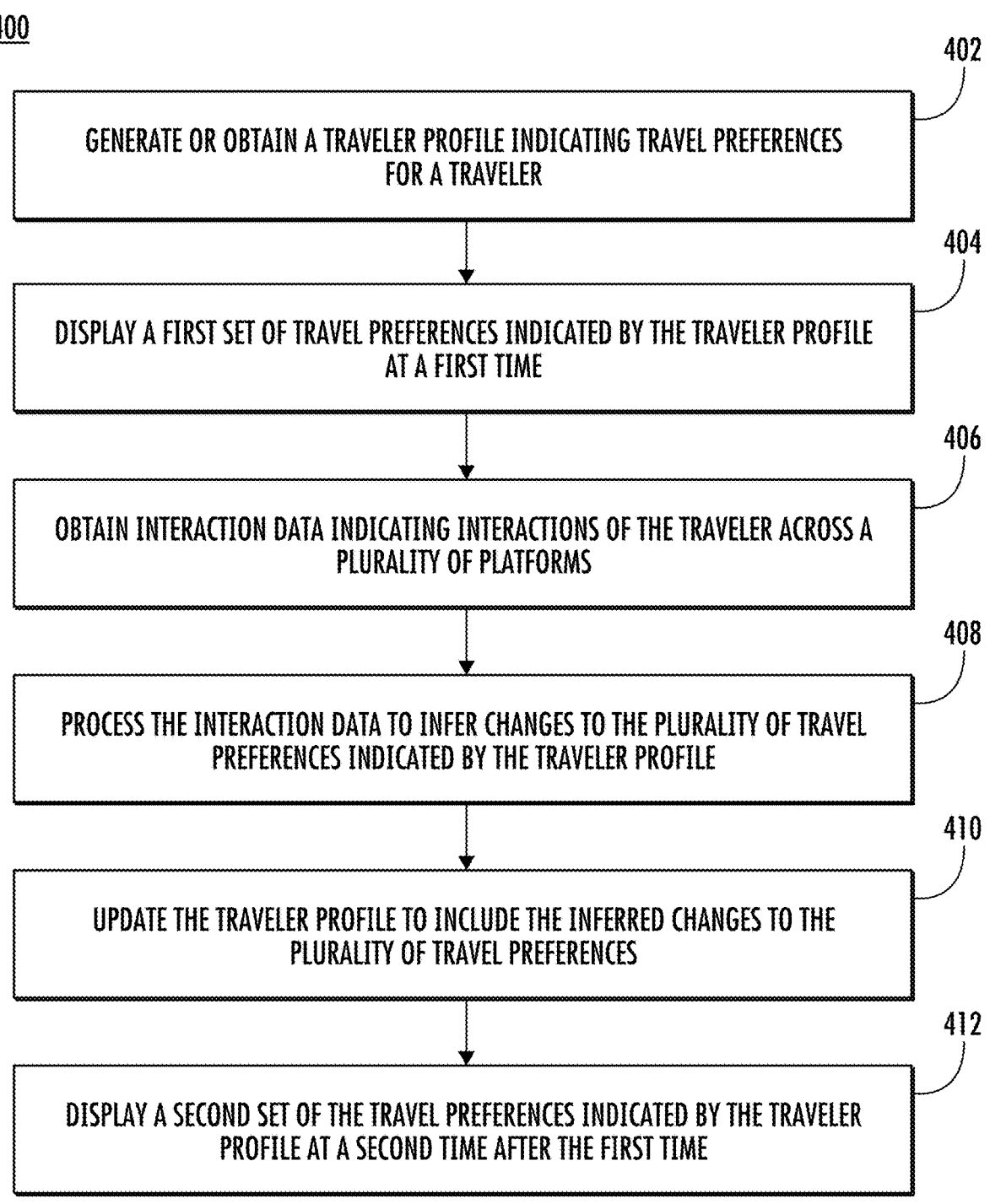

400

402

GENERATE OR OBTAIN A TRAVELER PROFILE INDICATING TRAVEL PREFERENCES FOR A TRAVELER

404

DISPLAY A FIRST SET OF TRAVEL PREFERENCES INDICATED BY THE TRAVELER PROFILE AT A FIRST TIME

406

OBTAIN INTERACTION DATA INDICATING INTERACTIONS OF THE TRAVELER ACROSS A PLURALITY OF PLATFORMS

408

PROCESS THE INTERACTION DATA TO INFER CHANGES TO THE PLURALITY OF TRAVEL PREFERENCES INDICATED BY THE TRAVELER PROFILE

410

UPDATE THE TRAVELER PROFILE TO INCLUDE THE INFERRED CHANGES TO THE PLURALITY OF TRAVEL PREFERENCES

412

DISPLAY A SECOND SET OF THE TRAVEL PREFERENCES INDICATED BY THE TRAVELER PROFILE AT A SECOND TIME AFTER THE FIRST TIME

STAYS IN CHICAGO, IL
MAY 13 - MAY 18    1 ADULT, 1 CHILD

✦ SEARCH AI    ✦ ROOFTOP AND A VIEW...    ✕    ☆ 4+ STA

CHICAGO

1210

12 PROPERTIES
HOW OUR SORT ORDER WORKS ⓘ

HOTEL C
CHICAGO

1214

TOP RATED ROOFTOP    1216

NEAR CYCLING STUDIOS

RESERVE NOW, PAY LATER 8.6    EXCELLENT
1,497 REVIEWS $211  $190
TOTAL $1,231
INCLUDES TAXES AND FEES

HOTEL A
CHICAGO

1300

1301

1325

1326

1318

WHICH HOTEL HAS 2 QUEEN BEDS AVAILABLE?

NO PROBLEM, EACH PROPERTY HAS ROOMS WITH 2 QUEEN BEDS AVAILABLE DURING YOUR TRIP. HOTEL B IS KNOWN FOR HAVING THE COMFIEST BEDS.

HOTEL B
☆☆☆☆

DOUBLE QUEENS
🛏 2 QUEEN BEDS
👥 SLEEPS 4

$190
$1,312 TOTAL
INCLUDES TAXES & FEES

SEE FULL DETAILS

ASK A FOLLOW UP

E.G. WHICH HOTEL ALLOWS PETS?

1500

1700

1702

1704

1708

1710

1706

1900

1902

2012

2014

2100

2102

2104

2106

2108

2200

2202

2205

2400

2500 ⟶

AI-DRIVEN QUERY GENERATION SYSTEM

CROSS-REFERENCE TO RELATED APPLICATIONS

This application claims the benefit of and priority to U.S. Provisional Patent Application No. 63/640,752, filed Apr. 30, 2024, which is incorporated herein by reference in its entirety and for all purposes.

TECHNICAL FIELD

The present disclosure relates generally to travel planning. Example embodiments of the present disclosure relate more specifically to developing and maintaining a dynamic traveler profile and using the dynamic traveler profile to provide enhanced travel planning features.

BACKGROUND

Travel planning can be an arduous task in view of the wide variety of potential options for destinations, travel modalities, accommodations, activities, etc. Travel planning can be even more arduous in view of the fact that the user may not necessarily have an express understanding of how their own preferences and inclinations may be evolving. Accordingly, it would be beneficial to provide a system that develops an enhanced and dynamic profile of traveler preferences and provides features in response.

SUMMARY

One embodiment relates to a method for dynamic user preference assessment. The method includes receiving, by one or more processing circuits, a dynamic user profile indicating a plurality of travel preferences for a user. The method includes providing, by the one or more processing circuits to the user, a first indication of a first set of one or more of the plurality of travel preferences indicated by the dynamic user profile at a first time. The method includes obtaining, by the one or more processing circuits, interaction data indicating interactions of the user across a plurality of platforms. The method includes processing, by the one or more processing circuits, the interaction data to infer changes to the plurality of travel preferences indicated by the dynamic user profile. The method includes updating, by the one or more processing circuits, the dynamic user profile to include the changes to the plurality of travel preferences.

In some embodiments, the method includes providing, by the one or more processing circuits to the user, a second indication of a second set of one or more of the plurality of travel preferences indicated by the dynamic user profile at a second time after the first time, the second set of one or more of the plurality of travel preferences indicating at least one travel preference of the plurality of travel preferences changed using the interaction data.

In some embodiments, the method includes receiving, by the one or more processing circuits, feedback from the user regarding the second set of one or more of the plurality of travel preferences. In some embodiments, the method includes updating, by the one or more processing circuits, the dynamic user profile based on the feedback from the user.

In some embodiments, the interactions of the user across the plurality of platforms include active interactions and passive interactions.

In some embodiments, the active interactions include the user directly providing feedback regarding one or more of the plurality of travel preferences, and the passive interactions include interactions with the user through which the user does not expressly provide feedback regarding the plurality of travel preferences but from which one or more of the plurality of travel preferences can be inferred.

In some embodiments, the plurality of platforms includes at least one of a messaging platform, a third-party application platform, a social media platform, a web browsing platform, or a search engine platform.

In some embodiments, obtaining and processing the interaction data to infer the changes to the plurality of travel preferences is performed at least one of on a predetermined periodic basis or based on an occurrence of one or more predetermined events, where the interactions of the user include at least one of searching through a search engine, messaging on a chatting platform, or browsing through a web browser or a third-party application.

In some embodiments, the method includes determining, by the one or more processing circuits, that a portion of the interaction data is related to an upcoming trip for the user. In some embodiments, the method includes processing, by the one or more processing circuits, the portion of the interaction data to determine one or more travel preferences related to the upcoming trip. In some embodiments, the method includes using, by the one or more processing circuits, the one or more travel preferences related to the upcoming trip to plan the upcoming trip.

In some embodiments, determining that the portion of the interaction data is related to the upcoming trip for the user includes receiving, by the one or more processing circuits, context associated with the interaction data and assigning a score to the interaction data based on the context associated with the interaction data.

In some embodiments, the method includes providing, by the one or more processing circuits, search suggestions for using a search engine based on the dynamic user profile. In some embodiments, the method includes generating, by the one or more processing circuits, recommended services based on a selected search suggestion to the user.

In some embodiments, the method includes generating, by the one or more processing circuits, one or more customized filters for the search suggestions based on the dynamic user profile. In some embodiments, the method includes generating, by the one or more processing circuits, customized intent categories for displaying one or more search results from the search suggestions based on the dynamic user profile.

In some embodiments, the method includes generating, by the one or more processing circuits, one or more travel recommendations using an artificial intelligence model based on a combination of one or more reviews from a website and the dynamic user profile, where the one or more travel recommendations include at least one of an accommodation recommendation, a restaurant recommendation, an activity recommendation, or an event recommendation.

In some embodiments, the method includes generating, by the one or more processing circuits, one or more travel recommendations using an artificial intelligence model based on correlating the plurality of travel preferences in the dynamic user profile to characteristics of images associated with the one or more travel recommendations, where the one or more travel recommendations include at least one of an accommodation recommendation, a restaurant recommendation, an activity recommendation, or an event recommendation.

In some embodiments, the method includes importing, by the one or more processing circuits, travel information for the user from one or more third-party platforms. In some embodiments, the method includes generating, by the one or more processing circuits, a trip itinerary based on the travel information using an artificial intelligence model based on the dynamic user profile.

In some embodiments, the method includes updating, by the one or more processing circuits, the trip itinerary with one or more alternative trip options based on anticipated weather or anticipated events.

Another embodiment relates to a computing system including at least one processing circuit having at least one processor and at least one memory. The at least one memory stores instructions therein that, when executed by the at least one processor, cause the at least one processor to receive a dynamic user profile indicating a plurality of travel preferences for a user. The instructions, when executed by the at least one processor, cause the at least one processor to provide, to the user, a first indication of a first set of one or more of the plurality of travel preferences indicated by the dynamic user profile at a first time. The instructions, when executed by the at least one processor, cause the at least one processor to obtain interaction data indicating interactions of the user across a plurality of platforms. The instructions, when executed by the at least one processor, cause the at least one processor to process the interaction data to infer changes to the plurality of travel preferences indicated by the dynamic user profile. The instructions, when executed by the at least one processor, cause the at least one processor to update the dynamic user profile to include the changes to the plurality of travel preferences. The instructions, when executed by the at least one processor, cause the at least one processor to provide, to the user, a second indication of a second set of one or more of the plurality of travel preferences indicated by the dynamic user profile at a second time after the first time, the second set of one or more of the plurality of travel preferences indicating at least one travel preference of the plurality of travel preferences changed using the interaction data. The instructions, when executed by the at least one processor, cause the at least one processor to receive feedback from the user regarding the second set of one or more of the plurality of travel preferences. The instructions, when executed by the at least one processor, cause the at least one processor to update the dynamic user profile based on the feedback from the user.

In some embodiments, the interactions of the user across the plurality of platforms include active interactions, where the active interactions include the user directly providing feedback regarding one or more of the plurality of travel preferences. In some embodiments, the interactions of the user across the plurality of platforms include passive interactions, where the passive interactions include interactions with the user through which the user does not expressly provide feedback regarding the plurality of travel preferences but from which one or more of the plurality of travel preferences can be inferred.

In some embodiments, the instructions, when executed by the at least one processor, further cause the at least one processor to determine that a portion of the interaction data is related to an upcoming trip of the user. In some embodiments, the instructions, when executed by the at least one processor, further cause the at least one processor to process the portion of the interaction data to determine one or more travel preferences related to the upcoming trip. In some embodiments, the instructions, when executed by the at least one processor, further cause the at least one processor to use the one or more travel preferences related to the upcoming trip to plan the upcoming trip.

Another embodiment relates to a non-transitory computer-readable medium having computer-executable instructions embodied therein. The instructions, when executed by at least one processor of a computing system, cause the computing system to perform operations including receiving a dynamic user profile indicating a plurality of travel preferences for a user. The operations include providing, to the user, a first indication of a first set of one or more of the plurality of travel preferences indicated by the dynamic user profile at a first time. The operations include obtaining interaction data indicating interactions of the user across a plurality of platforms. The interactions of the user across the plurality of platforms include active interactions, where the active interactions include the user directly providing feedback regarding one or more of the plurality of travel preferences. The interactions of the user across the plurality of platforms include passive interactions, where the passive interactions include interactions with the user through which the user does not expressly provide feedback regarding the plurality of travel preferences but from which one or more of the plurality of travel preferences can be inferred. The operations include processing the interaction data to infer changes to the plurality of travel preferences indicated by the dynamic user profile. The operations include updating the dynamic user profile to include the changes to the plurality of travel preferences.

In some embodiments, the operations include providing, to the user, a second indication of a second set of one or more of the plurality of travel preferences indicated by the dynamic user profile at a second time after the first time, the second set of one or more of the plurality of travel preferences indicating at least one travel preference of the plurality of travel preferences changed using the interaction data. In some embodiments, the operations include receiving feedback from the user regarding the second set of one or more of the plurality of travel preferences. In some embodiments, the operations include updating the dynamic user profile based on the feedback from the user.

One embodiment relates to a method for searching for travel items. The method includes obtaining, by one or more processing circuits, interaction data indicating a set of interactions of a first user across a plurality of platforms. The method includes generating, by the one or more processing circuits, a dynamic user profile indicating a plurality of travel preferences for the first user using the interaction data. The method includes generating, by the one or more processing circuits, a plurality of search suggestions for the first user based on the dynamic user profile, the plurality of search suggestions specific to the first user and generated based at least in part on one or more characteristics of the dynamic user profile. The plurality of search suggestions include at least one of a plurality of suggested search queries or a plurality of suggested filters. The method includes receiving, by the one or more processing circuits, a selection from the first user of a first search suggestion of the plurality of search suggestions. The method includes identifying, by the one or more processing circuits, a first plurality of travel items using the selected first search suggestion. The method includes providing, by the one or more processing circuits to the first user, the identified first plurality of travel items.

In some embodiments, the interaction data is first interaction data indicating a first set of interactions of the first user. In some embodiments, the method includes obtaining, by the one or more processing circuits, second interaction data indicating a second set of interactions of the first user across the plurality of platforms. In some embodiments, the method includes processing, by the one or more processing circuits, the second interaction data to infer changes to the plurality of travel preferences indicated by the dynamic user profile. In some embodiments, the method includes updating, by the one or more processing circuits, the dynamic user profile to include the changes to the plurality of travel preferences.

In some embodiments, the plurality of search suggestions are a first plurality of search suggestions provided to the first user at a first time. In some embodiments, the method includes generating and providing, by the one or more processing circuits, a second plurality of search suggestions to the first user at a second time, where the second time is later than the first time, and where the second plurality of search suggestions are based on the updated dynamic user profile including the changes.

In some embodiments, the second plurality of search suggestions differ from the first plurality of search suggestions based on at least one of a content of the second plurality of search suggestions or an order in which the second plurality of search suggestions are provided to the first user.

In some embodiments, the method includes receiving, by the one or more processing circuits, a selection from the first user of a second search suggestion of the second plurality of search suggestions. In some embodiments, the method includes identifying, by the one or more processing circuits, a second plurality of travel items using the selected second search suggestion. In some embodiments, the method includes providing, by the one or more processing circuits to the first user, the identified second plurality of travel items.

In some embodiments, the plurality of search suggestions are generated using an artificial intelligence (AI) model.

In some embodiments, the AI model is a generative AI model. In some embodiments, generating the plurality of search suggestions using the generative AI model includes extracting, by the one or more processing circuits, the one or more characteristics from the dynamic user profile. In some embodiments, generating the plurality of search suggestions using the generative AI model includes generating, by the one or more processing circuits, a prompt for the generative AI model including the one or more characteristics.

In some embodiments, the plurality of search suggestions include the plurality of suggested search queries, and the plurality of suggested search queries are automatically provided to the first user in response to the first user selecting a search interface.

In some embodiments, the plurality of search suggestions include the plurality of suggested filters, and the plurality of suggested filters are provided to the first user via an interface on which a first set of travel items are displayed, and selection of at least one of the plurality of suggested filters causes the one or more processing circuits to filter the displayed first set of travel items based on the selection of the at least one of the plurality of suggested filters.

In some embodiments, the dynamic user profile is a first dynamic user profile, and the plurality of search suggestions are a first plurality of search suggestions. In some embodiments, the method includes receiving, by the one or more processing circuits, a second dynamic user profile indicating a plurality of travel preferences for a second user. In some embodiments, the method includes generating, by the one or more processing circuits, a second plurality of search suggestions for the second user based on the second dynamic user profile, where the second plurality of search suggestions differ from the first plurality of search suggestions based on the second dynamic user profile being different than the first dynamic user profile.

In some embodiments, the second plurality of search suggestions differ from the first plurality of search suggestions based on at least one of a content of the second plurality of search suggestions or an order in which the second plurality of search suggestions are provided to the second user.

In some embodiments, the first plurality of travel items include at least one of an accommodation recommendation, a restaurant recommendation, an activity recommendation, or an event recommendation.

In some embodiments, the method includes receiving, by the one or more processing circuits, feedback from the first user regarding one or more of the plurality of travel preferences. In some embodiments, the method includes updating, by the one or more processing circuits, the dynamic user profile based on the feedback from the first user.

In some embodiments, the set of interactions of the first user across the plurality of platforms include active interactions and passive interactions, where the active interactions include the first user directly providing feedback regarding one or more of the plurality of travel preferences, and where the passive interactions include interactions with the first user through which the first user does not expressly provide feedback regarding the plurality of travel preferences but from which one or more of the plurality of travel preferences can be inferred.

In some embodiments, the method includes determining, by the one or more processing circuits, that a portion of the interaction data is related to an upcoming trip for the first user. In some embodiments, the method includes processing, by the one or more processing circuits, the portion of the interaction data to determine one or more travel preferences related to the upcoming trip. In some embodiments, the method includes generating, by the one or more processing circuits, the plurality of search suggestions for the first user based on the dynamic user profile and relating to the upcoming trip.

Another embodiment relates to a computing system including at least one processing circuit having at least one processor and at least one memory. The at least one memory stores instructions therein that, when executed by the at least one processor, cause the at least one processor to obtain first interaction data indicating a set of first interactions of a first user across a plurality of platforms at a first time. The instructions, when executed by the at least one processor, cause the at least one processor to generate a dynamic user profile indicating a plurality of travel preferences for the first user using the first interaction data. The instructions, when executed by the at least one processor, cause the at least one processor to generate a first plurality of search suggestions for the first user based on the dynamic user profile, the first plurality of search suggestions specific to the first user and generated based at least in part on one or more characteristics of the dynamic user profile. The first plurality of search suggestions include at least one of a plurality of suggested search queries or a plurality of suggested filters. The instructions, when executed by the at least one processor, cause the at least one processor to receive a selection from the first user of a first search suggestion of the first plurality of search suggestions. The instructions, when executed by the at least one processor, cause the at least one processor to identify a first plurality of travel items using the selected first search suggestion. The instructions, when executed by the at least one processor, cause the at least one processor to provide, to the first user, the identified first plurality of travel items.

In some embodiments, the instructions, when executed by the at least one processor, further cause the at least one processor to obtain second interaction data indicating a set of second interactions of the first user across the plurality of platforms at a second time. In some embodiments, the instructions, when executed by the at least one processor, further cause the at least one processor to update the dynamic user profile to include changes to the plurality of travel preferences indicated by the second interaction data. In some embodiments, the instructions, when executed by the at least one processor, further cause the at least one processor to generate a second plurality of search suggestions for the first user based on the updated dynamic user profile. In some embodiments, the second plurality of search suggestions differ from the first plurality of search suggestions based on at least one of a content of the second plurality of search suggestions or an order in which the second plurality of search suggestions are provided to the first user.

In some embodiments, the dynamic user profile is a first dynamic user profile. In some embodiments, the instructions, when executed by the at least one processor, further cause the at least one processor to receive a second dynamic user profile indicating a plurality of travel preferences for a second user. In some embodiments, the instructions, when executed by the at least one processor, further cause the at least one processor to generate a second plurality of search suggestions for the second user based on the second dynamic user profile. In some embodiments, the second plurality of search suggestions differ from the first plurality of search suggestions based on the second dynamic user profile being different than the first dynamic user profile.

Another embodiment relates to a non-transitory computer-readable medium having computer-executable instructions embodied therein. The instructions, when executed by at least one processor of a computing system, cause the computing system to perform operations including obtaining interaction data indicating a set of interactions of a first user across a plurality of platforms. The operations include generating a dynamic user profile indicating a plurality of travel preferences for the first user using the interaction data. The operations include generating a plurality of search suggestions for the first user based on the dynamic user profile, the plurality of search suggestions specific to the first user and generated based at least in part on one or more characteristics of the dynamic user profile. The plurality of search suggestions include at least one of a plurality of suggested search queries or a plurality of suggested filters. The operations include receiving a selection from the first user of a first search suggestion of the plurality of search suggestions. The operations include identifying a first plurality of travel items using the selected first search suggestion. The operations include providing, to the first user, the identified first plurality of travel items.

In some embodiments, the interaction data is first interaction data indicating a first set of interactions of the first user, and the plurality of search suggestions are a first plurality of search suggestions provided to the first user at a first time. In some embodiments, the operations include obtaining second interaction data indicating a second set of interactions of the first user across the plurality of platforms. In some embodiments, the operations include processing the second interaction data to infer changes to the plurality of travel preferences indicated by the dynamic user profile. In some embodiments, the operations include updating the dynamic user profile to include the changes to the plurality of travel preferences. In some embodiments, the operations include providing a second plurality of search suggestions to the first user at a second time, where the second time is later than the first time, and where the second plurality of search suggestions are based on the updated dynamic user profile including the changes.

One embodiment relates to a method for travel comparison. The method includes obtaining, by one or more processing circuits, interaction data indicating a set of interactions of a first user across a plurality of platforms. The method includes generating, by the one or more processing circuits, a dynamic user profile indicating a plurality of travel preferences for the first user using the interaction data. The method includes providing, by the one or more processing circuits and to the first user, a first set of travel search results based on the dynamic user profile. The method includes generating, by the one or more processing circuits, a comparison among two or more travel items included in the first set of travel search results, where the comparison relates to one or more features of the two or more travel items, and where generating the comparison includes selecting the one or more features based at least in part on one or more characteristics of the dynamic user profile.

In some embodiments, the interaction data is first interaction data indicating a first set of interactions of the first user. In some embodiments, the method includes obtaining, by the one or more processing circuits, second interaction data indicating a second set of interactions of the first user across the plurality of platforms. In some embodiments, the method includes processing, by the one or more processing circuits, the second interaction data to infer changes to the plurality of travel preferences indicated by the dynamic user profile. In some embodiments, the method includes updating, by the one or more processing circuits, the dynamic user profile to include the changes to the plurality of travel preferences.

In some embodiments, the comparison is a first comparison provided to the first user at a first time, the one or more features are one or more first features, and the two or more travel items are a first set of two or more travel items. In some embodiments, the method includes generating, by the one or more processing circuits and to the first user at a second time, a second comparison among a second set of two or more travel items, where the second time is later than the first time, and where the second comparison relates to one or more second features of the second set of two or more travel items, where at least one of the one or more second features differs from at least one of the one or more first features based at least in part on the updated dynamic user profile.

In some embodiments, the first set of travel search results is provided to the first user at a first time, the comparison is a first comparison, the one or more features are one or more first features, and the two or more travel items are a first set of two or more travel items. In some embodiments, the method includes providing, by the one or more processing circuits and to the first user at a second time, a second set of travel search results including a second set of two or more travel items based on the updated dynamic user profile, where the second time is later than the first time, and where at least one travel item included in the second set of two or more travel items differs from at least one travel item included the first set of two or more travel items based on the updated dynamic user profile. In some embodiments, the method includes generating, by the one or more processing circuits, a second comparison among two or more travel items included in the second set of travel items, where the second comparison relates to one or more second features of the two or more travel items included in the second set of travel items, the one or more second features based at least in part on one or more characteristics of the updated dynamic user profile.

In some embodiments, at least one of the one or more second features differs from at least one of the one or more first features based on the one or more characteristics of the updated dynamic user profile.

In some embodiments, the one or more features of the two or more travel items includes a preference match score.

In some embodiments, the one or more features of the two or more travel items includes a list of amenities, and a first list of amenities provided in a first comparison between the two or more travel items differs from a second list of amenities provided in a second comparison between the two or more travel items by at least one of a type of amenity included in the list of amenities or an order in which one or more amenities are presented in the list of amenities.

In some embodiments, providing the first set of travel search results includes providing a set of filters associated with the first set of travel search results based on the dynamic user profile, where a first set of filters differs from a second set of filters by at least one of a type of filter included in the set of filters or an order in which the set of filters are provided.

In some embodiments, generating the comparison includes providing a plurality of categories of types of comparisons based on the dynamic user profile. In some embodiments, providing the plurality of categories includes determining at least one of the following using the dynamic user profile: the categories to be included in the plurality of categories; or an order in which the plurality of categories are presented. In some embodiments, generating the comparison includes receiving a selection of one of the plurality of categories. In some embodiments, generating the comparison includes generating the comparison among the two or more travel items based on the selected category.

In some embodiments, the comparison includes a summary description of each of the two or more travel items included in the first set of travel search results based on the dynamic user profile.

In some embodiments, the comparison includes an explanation for recommending each of the two or more travel items included in the first set of travel search results based on the dynamic user profile.

In some embodiments, the comparison is generated using an artificial intelligence (AI) model.

In some embodiments, the AI model is a generative AI model. In some embodiments, generating the comparison using the generative AI model includes extracting, by the one or more processing circuits, the one or more characteristics from the dynamic user profile. In some embodiments, generating the comparison using the generative AI model includes generating, by the one or more processing circuits, a prompt for the generative AI model including the one or more characteristics.

In some embodiments, the dynamic user profile is a first dynamic user profile, and the comparison is a first comparison. In some embodiments, the method includes receiving, by the one or more processing circuits, a second dynamic user profile indicating a plurality of travel preferences for a second user. In some embodiments, the method includes generating, by the one or more processing circuits, a second comparison among the two or more travel items included in the first set of travel search results, where the second comparison differs from the first comparison based on the second dynamic user profile being different than the first dynamic user profile.

In some embodiments, the method includes providing, by the one or more processing circuits and to the second user, a second set of travel search results based on the second dynamic user profile.

Another embodiment relates to a computing system including at least one processing circuit having at least one processor and at least one memory. The at least one memory stores instructions therein that, when executed by the at least one processor, cause the at least one processor to obtain first interaction data indicating a first set of interactions of a first user across a plurality of platforms at a first time. The instructions, when executed by the at least one processor, cause the at least one processor to generate a dynamic user profile indicating a plurality of travel preferences for the first user using the first interaction data. The instructions, when executed by the at least one processor, cause the at least one processor to provide, to the first user, a first set of travel search results based on the dynamic user profile. The instructions, when executed by the at least one processor, cause the at least one processor to generate a first comparison among two or more travel items included in the first set of travel search results, where the first comparison relates to one or more features of the two or more travel items, and where generating the comparison includes selecting the one or more features based at least in part on one or more characteristics of the dynamic user profile.

In some embodiments, the instructions, when executed by the at least one processor, cause the at least one processor to obtain second interaction data indicating a set of second interactions of the first user across the plurality of platforms at a second time. In some embodiments, the instructions, when executed by the at least one processor, cause the at least one processor to update the dynamic user profile to include changes to the plurality of travel preferences indicated by the second interaction data. In some embodiments, the instructions, when executed by the at least one processor, cause the at least one processor to generate a second comparison among the two or more travel items included in the first set of travel search results based on the updated dynamic user profile, where the second comparison differs from the first comparison.

In some embodiments, the dynamic user profile is a first dynamic user profile. In some embodiments, the instructions, when executed by the at least one processor, further cause the at least one processor to receive a second dynamic user profile indicating a plurality of travel preferences for a second user. In some embodiments, the instructions, when executed by the at least one processor, further cause the at least one processor to generate a second comparison among the two or more travel items included in the first set of travel search results based on the second dynamic user profile, where the second comparison differs from the first comparison based on the second dynamic user profile being different than the first dynamic user profile.

Another embodiment relates to a non-transitory computer-readable medium having computer-executable instructions embodied therein. The instructions, when executed by at least one processor of a computing system, cause the computing system to perform operations including obtaining interaction data indicating a set of interactions of a first user across a plurality of platforms. The operations include generating a dynamic user profile indicating a plurality of travel preferences for the first user using the interaction data. The operations include providing, to the first user, a first set of travel search results based on the dynamic user profile. The operations include generating a comparison among two or more travel items included in the first set of travel search results, where the comparison relates to one or more features of the two or more travel items, and where generating the comparison includes selecting the one or more features based at least in part on one or more characteristics of the dynamic user profile.

In some embodiments, the interaction data is first interaction data indicating a first set of interactions of the first user, and the comparison is a first comparison provided to the first user at a first time. In some embodiments, the operations include obtaining second interaction data indicating a second set of interactions of the first user across the plurality of platforms. In some embodiments, the operations include processing the second interaction data to infer changes to the plurality of travel preferences indicated by the dynamic user profile. In some embodiments, the operations include updating the dynamic user profile to include the changes to the plurality of travel preferences. In some embodiments, the operations include providing a second comparison among the two or more travel items included in the first set of travel search results to the first user at a second time, where the second time is later than the first time, and where the second comparison is based on the updated dynamic user profile including the changes.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements. Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

BRIEF DESCRIPTION OF THE DRAWINGS

FIG. 4 depicts a method for dynamic traveler preference assessment, according to an example embodiment.

DETAILED DESCRIPTION

Figure 1:
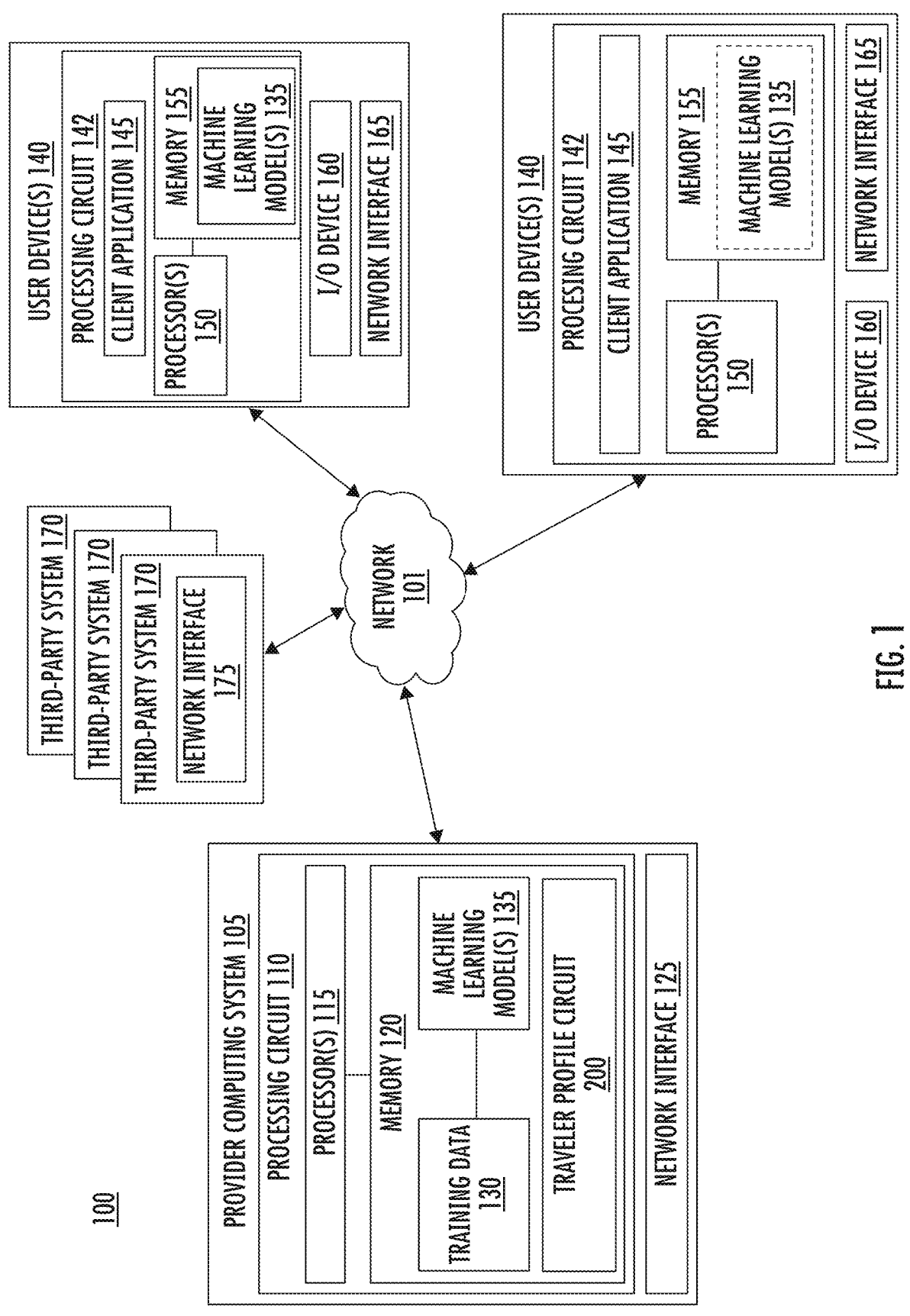
FIG. 1 depicts a block diagram of a travel intelligence system, according to an example embodiment.

Below are detailed descriptions of various concepts related to and implementations of techniques, approaches, methods, apparatuses, and systems for dynamic traveler preference assessment. The various concepts introduced above and discussed in detail below may be implemented in any of numerous ways, as the described concepts are not limited to any particular manner of implementation. Examples of specific implementations and applications are provided primarily for illustrative purposes.

Referring generally to the Figures, aspects and embodiments of the present disclosure relate to systems, computer-readable media, and methods for building and utilizing a dynamic traveler profile. In some embodiments, the dynamic traveler profile may be an evolving profile of the preferences and inclinations of the user relating to travel services (e.g., general preferences relating to travel services and/or preferences pertaining to one or more particular planned, in-progress, or past trips). In various embodiments, the dynamic traveler profile may be generated and/or updated based on interactions across a plurality of different platforms (e.g., such that the dynamic traveler profile evolves by utilizing information obtained from the user's interactions across different platforms). In some embodiments, the dynamic traveler profile may be generated and/or updated using active interactions (e.g., interactions in which the user actively or directly provides indications of preferences, such as locations, services, characteristics, events, etc. that they like or dislike) and/or passive interactions (e.g., interactions in which the user is not expressly or intentionally providing indications of travel preferences, such as liking or disliking a travel-related characteristic or item, but from which the travel preferences can be inferred). The platforms from which the interactions (e.g., the data/signals representing or based on the interactions) can be obtained can be one or more of a variety of different platforms, such as messaging platforms (e.g., chats/messages between users), web browsing platforms, social media platforms, one or more of various travel and/or amenity-related platforms and/or apps, etc. The dynamic traveler profile can be generated using one or more of a variety of algorithms, such as artificial intelligence (AI)/machine learning (ML) models.

In some implementations, the dynamic traveler profile can be updated (e.g., continuously, periodically at intervals, in response to particular triggering events, as additional data/signals are received from one or more platforms, etc.) to evolve the preferences contained therein to reflect updated preferences of the user as their preferences evolve over time. In some implementations, the dynamic traveler profile or portions thereof can be presented to the user and the user may be able to provide feedback (e.g., verifying the accuracy of one or more of the preferences, indicating one or more of the preferences are not accurate, modifying one or more of the preferences to be more accurate, etc.).

In various embodiments, the dynamic traveler profile may be used to provide one or more of a variety of different enhanced travel features and/or services. In some embodiments, the dynamic traveler profile may be used to generate dynamic search term recommendations based on the evolving preferences of the user. In some embodiments, the dynamic traveler profile may be used to generate dynamic filters for filtering search results. In some embodiments, the dynamic traveler profile may be used to generate recommendations for services. In some embodiments, the dynamic traveler profile may be used to provide customized view options for modifying the types of information presented to the users. In some embodiments, the dynamic traveler profile may be used to generate recommendations for alternative plans in the event of interruptions to original plans (e.g., in the event weather or travel delays impact a trip). It should be appreciated that these are merely some examples of the types of enhanced features and/or services that can be provided using the dynamic traveler profile according to various example implementations.

Various embodiments described herein provide a variety of technical improvements to conventional travel planning systems. For example, technical benefits provided by various embodiments may include, but are not limited to: (1) providing a more accurate and complete digital representa-tion of the preferences of a user, such as by taking into account interactions from multiple platforms and/or different types of interactions (e.g., both passive and active interactions) that may not otherwise be accounted for, such as by conventional systems; (2) providing a more complete and accurate representation of the preferences of a user while requiring the traveler to provide less express input regarding their preferences, or even no express input; (3) keeping the profile up to date and reflective of the current preferences of the user, such as by continuing to receive data/signals from multiple platforms over time and process-ing the data to glean further insights as to the preferences of the user; (4) providing the user with awareness of the information and assumptions/inferences upon which the system is taking actions and/or implementing functions and, in some embodiments, allowing the user to edit/approve/reject/otherwise provide feedback on those assumptions/inferences to improve the performance of the system in taking actions and implementing functions that are desired by the user, where the user might otherwise have no vis-ibility into and/or ability to correct inaccurate inferences/assumption that might adversely affect the user's experi-ence; and/or (5) allowing the system to obtain more accurate and detailed insights as to the user preferences while storing and/or processing less data, such as by utilizing and cross-referencing data/signals from multiple platforms to obtain detailed insights rather than relying solely on processing large amounts of historical data from a single platform to attempt to discern the preferences of the user, which may require more storage, processing time, power consumption, etc. while potentially providing less accurate and/or timely insights regarding the current preferences of the user.

Before turning to the Figures, which illustrate certain example embodiments in detail, it should be understood that the present disclosure is not limited to the details or meth-odology set forth in the description or illustrated in the Figures. It should also be understood that the terminology used herein is for the purpose of description only and should not be regarded as limiting.

FIG. 1 illustrates an example system 100 for progressive travel intelligence, according to an example embodiment. In some implementations, various components and/or systems of the system 100 may be configured to generate and provide assistance and recommendations associated with traveling and/or trip planning (e.g., hotels, resorts, rental properties, flights and/or other transportation modalities, experiences/activities, events, etc.). More specifically, the recommenda-tions may relate to one or more travel experiences such as a travel property, a destination, an itinerary, a transportation modality, or an activity.

According to some embodiments, the system 100 includes a provider computing system 105 coupled to one or more user devices 140 and one or more third-party systems 170 via a network 101. The provider computing system 105 may be a computing system associated with a provider entity. The provider organization or entity may be a provider of goods and/or services. In this example, the provider entity is a travel services/experiences provider, such as a travel agency, travel broker, travel services provider such as a provider of hotels or flights, etc., that provides and maintains one or more accounts on behalf of the user. The provider may be a transportation provider (e.g., airline, car or rental vehicle service, rideshare/taxi service etc.), a lodging provider (e.g., hotel, rental property, cruise, etc.), an experience provider (e.g., theme parks, concerts, shows, events, excursions, etc.), or any other provider of travel-related services. In the example shown, the provider is a travel or experience booking agency that provides or enables a variety of experiences by interfacing/communicating with other providers (e.g., lodging providers, airline providers, etc.).

The provider computing system 105 can be structured as one or more backend computing systems including one or more servers and other computing components, in some embodiments. The provider computing system 105 can store or otherwise have access to predetermined training data 130. The predetermined training data 130 may include one or more of image data, caption data, travel metadata, chat history data, or user account data. The provider computing system 105 includes one or more machine learning models 135 that can be trained using the training data 130, as described in greater detail herein. Although shown as internal to the provider computing system 105, it should be understood that the training data 130 may be stored external to the provider computing system 105, for example, as part of a cloud computing system or an external storage medium in communication with the provider computing system 105 via the network 101. In some embodiments, although shown internal to the provider computing system 105, the machine learning models 135 may be implemented via the user device(s) 140. In general, it should be understood that some or all of the provider computing system 105 may be implemented using a single computing device/system/server, multiple computing devices/systems/servers working together in a distributed computing environment, cloud computing resources, or using any other computing architecture.

Each component (e.g., the provider computing system 105, the network 101, the machine learning model 135, the user devices 140, the third-party systems 170, etc.) of the system 100 can be implemented using the hardware components or a combination of software with the hardware components of any computing system described herein. Each component of the system 100 can perform one or more of the functionalities detailed herein.

The provider computing system 105 can include at least one processing circuit 110, which may, as an example, include at least one processor 115 and at least one memory 120. The provider computing system 105 may include one or more servers that include one or more of the processors and/or memory components described above and herein. The memory 120 can store computer-executable instructions that, when executed by the processor 115, cause the processor 115 to perform one or more of the operations described herein. The processor 115 may include a microprocessor, an application-specific integrated circuit (ASIC), a field-programmable gate array (FPGA), a graphics processing unit (GPU), a tensor processing unit (TPU), etc., and/or combinations thereof. The memory 120 may include, but is not limited to, electronic, optical, magnetic, or any other storage or transmission device capable of providing the processor 115 with program instructions. The memory 120 may further include a magnetic disk, memory chip, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The provider computing system 105 can include one or more computing devices or servers that can perform various of the operations or functions described herein.

The provider computing system 105 can include a network interface 125. In some instances, the network interface 125 includes, for example, program logic and any associated hardware components (e.g., transceivers, ethernet cards, etc.) that connects the provider computing system 105 to the network 101. The network interface 125 facilitates secure communications between the provider computing system 105 and each of the user device(s) 140 and the third-party system(s) 170. The network interface 125 also facilitates communication with other entities, such as other providers of goods and/or services. The network interface 125 further includes user interface program logic configured to generate and present web pages to users accessing the provider computing system 105 over the network 101.

The network 101 can include packet-switching computer networks such as the Internet, local, wide, metro, or other area networks, intranets, satellite networks, other computer networks such as voice or data mobile phone communication networks, or combinations thereof. The provider computing system 105 of the system 100 can communicate via the network 101 with one or more computing devices, such as the one or more user devices 140 and the one or more third-party systems 170. The network 101 may be any form of computer network that can relay information between the provider computing system 105, the one or more user devices 140, the one or more third-party systems 170, and one or more information sources, such as web servers or external databases, amongst others. In some implementations, the network 101 may include the Internet and/or other types of data networks, such as a local area network (LAN), a wide area network (WAN), a cellular network, a satellite network, or other types of data networks. The network 101 may also include any number of computing devices (e.g., computers, servers, routers, network switches, etc.) that are configured to receive or transmit data within the network 101.

The network 101 may include any number of hardwired or wireless connections. Any or all of the computing devices described herein (e.g., the provider computing system 105, the one or more user devices 140, the one or more third-party systems 170, etc.) may communicate wirelessly (e.g., via Wi-Fi, cellular communication, radio, etc.) with a transceiver that is hardwired (e.g., via a fiber optic cable, a CAT5 cable, etc.) to other computing devices in the network 101. Any or all of the computing devices described herein (e.g., the provider computing system 105, the one or more user devices 140, the one or more third-party systems 170, etc.) may also communicate wirelessly with the computing devices of the network 101 via a proxy device (e.g., a router, network switch, or gateway). In some embodiments, a wired or a combination of wired and/or wireless connections may be used to enable communicable coupling.

The provider computing system 105 can include a traveler profile circuit 200 which is configured to generate and update traveler profiles associated with users. The traveler profile circuit 200 is described in more detail below with respect to FIG. 2. While the traveler profile circuit 200 is shown as being implemented within the memory 120 (e.g., as computer-readable instructions stored on the computer-readable storage medium of the memory 120 and executable by the processor(s) 115 to implement functions of the traveler profile circuit 200), it should be understood that, in various embodiments, portions or all of the traveler profile circuit 200 may be implemented using software, hardware, or a combination thereof. In some embodiments, the one or more platforms from which the provider computing system 105 receives data/signals to use to generate and/or modify the traveler profile generated by the traveler profile circuit 200 can be executed on the third-party system(s) 170, the user device(s) 140, and/or any other devices.

The system 100 is shown to include multiple user devices 140. The user device 140 may be owned by, managed by, and/or otherwise associated with a user. As the provider is a travel experience provider, in this example, the user may be a traveler or a person who books experiences on behalf of a traveler/user. The user device 140 can include one or more computing devices that can perform various operations as described herein. For example, in some implementations, the user device 140 may be or may include, for example, a desktop or laptop computer (e.g., a tablet computer), a smartphone, a wearable device (e.g., a smartwatch), a personal digital assistant, and/or any other suitable computing device. In the example shown, the user device 140 is structured as a mobile computing device, namely a smartphone.

Each of the user devices 140 can include at least one processing circuit 142, which may, as an example, include at least one client application (e.g., client application 145), at least one processor (e.g., processor(s) 150), and at least one memory (e.g., memory 155). In some implementations, one or more of the user devices 140 can access various functions of the provider computing system 105 through the network 101. For example, the user device 140 can access one or more functions of the provider computing system 105 via the client application 145 of the user device 140 that is configured to display various user interfaces to the user device 140 via the network 101. In some embodiments, the user device 140 may include the machine learning models 135, as described herein.

The client application 145 can be coupled to and supported, at least partly, by the provider computing system 105. For example, in operation, the client application 145 can be communicably coupled to the provider computing system 105 and may perform certain operations described herein. In some embodiments, the client application 145 includes program logic stored in a system memory (e.g., memory 155) of the user device 140. In such arrangements, the program logic may configure a processor (e.g., processor(s) 150) of the user device 140 to perform at least some of the functions discussed herein with respect to the client application 145 of the user device 140. In the example shown, the client application 145 may be downloaded from an application store, stored in the memory 155 of the user device 140, and selectively executed by the processor(s) 150. In other embodiments, the client application 145 may be hard-coded or natively provided as part of the user device 140 (e.g., a preexisting or core component or app provided as part of the operating system). In still various other embodiments, the client application 145 is a web-based application. As alluded to above, the client application 145 may be provided by the provider associated with the provider computing system 105 such that the client application 145 supports at least some of the functionalities and operations described herein with respect to the provider computing system 105. In this way, the client application 145 may also be referred to as a provider institution client application or provider client application. In some embodiments, the client application 145 may be accessed and executed by the processor(s) 150 responsive to receiving various credentials of a user to access the client application 145 (e.g., a username, a password, a pin code, a biometric such as a facial scan or a fingerprint, a combination thereof, etc.).

In some instances, the client application 145 may additionally be coupled to the third-party system(s) 170 (e.g., via one or more application programming interfaces (APIs) and/or software development kits (SDKs)) to integrate one or more features or services provided by the third party system(s) 170. In some instances, the third-party system(s) 170 may alternatively and/or additionally provide services via a separate client application 145.

The processor(s) 150 can include a microprocessor, an ASIC, an FPGA, a GPU, a TPU, etc., or combinations thereof. The memory 155 can store processor-executable instructions that, when executed by the processor(s) 150, cause the processor(s) 150 to perform one or more of the operations described herein. The memory 155 can include, but is not limited to, electronic, optical, magnetic, or any other storage or transmission device capable of providing the processor 150 with program instructions. The memory 155 can further include a memory chip, ROM, RAM, EEPROM, EPROM, flash memory, optical media, or any other suitable memory from which the processor(s) 150 can read instructions. The instructions can include code from any suitable computer programming language.

The user device 140 is further shown as including an I/O device 160 and a network interface 165. The I/O device 160 can include various components for receiving inputs, providing outputs, or receiving and providing inputs and outputs, respectively, to a user of the user device 140. For example, the I/O device 160 can include a display screen such as a touchscreen, a mouse, a button, a keyboard, a microphone, a speaker, an accelerometer, actuators (e.g., vibration motors), any combination thereof, etc. The I/O device 160 may also include circuitry/programming/etc. for operating such components. The I/O device 160 thereby enables communications to and from a user, for example communications relating to travel recommendations as described in further detail herein.

The network interface 165 includes, for example, program logic and various devices and/or components and systems (e.g., transceivers, etc.) that connect the user device 140 to the network 101. The network interface 165 facilitates secure communications between the user device 140 and each of the provider computing system 105 and/or the third-party systems 170. The network interface 165 also facilitates communication with other entities, such as other providers of goods and/or services.

The system 100 is shown to include the third-party systems 170 (although multiple are shown here, there could be only one or, in some embodiments, none). The third-party system 170 may be controlled by a third party or entity different from the provider (i.e., the entity controlling or otherwise associated with the provider computing system 105), in some embodiments. It should be understood that, in some embodiments, the third-party system 170 may be controlled by or otherwise associated with a same entity that is controlling or associated with the provider computing system 105. In some embodiments, the third-party entity may not be a provider of travel services or may be a different provider of travel services other than the entity associated with the provider computing system 105. For example, in some embodiments, the third-party entity may provide social media services, search services, etc. In various embodiments, the third-party entity may be or may include various goods and/or services provider entities including, but not limited to, a transportation provider (e.g., airline, car service, etc.), a lodging provider (e.g., hotel, rental property, cruise, etc.), an experience provider (e.g., theme parks, concerts, shows, events, excursions, etc.), or any combination thereof. The provider computing system 105 may communicate with the third-party system 170 to make bookings and reserve experiences on behalf of the traveler/user. The third-party system 170 includes a respective network interface 175 to facilitate exchanging data with the provider computing system 105 and/or the user device 140 through the network 101. The third-party system 170 may include one or more servers. The third-party system 170 may include one or more APIs and/or SDKs associated with the third-party entity for exchanging data with the provider computing system 105 and/or the user device 140, as described herein.

The machine learning model 135 may be structured to recognize patterns, trends, and the like in data and make one or more determinations. In some embodiments, the machine learning model 135 may include a predictive AI model and/or a generative AI model, both of which are described herein. In some embodiments, the machine learning model 135 may be or include a causal AI model configured to identify/discern causality between different elements (e.g., data patterns which lead to certain changes in actual or perceived travel preferences of the user). In some embodiments, the AI model may utilize supervised learning. For example, the machine learning model 135 may be trained given input-output pairs (e.g., stored in the training data 130). An input-output pair is an input with an associated known output (e.g., an expected output). The machine learning model 135 may be trained on known input-output pairs (e.g., the training data 130) such that the machine learning model 135 can learn how to predict known outputs given known inputs. Once the machine learning model 135 has learned how to predict known input-output pairs, the machine learning model 135 can operate on unknown inputs to predict an output.

The machine learning model 135 may be trained based on general data and/or personalized data (e.g., data based on a specific user) such that the machine learning model 135 may be trained specific to a particular user. Training inputs and actual outputs may be provided to the machine learning model 135. For example, as described in greater detail herein, training inputs may include images and/or other media, captions to describe the images, metadata, user account data, and/or other data stored in the provider computing system 105. Actual outputs may include captions, traveler data, and/or property data. The training inputs and the actual outputs may be received from the training data 130. For example, the training data 130 may contain various datasets including the images and/or other medias, captions, metadata, traveler data, property data, etc., as described herein. Thus, the machine learning model 135 may be trained to predict recommended properties based on the training inputs and actual outputs used to train the machine learning model 135.

In operation, the machine learning model 135 may use various training inputs (e.g., images, captions, metadata, traveler data, property data, etc.) to determine and, particularly, predict various outputs (e.g., travel recommendations, search suggestions, etc.), by applying the current state of the machine learning model 135 to the training inputs. A comparator may compare the predicted outputs to actual outputs to determine an amount of error or differences. For example, the predicted output may be compared to actual output. In other words, the actual outputs may be based on historical data of recommendations made to a user of the user device 140 and stored in the training data 130.

During training, the error determined by the comparator may be used to adjust the weights in the machine learning model 135 such that the machine learning model 135 changes (or learns) over time. The machine learning model 135 may be trained using a backpropagation algorithm, for instance. The backpropagation algorithm operates by propagating the error signal. The error signal may be calculated each iteration (e.g., each pair of training inputs and associated actual outputs), batch and/or epoch, and propagated through the algorithmic weights in the machine learning model 135 such that the algorithmic weights adapt based on the amount of error. The error is minimized using a loss function. Non-limiting examples of loss functions may include the square error function, the root mean square error function, and/or the cross-entropy error function.

The weighting coefficients of the machine learning model 135 may be tuned to reduce the amount of error, thereby minimizing the differences between (or otherwise converging) the predicted output and the actual output. The machine learning model 135 may be trained until the error determined at the comparator is within a certain threshold (or a threshold number of batches, epochs, or iterations have been reached). The trained machine learning model 135 and associated weighting coefficients may subsequently be stored in memory or other data repository (e.g., a database) such that the machine learning model 135 may be employed on unknown data (e.g., not training inputs). Once trained and validated, the machine learning model 135 may be employed during a testing (or an inference phase). During testing, the machine learning model 135 may ingest unknown data to predict future data.

A first machine learning model 135 can include one or more neural networks, including, but not limited to, neural networks configured as generative models. For example, the first machine learning model 135 can predict or generate new data (e.g., artificial data; synthetic data; data not explicitly represented in the training inputs and/or the actual outputs used for configuring the first machine learning model 135). The first machine learning model 135 can generate any of a variety of modalities of data, such as text, speech, audio, images, and/or video data. In some embodiments, a neural net can include one or more nodes which may be arranged in layers for providing outputs of one or more nodes of one layer as inputs to one or more nodes of another layer. The neural network can include one or more input layers, one or more hidden layers, and one or more output layers. Each node can include or be associated with parameters such as weights, biases, and/or thresholds, representing how the node can perform computations to process inputs to generate outputs. The parameters of the nodes can be configured by various learning or training operations, such as unsupervised learning, weakly supervised learning, semi-supervised learning, or supervised learning.

The first machine learning model 135 can include, for example and without limitation, one or more language models, LLMs, attention-based neural networks, transformer-based neural networks, generative pretrained transformer (GPT) models, bidirectional encoder representations from transformers (BERT) models, encoder/decoder models, sequence to sequence models, autoencoder models, generative adversarial networks (GANs), convolutional neural networks (CNNs), recurrent neural networks (RNNs), diffusion models (e.g., denoising diffusion probabilistic models (DDPMs)), or various combinations thereof.

For example, the first machine learning model 135 can include at least one GPT model. The GPT model can receive an input sequence and can parse the input sequence to determine a sequence of tokens (e.g., words or other semantic units of the input sequence, such as by using Byte Pair Encoding tokenization). For example, the input sequence may include a textual input submitted by a user during a chat session, as described herein. The GPT model can include or be coupled with a vocabulary of tokens, which can be represented as a one-hot encoding vector, where each token of the vocabulary has a corresponding index in the encoding vector; as such, the GPT model can convert the input sequence into a modified input sequence, such as by applying an embedding matrix to the tokens of the input sequence (e.g., using a neural network embedding function), and/or applying positional encoding (e.g., sin-cosine positional encoding) to the tokens of the input sequence. The GPT model can process the modified input sequence to determine a next token in the sequence (e.g., to append to the end of the sequence), such as by determining probability scores indicating the likelihood of one or more candidate tokens being the next token, and selecting the next token according to the probability scores (e.g., selecting the candidate token having the highest probability scores as the next token). For example, the GPT model can apply various attention and/or transformer-based operations or networks to the modified input sequence to identify relationships between tokens for detecting the next token to form the output sequence.

The first machine learning model 135 can include at least one diffusion model, which can be used to generate image and/or video data. For example, the diffusion model may be used to generate images related to one or more travel experiences (e.g., a travel property, a destination, an activity, etc.) responsive to an input from a user during a travel planning chat session. In some embodiments, the diffusional model can include a denoising neural network and/or a denoising diffusion probabilistic model neural network. The denoising neural network can be configured by applying noise to one or more training data elements (e.g., images, video frames) to generate noised data, providing the noised data as input to a candidate denoising neural network, causing the candidate denoising neural network to modify the noised data according to a denoising schedule, evaluating a convergence condition based on comparing the modified noised data with the training data instances, and modifying the candidate denoising neural network according to the convergence condition (e.g., modifying weights and/or biases of one or more layers of the neural network). In some implementations, the first machine learning model 135 includes multiple generative models, such as GPT and diffusion models, that can be trained separately or jointly to facilitate generating multi-modal outputs, such as travel experiences (e.g., travel property listings) that include both text and image/video information.

In some embodiments, the first machine learning model 135 may be configured to determine one or more second machine learning models 135. For example, a model updater may configure (e.g., trains, updates, modifies, fine-tunes, etc.) the first machine learning model 135 to determine the one or more second machine learning model 135. In some implementations, the second machine learning model 135 can be used to provide application-specific outputs, such as outputs having greater precision, accuracy, or other metrics, relative to the first machine learning model 135, for targeted applications.

The second machine learning model 135 can be similar to the first machine learning model 135. For example, the second machine learning model 135 can have a similar or identical backbone or neural network architecture as the first machine learning model 135. In some implementations, the first machine learning model 135 and the second machine learning model 135 each include generative AI machine learning models, such as LLMs (e.g., GPT or other transformer-based LLMs) and/or diffusion models. The second machine learning model 135 can be configured using processes analogous to those described for configuring the first machine learning model 135.

In some implementations, the model updater can perform operations on at least one of the first machine learning model 135 or the second machine learning model 135 via one or more interfaces, such as application programming interfaces (APIs). For example, the one or more machine learning models 135 can be operated and maintained by one or more systems separate from the provider computing system 105 (e.g., by the user device 140, as shown in FIG. 1). The model updater can provide training data to the first machine learning model 135, via the API, to determine the second machine learning model 135 based on the first machine learning model 135 and the training data 130. The model updater can control various training parameters or hyperparameters (e.g., learning rates, etc.) by providing instructions via the API to manage configuring the second machine learning model 135 using the first machine learning model 135.

The model updater can perform various machine learning model configuration/training operations to determine the second machine learning model 135 using the data from the training data 130, as described above. For example, the model updater can perform various updating, optimization, retraining, reconfiguration, fine-tuning, or transfer learning operations, or various combinations thereof, to determine the second machine learning model 135. The model updater can configure the second machine learning model 135, using the training data 130, to generate outputs (e.g., recommendations) in response to receiving inputs (e.g., prompts), where the inputs and outputs can be analogous to data of the training data 130 (e.g., training inputs and actual outputs).

For example, the model updater can identify one or more parameters (e.g., weights and/or biases) of one or more layers of the first machine learning model 135, and maintain (e.g., freeze, maintain as the identified values while updating) the values of the one or more parameters of the one or more layers. In some implementations, the model updater can modify the one or more layers, such as to add, remove, or change an output layer of the one or more layers, or to not maintain the values of the one or more parameters. The model updater can select at least a subset of the identified one or parameters to maintain according to various criteria, such as user input or other instructions indicative of an extent to which the first machine learning model 135 is to be modified to determine the second machine learning model 135. In some implementations, the model updater can modify the first machine learning model 135 so that an output layer of the first machine learning model 135 corresponds to output to be determined.

Responsive to selecting the one or more parameters to maintain, the model updater can apply, as input to the second machine learning model 135 (e.g., to a candidate second machine learning model 135, such as the first machine learning model 135 having the identified parameters maintained as the identified values), training data (e.g., from the training data 130). For example, the model updater can apply the training data 130 as input to the second machine learning model 135 to cause the second machine learning model 135 to generate one or more candidate outputs.

The model updater can evaluate a convergence condition to modify the candidate second machine learning model 135 based at least on the one or more candidate outputs and the training data applied as input to the candidate second machine learning model 135. For example, the model updater can evaluate an objective function of the convergence condition, such as a loss function (e.g., L1 loss, L2 loss, root mean square error, cross-entropy or log loss, etc.) based on the one or more candidate outputs and the training data; this evaluation can indicate how closely the candidate outputs generated by the candidate second machine learning model 135 correspond to the ground truth represented by the training data 130. The model updater can use any of a variety of optimization algorithms (e.g., gradient descent, stochastic descent, Adam optimization, etc.) to modify one or more parameters (e.g., weights or biases of the layer(s) of the candidate second machine learning model 135 that are not frozen) of the candidate second machine learning model 135 according to the evaluation of the objective function. In some implementations, the model updater can use various hyperparameters to evaluate the convergence condition and/ or perform the configuration of the candidate second machine learning model 135 to determine the second machine learning model 135, including but not limited to hyperparameters such as learning rates, numbers of iterations or epochs of training, etc.

In some embodiments, the machine learning model 135 may be a neural network model. The neural network model may include a number of hidden layers between the input layer and the output layer and my produce an accurate output. In some embodiments, the output may be one or more numbers. For example, output may be a vector of real numbers subsequently classified by various one or more of any classifiers. In one example, the real numbers may be input into a softmax classifier. A softmax classifier uses a softmax function, or a normalized exponential function, to transform an input of real numbers into a normalized probability distribution over predicted output classes. For example, the softmax classifier may indicate the probability of the output being in class A, B, C, etc. As, such the softmax classifier may be employed because of the classifier's ability to classify various classes. Other classifiers may be used to make other classifications. For example, the sigmoid function, makes binary determinations about the classification of one class (i.e., the output may be classified using label A or the output may not be classified using label A).

It is noted that various other forms of classifiers may be implemented or used in the present disclosure (e.g., in the machine learning model 135). For example, the machine learning model 135 described herein may include or use a support vector machine, random forest, K-nearest neighbors, naïve bayes, or any other type or form of classifier.

Figure 2:
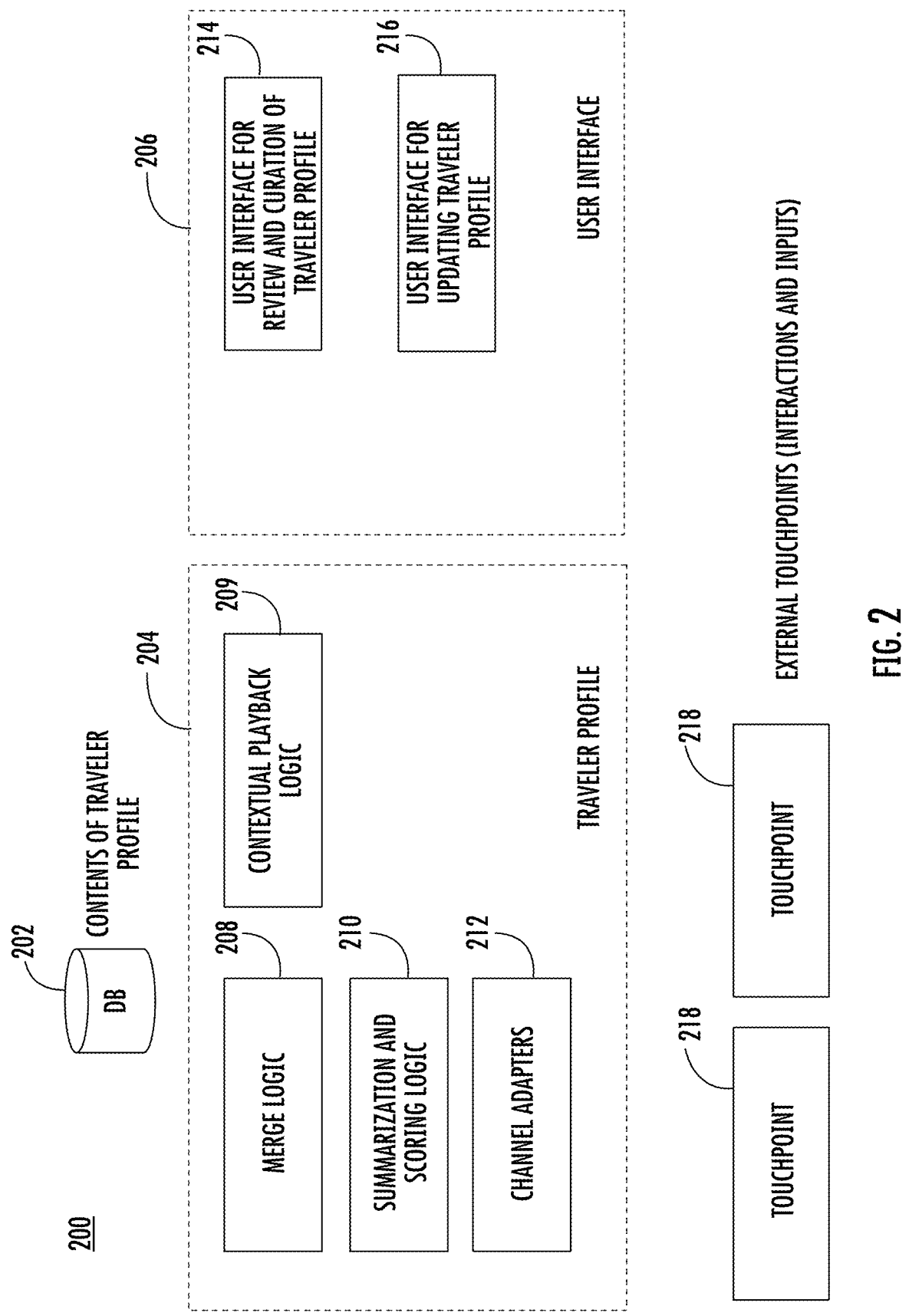
FIG. 2 depicts a block diagram of a dynamic traveler profile circuit, according to an example embodiment.

FIG. 2 illustrates the traveler profile circuit 200 which is configured to generate and/or update a dynamic traveler profile, according to an example embodiment. In some implementations, various components and/or systems of the traveler profile circuit 200 may be configured to generate and/or dynamically update a traveler profile for a user (e.g., traveler). The traveler profile may be used, in conjunction with one or more machine learning models 135 to generate and provide assistance and recommendations associated with traveling and/or trip planning (e.g., hotels, resorts, rental properties, etc.).

According to some embodiments, the traveler profile circuit 200 includes a traveler profile database 202, a traveler profile generation system 204, and a user interface system 206. The traveler profile generation system 204 may be configured to generate a dynamic travel profile which is consistently updated in real time using artificial intelligence and based on personal information gathered about the traveler. The traveler profile is initially generated and customized based on the interests, preferences, historical data, and personal information for the traveler. Further, the traveler profile may be updated and curated over time based on updated information received about the traveler or trips associated with the traveler. In some embodiments, the updated information for the traveler may be received through the one or more touchpoints 218. A touchpoint may be defined as an interaction the traveler has with the user device 140, related to either the provider computing system 105 or the one or more third-party systems 170.

In some embodiments, the interactions/touchpoints may be collected across a variety of different platforms including third-party platforms. For example, a touchpoint may include interacting with a group chat, interacting with a third-party web application, or interacting with one or more social media sites. The interactions received from the user may be passive and/or active interactions. An active interaction may be a touchpoint in which the user actively engages with the platform to directly provide feedback indicating certain travel preferences. For example, an active interaction may include liking content on the platform, commenting on content on the platform, saving content on the platforms, and sharing content on the platforms.

A passive interaction may be a touchpoint in which the user does not necessarily actively or deliberately provide an express indication of a preference (e.g., a like or dislike, an inclination, etc.) as to particular travel-related characteristics or services and/or through which the user is not actively engaging with the platform but from which travel preferences from a user can be inferred. For example, a passive interaction may include a user observing content on the platform for a certain period of time. In one example, a passive interaction may include a user watching video content on a platform (e.g., social media platform, streaming platform, etc.) related to a specific travel preference (e.g. locations, styles, interests, activities) which may allow the traveler profile circuit 200 to infer that the user has a specific travel preference even if the user does not actively engage with the content (e.g., commenting on the content, liking the content, sharing the content, etc.). In some embodiments, the interactions may be related to travel interests or upcoming/ future travel plans for the traveler. In various embodiments, characteristics of passive interactions that may be used to infer an interest or lack thereof in a particular travel characteristic may include, but are not limited to: (1) an amount of time the user interacted with a type of content (e.g., if a user interacts for a long period of time over one or more interactions with content related to a particular hotel, it may be inferred that the user is interested in the hotel or some characteristic of the hotel; if the user interacts for a short period of time and does not interact again, it may be inferred that the user is not interested in the hotel); (2) a number of interactions over which the user interacted with the type of content (e.g., if the user repeatedly viewed material relating to a particular city it may be inferred that the user is interested in traveling to the city; if the user viewed material only once and then did not view material for the city again, it may be inferred that the user is not interested); and/or (3) a type or extent of interaction with the type of content (e.g., if the user repeatedly clicked through links pertaining to a particular activity it may be inferred that the user is interested in the activity; if the user only viewed content related to the activity but did not click through links to more content for the activity, it may be inferred that the user is not interested).

The touchpoints 218 may be retrieved through one or more channel adapters 212. The channel adapters 212 may each be associated with a particular group or type of touchpoints 218 and/or different platforms and/or groups/ types of platforms. For example, all touchpoints received from a first type of platform or first specific platform (e.g., group chat platform, social media platform, third party platform, provider computing system platform, etc.) may be retrieved with a specific channel adapter made to retrieve information from that particular platform or type of platform. The channel adapters 212 can retrieve relevant content with the user's permission and pass it into a summarization and scoring logic circuit 210 which is described in more detail below. For example, for a multiparticipant chat, the channel adapter 212 may include basic authentication and permission, connection to relevant APIs, mapping contents of specific chat turns from a third-party format to the provider internal format, etc. For a web page, the channel adapter 212 may include connecting to the URL, downloading HTML, retrieving other important resources such as images or videos that need to be parsed by the summarization logic, etc.

The traveler profile generation system 204 includes a merge logic circuit 208, contextual playback logic circuit 209, summarization and scoring logic circuit 210, and channel adapters 212. The summarization and scoring logic circuit 210 is a circuit that determines, given a set of observed touchpoints/interactions from a user, what information is materially relevant and potentially useful for the traveler profiles. As described above, the interactions/touchpoints may be extracted from a variety of platforms, including, but not limited to: a multi-turn or multiparticipant text (e.g., group chat) conversation, an image, a URL to a web resource containing text and image content, a video, a social media site, etc. The summarization and scoring logic circuit 210 is configured to ingest the information from the variety of platforms, extract the important portions of the information, and summarize the information to include in the traveler profile. In the case of a group chat conversation, summarization would mean extracting information relevant to a user's travel preferences. For example, a group chat conversation may include the following:

A: "Hey man",
B: "What's up? Did you see the game?",
A: "Sweet, bro, that last TD was sick",
B: "Can't believe Football Team A is going to the playoffs",
A: "Hey, we should totally go",
B: "NOLA baby!"

Based on the group chat conversation above, the summarization and scoring logic circuit 210 may produce the following summary:

[ {item: "Trip to New Orleans for the playoffs", score:1.0}, {item: "Football Team A fans", score:1.0}, {item: "two travelers", score:0.7}, {item:"one or more travelers is possibly sick or unwell", score:0.1}]

As can be seen from the example provided above, the summarization and scoring logic circuit 210 extracts the key parts of the conversation (e.g., "Trip to New Orleans for the playoffs," "Football Team A fans," "two travelers," "one or more travelers is possibly sick or unwell.") and assigns a score to each of the key parts of the conversation based on determining the importance of the information and the accuracy of the information. Information that may be important to determining traveler preferences and is determined to be accurate is scored highly, while information which only seems tangentially related to traveler preferences or does not seem to be accurate is scored lowly. In some embodiments, extracting the key parts of group chat conversations and scoring the key parts of the conversation may be done using a machine learning model such as machine learning models 135 which are described in more detail above.

The merge logic circuit 208 is a circuit that updates the traveler profile. The merge logic circuit 208 may determine how to update the traveler profile based on the existing contents of the traveler profile and new information extracted and summarized from the touchpoints 218. For example, existing contents of a dossier associated with the profile might include:

["Trip to France", "summer vacation", "Olympics", "kitchen"].

New information extracted from user interaction through the touchpoints 218 may include:

[{item:"staying outside of Paris", score:0.9}, {item: "taking train into the city", score:0.9} , {item:"day trip to Belgium", score 0.5].

The merge logic circuit 208 may merge this new information into the traveler profile based on the scores assigned to each of the individual pieces of information by the summarization and scoring logic circuit 210. For example, based on the scoring of the new information, the merge logic circuit 208 may merge the new information into the traveler profile so that the updated travel profile includes:

["Trip to France", "summer vacation", "staying outside of Paris", "possible day trip to Belgium", "day trips to Paris Olympics by train", "kitchen"].

The contextual playback logic circuit 209 is a circuit that determines how to display or summarize information from the traveler profile related to a specific context based on the current traveler profile and the new information received from the touchpoints 218 related to the specific context. For example, in a group chat scenario, a user may request a summary of key takeaways from the conversation. In such a case, the contextual playback logic circuit 209 might summarize only the information retrieved from a channel adapter and summarized by the summarization and scoring logic circuit 210 which is related to the specific context. In some embodiments, a user may have a plethora of different travel preferences associated with their traveler profile which may not all be related to the specific context. For example, the user may have travel preferences stored in their traveler profile related to trips taken in the past and planned upcoming trips. The user may wish to only see information related to the specific context of the planned upcoming trips. On a trip summary page displayed on a graphical user interface associated with the client application, the contextual playback logic circuit 209 might retrieve the current contents of the traveler profile so that each item related to the context can be individually rendered to the user on the page. For example, the contextual playback logic circuit 209 may cause a user interface to display information related to the "Trip to France." Further, the information related to the context may be integrated into displaying other information in other portions of the application. For example, on a lodging search page in the application, the contextual playback logic circuit 209 might suggest relevant filters, such as "5-30 km from Paris", "kitchen available", "near train station", etc., which are based on the contextually relevant information retrieved from the traveler profile.

In some embodiments, one or more touchpoints 218 may be used by the traveler profile generation system 204 to generate the traveler profile. Additionally, the user interface system 206 may be configured to generate one or more user interfaces which display information about the traveler profile and receive feedback from the user regarding the traveler profile. Specifically, the user feedback received by the user interface system may be used to dynamically update and curate the traveler profile. In some embodiments, the user interface system 206 may generate a user interface circuit 214 where a user may review and curate the traveler profile. When a merge decision is made by the merge logic circuit 208, the user interface circuit 214 may display the intended changes to the traveler profile for user review, correction, approval, etc. In some embodiments, the merge logic circuit 208 might show the new information extracted from the touchpoints 218 and allow the user to accept or reject them before completing the merge of the new information into the traveler profile. In other embodiments, the user interface circuit 214 may display the complete final contents of the updated traveler profile and allow the user to accept or reject each item regardless of whether it is changed. In other embodiments, the user interface circuit 214 may might show only the parts of the traveler profile that are new/changed/deleted but not display the parts that are not changing and ask the user to review and accept or deny the changes. In some embodiments, the user interface circuit 214 may display the information for the user to review without expressly allowing the user to submit changes, so that the user is aware of the evolving user preferences captured within the dynamic traveler profile and is able to take further actions from the platforms/channels to influence the preferences without providing direct approval/rejection/edits.

In some embodiments, the user interface system 206 may generate a user interface by user interface circuit 216 where a user may update the traveler profile. For example, at certain points in the application, the user will be able to review the contents of their traveler profile and update (accept/reject/change) the traveler profile. For example, returning to the "Trip to France" example, a user may wish to update their travel preferences for that trip. Rather than needing to have another interaction (e.g., group chat, social media interaction, etc.) which can be used to update the traveler profile as described above, the user could simply look at their traveler profile and change certain traveler preferences associated with the user (e.g., delete 'possible day trip to Belgium' or, edit it to replace it with 'possible 3-day trip to London').

Figure 3:
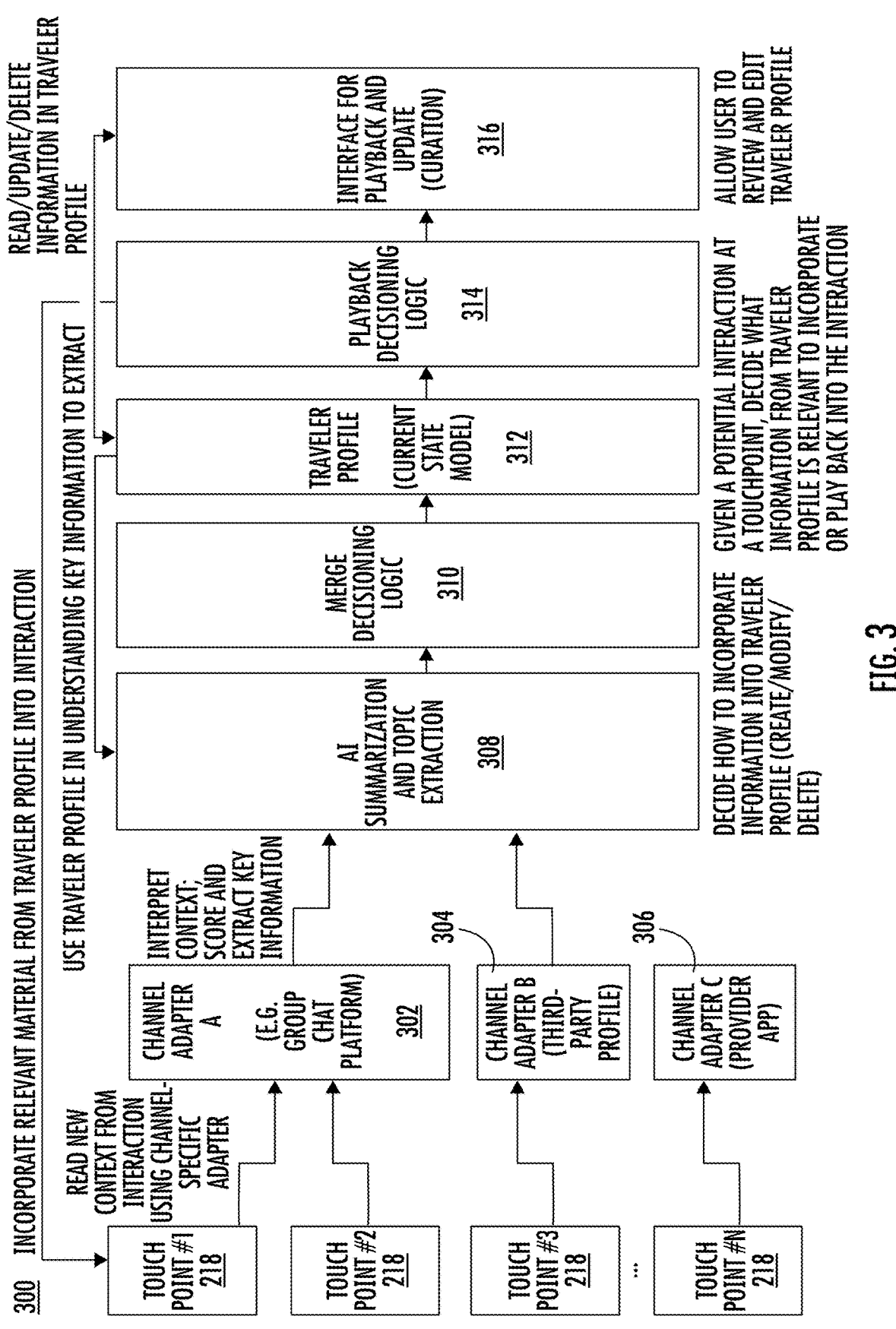
FIG. 3 depicts a flow diagram for generating a dynamic traveler profile, according to an example embodiment.

FIG. 3 illustrates an example flow diagram of a process 300 for configuring, generating, and/or updating a dynamic traveler profile, according to an example embodiment. In some implementations, various components of the process 300 may be configured to generate and dynamically update a traveler profile for a user. The traveler profile may be used in conjunction with one or more machine learning models to generate and provide assistance and recommendations associated with traveling and/or trip planning (e.g., hotels, resorts, rental properties, etc.).

Process 300 begins with receiving one or more touchpoints 218 from a variety of different platforms as described above. The touchpoints 218 may be received via channel adapters which are specific to the platform from which the touchpoints 218 are received. For example, touchpoints #1 and touchpoints #2 may be received via a channel adapter 302 which is configured to receive touchpoints from group chat platforms (e.g., text messages or other messaging apps/applications, etc.). Further, touchpoint #3 may be received via channel adapter 304 which is configured to receive touchpoints from third party profiles or platforms (e.g., social media sites, websites, etc.). Finally, touchpoints #n may be received via channel adapter 306 which is configured to receive touchpoints from a provider organization or entity which provides goods and/or services such as travel services/experiences provider, such as a travel agency, that provides and maintains one or more accounts on behalf of the user.

Once the touchpoints 218 are received via their respective channel adapters, the summarization and scoring logic circuit 210 extracts and scores the new information received from the touchpoints at 308. The process for extracting and scoring the new information is described in more detail above. The new information summarized and scored by the summarization and scoring logic circuit 210 are then merged into the traveler profile at 310. At 312, the traveler profile is generated or updated based on the new information merged into traveler profile or based on the user feedback received at 316. At 314, the contextual playback logic circuit 209 may determine, given a potential interaction (e.g., touchpoint), which information from a traveler profile is relevant to incorporate into a travel planning action for a user based on the context of the travel planning action. At 316, the travel profile is displayed to the user via a graphical user interface. The user is able to interact with the graphical user interface to review and edit the traveler profile.

Referring now to FIG. 4, a flowchart of an example method 400 of a method for dynamically assessing and updating traveler preferences is shown, in accordance with one or more implementations. Although the operations of the method 400 are described as being performed by portions of a system (e.g., systems 100 and circuit 200), it should be understood that the method 400 may be executed using any suitable computing system. It may be appreciated that certain steps of the method 400 may be executed in parallel (e.g., concurrently) or sequentially. It may also be appreciated that while certain acts of the method 400 are shown as being performed by a specific device, some acts may be performed by another device of the system 100 in FIG. 1 and the traveler profile circuit 200 of FIG. 2.

Figure 5:
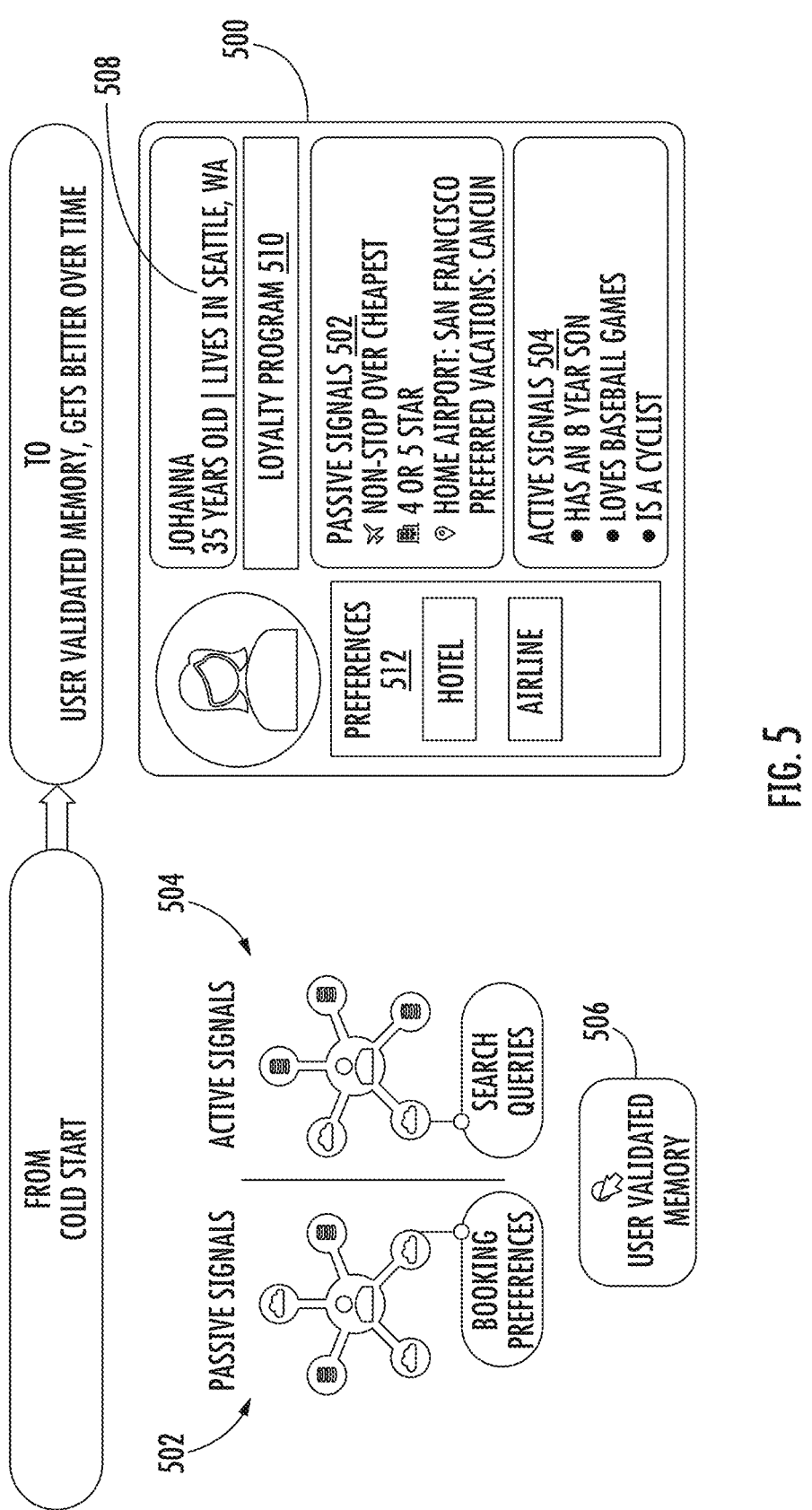
FIG. 5 depicts a block diagram of a dynamic traveler profile, according to an example embodiment.

At step 402, the provider computing system 105 receives (e.g., generates, obtains, etc.) a traveler profile associated with a user. The traveler profile may include personal identifying information about the user and indicates travel preferences associated with the user (e.g., traveler). Referring now to FIG. 5, an example dynamic traveler profile 500 is shown, in accordance with one or more implementations. In some embodiments, the dynamic traveler profile 500 may initially be generated to be blank or include a very limited amount of information (e.g., cold start condition) but as one or more passive interactions (e.g., signals) 502 and/or active interactions (e.g., signals) 504 are received, the dynamic traveler profile 500 is continually updated to include more information about the traveler including the traveler's preferences and interests, and therefore may be considered a dynamic traveler profile. As the dynamic traveler profile 500 is generated and updated, the user may monitor the profile and provide any updates or changes to the travel profile to validate the traveler profile at 506. The process for the user validating the traveler profile is described in more detail above with respect to the description of the user interface circuit 214 for review and curation of the traveler profile and the user interface circuit 216 for updating traveler profile.

In some embodiments, the dynamic traveler profile 500 includes personal identifying information 508 about the user (e.g., age, name, current location, etc.). The dynamic traveler profile 500 may include any loyalty programs 510 (e.g., airline miles programs, hotel loyalty programs, credit card points programs, restaurant loyalty programs, etc.) the user is enrolled in. The dynamic traveler profile 500 may include one or more traveler preferences 512. The traveler preferences may include hotel preferences, airline preferences, or any other travel preferences. The dynamic traveler profile 500 may include and display the passive signals 502 and the active signals 504. The passive signals 502 and active signals 504 are automatically gathered based on the actions of the user (e.g., search queries entered by the user, booking preferences inferred about the user, etc.). The user can validate the active and passive signals to indicate whether they are accurate or not.

In some embodiments, the dynamic traveler profile may include the preferences of a group of users. For example, a group chat with multiple users may be created where the users collaborate to plan a trip. In such an example, a dynamic traveler profile may be generated which takes into account the preferences of each of the multiple users. Further, in some embodiments, the dynamic traveler profile may indicate which preferences are associated with each user separately. In some embodiments, dynamic traveler profiles may be generated for a group when planning a particular trip (e.g., bachelorette, concert, destination wedding, etc.). In other embodiments, dynamic traveler profiles may be generated and stay active for a group over an extended period of time (e.g., periodic family/friend vacations, etc.). In some embodiments, the group-based dynamic traveler profile may be based on individual preferences of group members, preferences gleaned from interactions between group members, and/or historical characteristics of trips previously taken by group members.

In some embodiments, different versions of a dynamic traveler profile may be generated for a single user. For example, a first dynamic traveler profile may be generated for a user when the user is traveling independently while a second dynamic traveler profile may be generated for a user when the user is traveling with a group. As another example, a first dynamic traveler profile may be generated when the user is taking a first type of trip (e.g., vacation) while a second dynamic traveler profile may be generated for the same user when the user is taking a second type of trip (e.g., business trip). In some embodiments, different preferences associated with the user could be in multiple different profiles or different portions of same profile.

At step 404, the provider computing system 105 displays a first set of travel preferences indicated by the traveler profile at a first time. Specifically, the provider computing system 105 may generate a user interface which displays the traveler profile including the first set of travel preferences, on the user device 140. In some embodiments, the first set of travel preferences may be the travel preferences associated with a user before the travel profile is updated based on interactions (e.g., passive interactions, active interactions, etc.) received from the user.

At step 406, the provider computing system 105 obtains interaction data indicating interactions of the traveler across multiple different platforms. The interaction data may be received from one or more third-party systems 170. The interaction data includes active interactions and passive interactions received from the user regarding their travel preferences. As described above, the interactions/touchpoints may be collected across a variety of different platforms including third-party platforms. For example, the interactions may include interacting with a group chat, interacting with a third-party web application, or interacting with one or more social media sites. Further, the interaction data may be received through one or more channel adapters

212 which are configured to facilitate the transfer of information between the variety of different platforms and the provider computing system 105.

At step 408, the provider computing system 105 processes the interaction data received at step 406 to infer changes to the travel preferences for the traveler as indicated by the traveler profile. Particularly, the summarization and scoring logic circuit 210 and the merge logic circuit 208 may utilize machine learning models 135 to evaluate the interaction data and determine how to merge the new information received from the interaction data into the traveler profile. Specifically, the circuits may utilize the machine learning models 135 to infer changes to the travel preferences based on the new information.

At step 410, the provider computing system 105 updates the traveler profile to include the inferred changes to the travel preferences. As explained above, the merge logic circuit 208 updates the traveler profile to include the new information received from the interaction data. After step 410 is completed, the traveler profile may include a second set of travel preferences which include the updated or changed travel preferences.

At step 412, the provider computing system 105 displays a second set of travel preferences indicted by the traveler profile at a second time after the first time. Specifically, the provider computing system 105 may generate a user interface which displays the travel profile including the second set of travel preferences, on the user device 140. In some embodiments, the second set of travel preferences may be the travel preferences associated with a user after the travel profile has been updated as described above.

Figure 6:
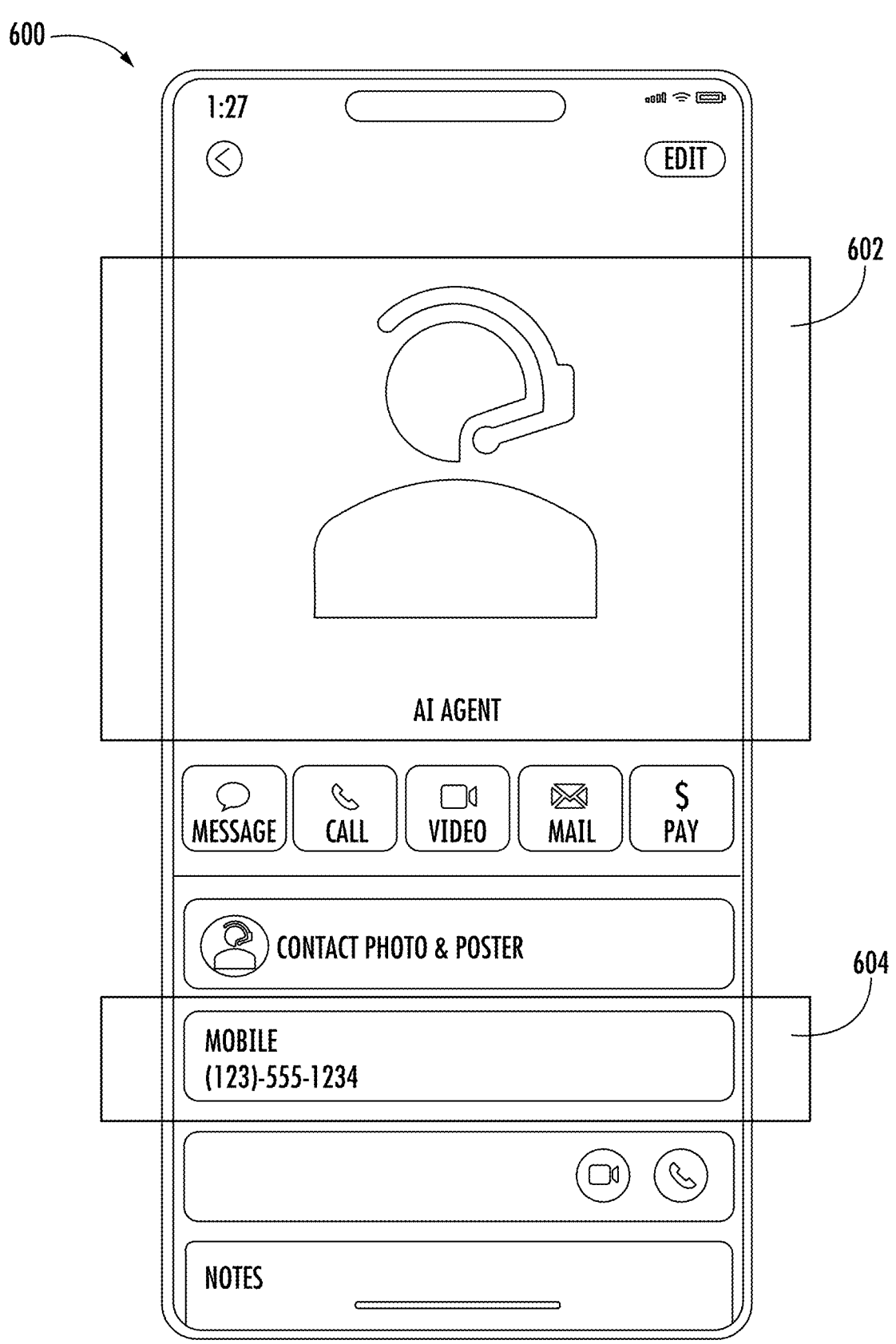
FIG. 6 depicts a user interface of a contact card for a digital artificial intelligence agent, according to an example embodiment.

Referring now to FIG. 6, the user device 140 (e.g., the client application 145) or the provider computing system 105 may be configured to generate a user interface 600 to be displayed on the user device 140. The user interface 600 is a depiction of a contact card created for a digital artificial intelligence (AI) agent 602 associated with the provider computing system 105. The digital AI agent 602 may be included in multiparticipant conversation (e.g., group chat) carried out through various messaging platforms including text messaging. In some embodiments, the digital AI agent 602 may be a chatbot with associated contact information 604 (e.g., phone number, profile information, email, etc.) which a user can utilize to contact the digital AI agent 602 and add the digital AI agent 602 into digital messaging conversations such as group chats used to plan trips. In some embodiments, the digital AI agent 602 may be configured to participate in a group chat conversation to gather interaction data (e.g., touchpoints/interactions within the group chat) which may be incorporated into the traveler profile as described in more detail above with respect to FIGS. 2-5. The digital AI agent 602 may added into group conversations such as the one shown in FIG. 7A.

Figure 7A:
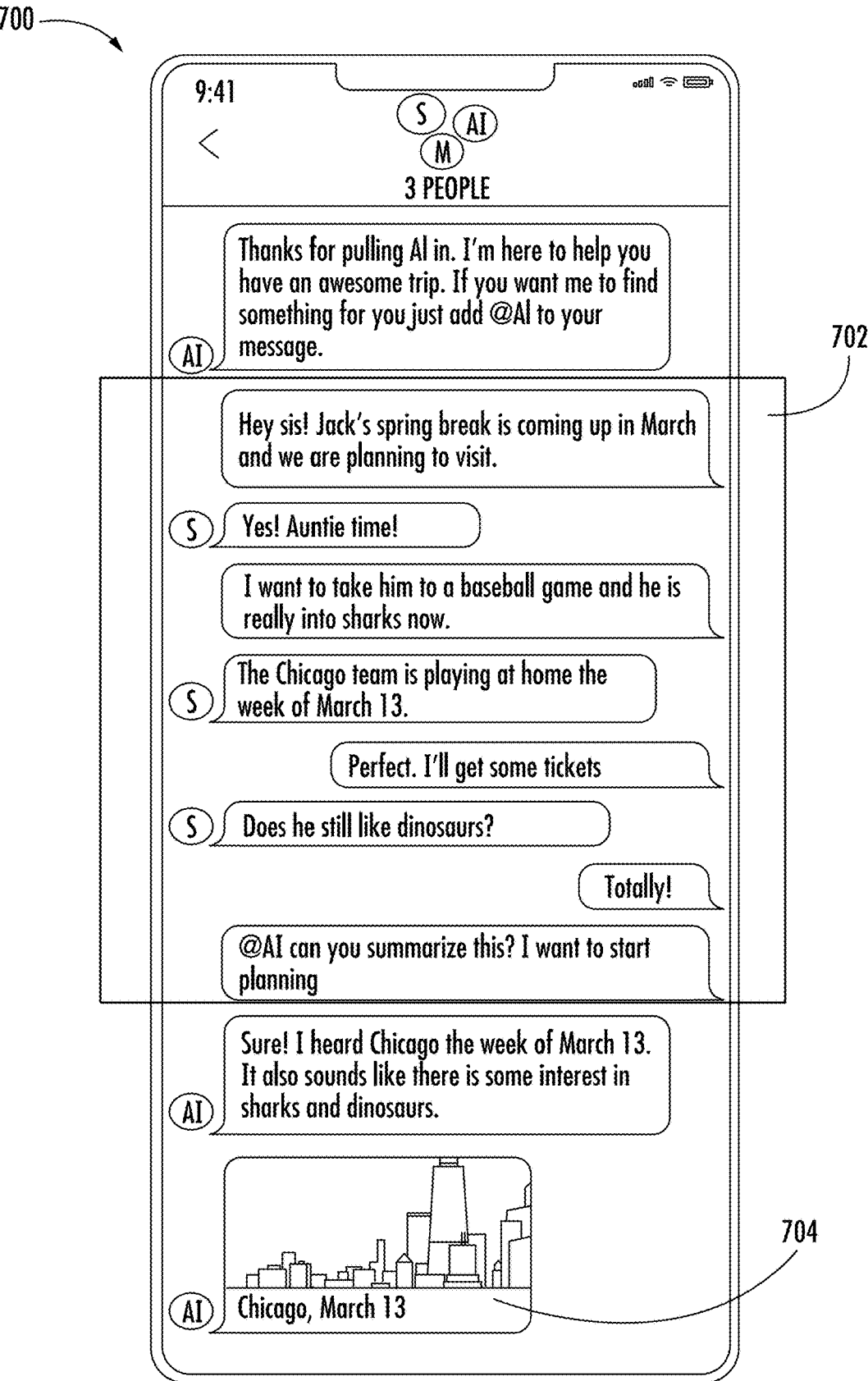
FIGS. 7A-7D depict a user interface of a chat interface for a chat session in which at least one user and an AI agent collaborate to plan a trip, according to an example embodiment.

Referring now to FIG. 7A, the user device 140 (e.g., the client application 145) or the provider computing system 105 may be configured to generate a user interface 700 to be displayed on the user device 140. The user interface 700 is a depiction of a chat interface configured to allow one or more users to participate in a chat session in which the users collaborate to plan a trip. A user may bring the digital AI agent 602 into the chat conversation by adding the digital agent contact information to the group chat session (e.g., by texting the number included in the contact information). The conversation platform may include the traveler who initiates the chat session, one or more other users associated with the trip that the traveler is planning, and the digital AI agent 602 (e.g., chat bot, a virtual agent, a virtual assistant, a conversational assistant, etc.), as described above. The digital AI agent 602 may allow the provider computing system 105 to automatically interact with the users within the chat session to plan the trip. For example, in the messages 702, the traveler and the other user in the chat session discuss an upcoming trip to Chicago including exchanging details regarding dates of travel and potential interests and activities the traveler would like to do during the trip. In some embodiments, the traveler may request that the digital AI agent 602 summarize the trip planning information in the chat sessions. The digital AI agent 602 may generate a trip planning summary 704 based on the information in messages 702. A trip planning summary 704 is provided in more detail below with respect to FIG. 8.

Figure 7B:
Figure 7C:
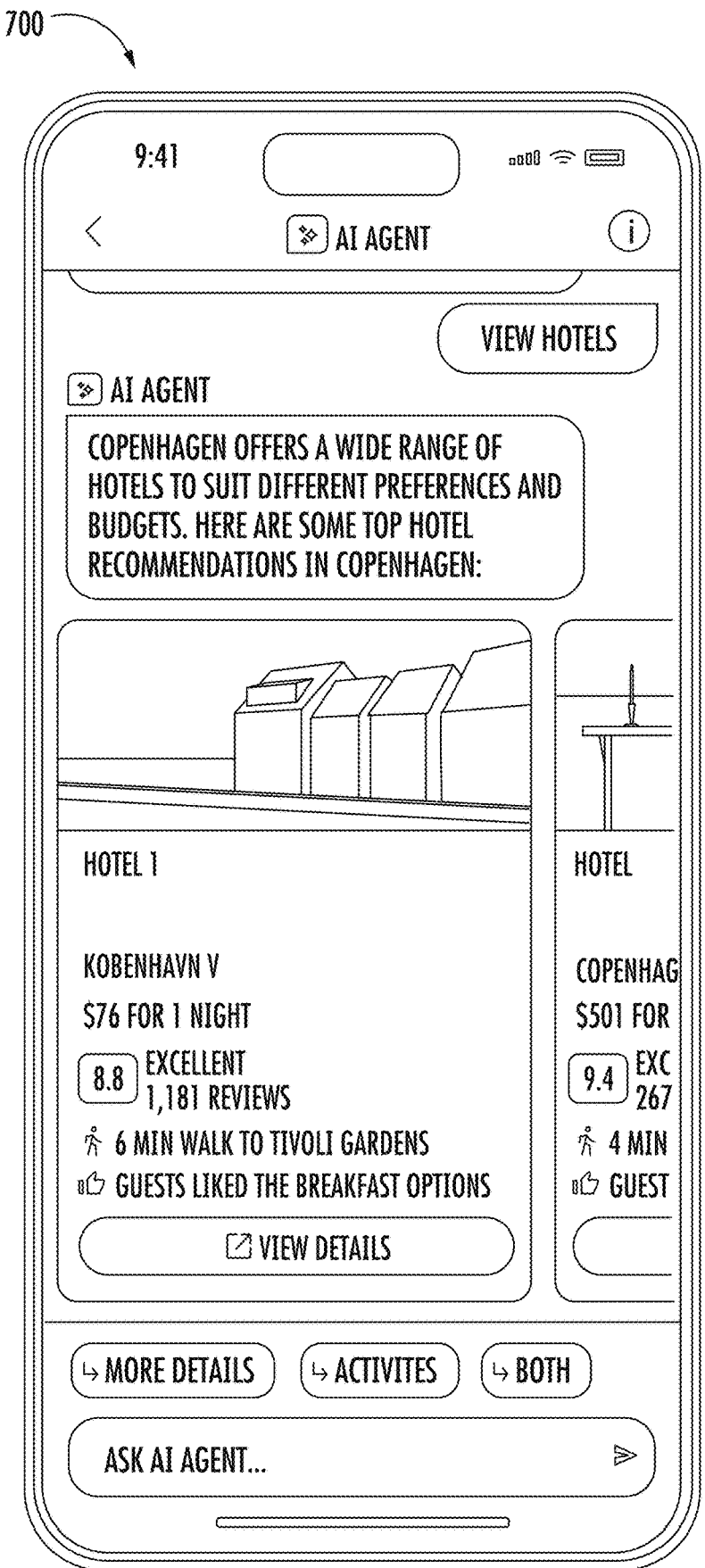
Figure 7D:
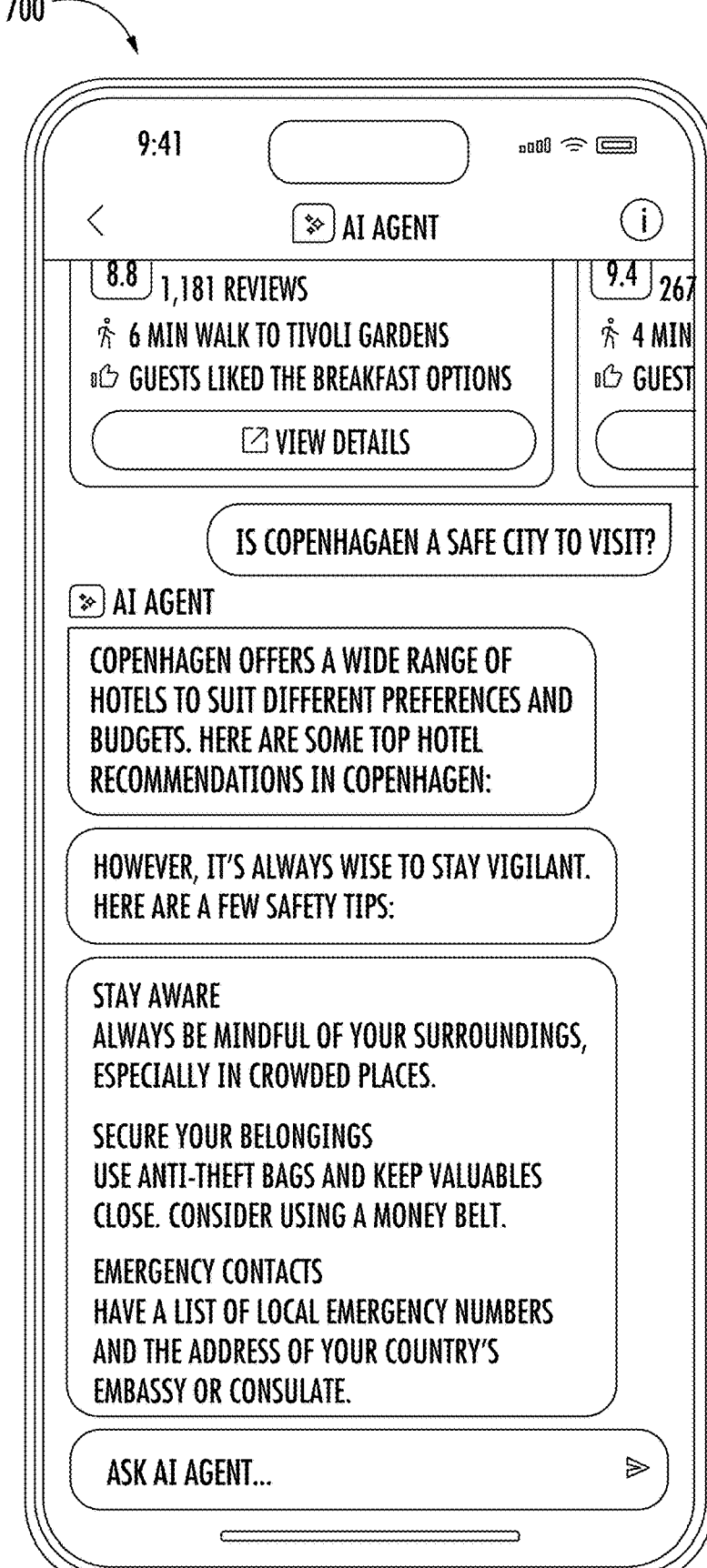

In some implementations, the user interface 700 may be or include a specialized chat interface for interacting with the digital AI agent 602, such as a portion of a travel application interface where the agent 602 does not need to be specifically invoked but through which the digital AI agent 602 monitors and interacts with submissions by default. In some embodiments, the specialized chat interface may be used to facilitate a conversation between multiple users of the travel application (e.g., a group chat). Additionally or alternatively, as shown in FIGS. 7B-7D, the specialized chat interface may be used to facilitate a conversation between a user of the travel application and the digital AI agent 602.

Figure 8:
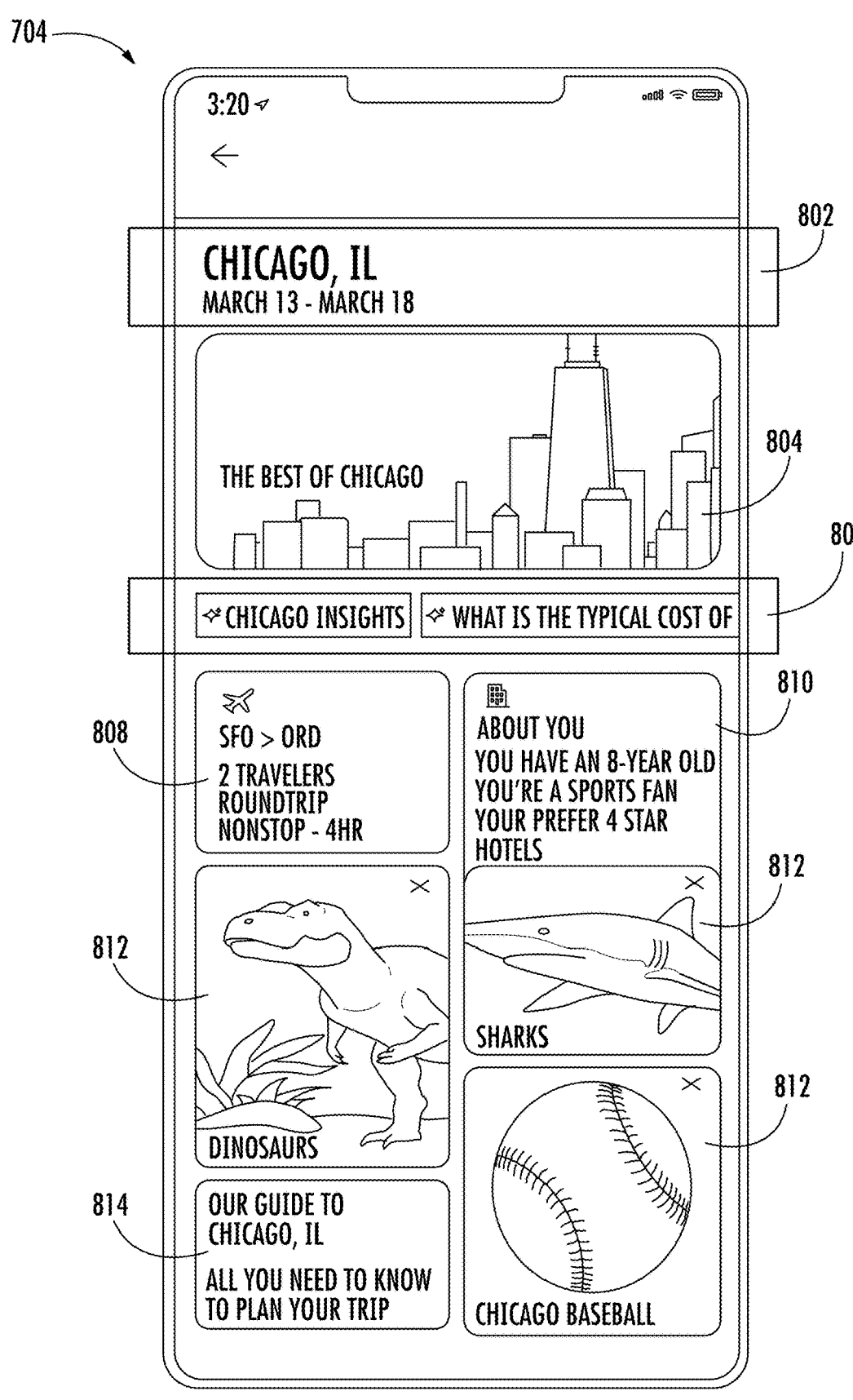
FIG. 8 depicts a user interface of a trip planning summary, according to an example embodiment.

Referring now to FIG. 8, the user device 140 (e.g., the client application 145) or the provider computing system 105 may be configured to generate a user interface to be displayed on the user device 140. The user interface is a depiction of the trip planning summary 704. In some embodiments, the trip planning summary 704 includes a title 802 which describes the location of the trip and the dates for the trip. In some embodiments, the trip planning summary 704 includes recommendation hyperlink 804 which may display a trip's highest rated recommendations. In some embodiments, the trip planning summary includes one or more AI search suggestions 806. In some embodiments, the AI search suggestions 806 may be customized based a traveler profile associated with one or more users in the chat session or messages in the chat sessions. In some embodiments, the trip planning summary 704 includes travel information 808 which may describe any transportation details associated with the trip. In some embodiments, the trip planning summary may include an interests and preference summary 810. In some embodiments, the interests and preference summary 810 may be based, at least in part, on information from a traveler profile (e.g., "You have an 8 year old" and "You prefer 4 start hotels"). In other embodiments, the interests and preference summary 810 may be based, at least in part on the messages in the chat session (e.g., "You are a sports fan" "baseball"). In some embodiments, interests specifically highlighted in the chat session may be highlighted in interest cards 812. For example, the traveler mentioned being interested in dinosaurs, sharks, and baseball. These interests are highlighted in the trip planning summary 704. In some embodiments, the trip planning summary may include a customized guide 814 to the trip location. The customized guide 814 may be created based on the traveler preferences and using artificial intelligence.

Figure 9:
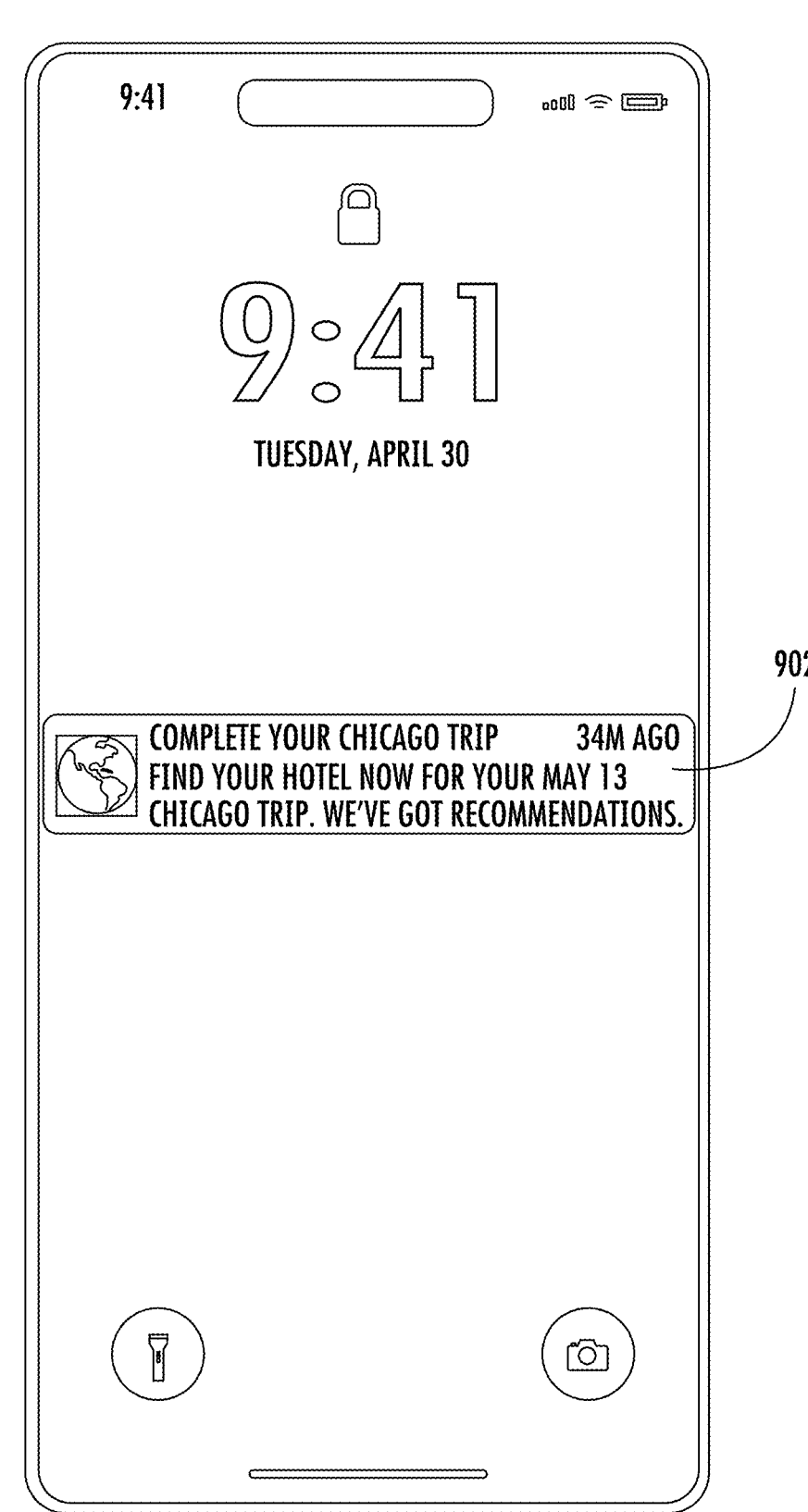
FIG. 9 depicts a user interface of a push notification to prompt a user to plan a trip, according to an example embodiment.

Referring to FIG. 9, the user device 140 (e.g., the client application 145) or the provider computing system 105 may be configured to generate a notification 902 to be displayed on a user interface 900 on the user device 140. For example, after a user has indicated an interest in planning a trip, the user device 140 may prompt the user to complete further planning for the trip. The user interface 900 includes the notification 902. The notification 902 refers to an invitation to the traveler to plan more details for their trip. In the example shown in user interface 900, the traveler may specifically be prompted to find hotels or accommodations for their upcoming trip. However, this example is not meant to be limiting. The user interface 900 may prompt the user to plan restaurants, activities, transportation, or any other details associated with the upcoming trip. In some embodiments, the notification 902 may indicate that the provider computing system 105 has generated one or more recommendations (e.g., hotel recommendations, restaurant recommendations, activity recommendations, etc.). In some embodiments, the recommendations may be based on the dynamic traveler profile 500 which is automatically updated in real time based on various interactions/touchpoints received from the user as described above. More details regarding the recommendations are provided with regards to FIGS. 10A-18. Upon receiving the notification 902, the traveler may choose to begin the trip planning search (e.g., by clicking on the notification 902) or may choose to ignore the notification 902. If the traveler clicks the notification 902, the user interface shown in FIG. 10A may be displayed.

Figure 10A:
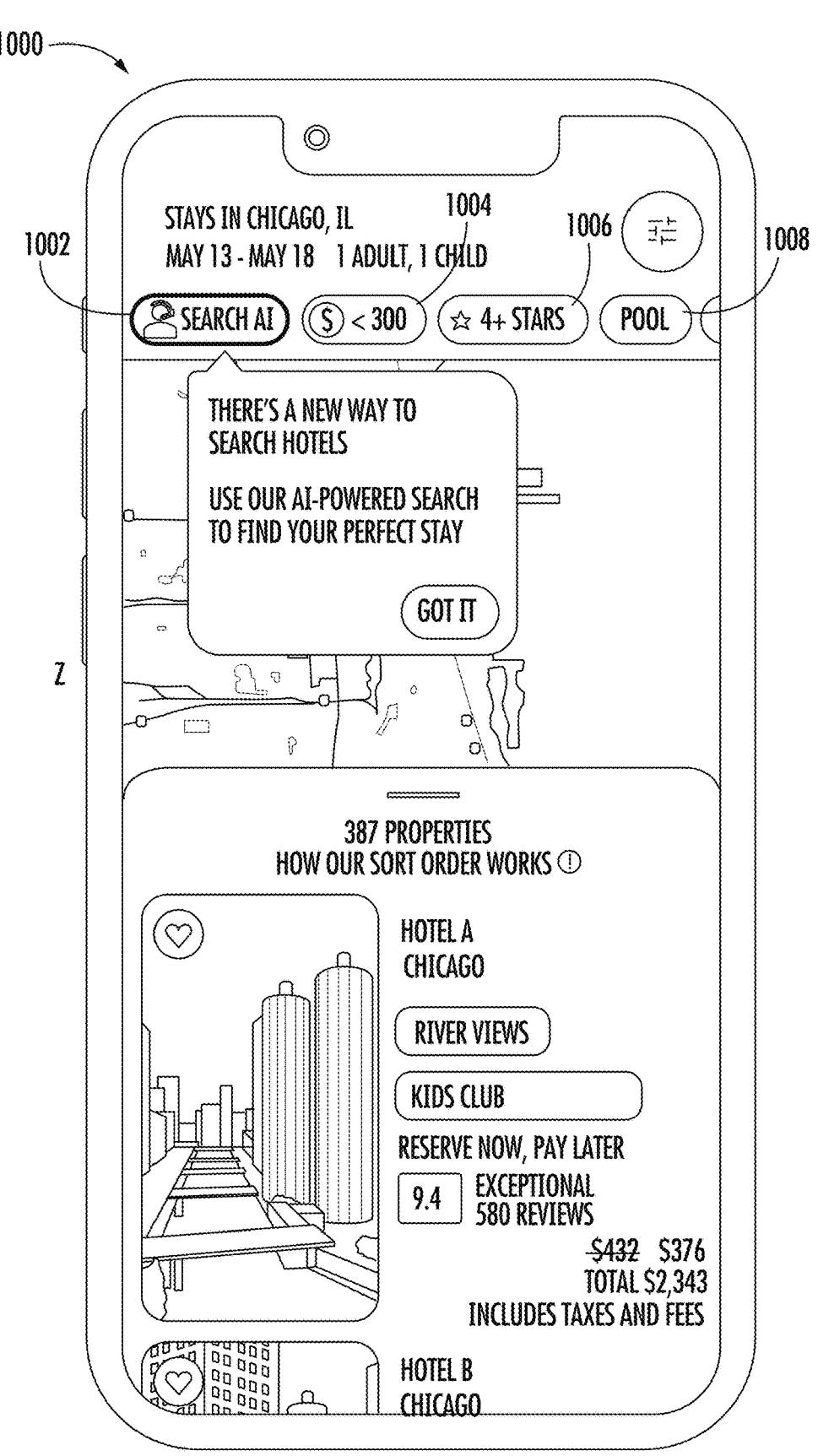
FIGS. 10A and 10B depict user interfaces of a search feature for finding trip related recommendations, according to an example embodiment.
Figure 10B:

Referring to FIGS. 10A and 10B, the user device 140 (e.g., the client application 145) or the provider computing system 105 may be configured to display the user interfaces 1000 and 1010, respectively, on the user device 140. Particularly, the user interfaces 1000 and 1010 allow the user to search for trip related recommendations (e.g., hotels, restaurants, activities, etc.). In the particular example shown in FIGS. 10A and 10B, hotel recommendations are shown, however, this example is not meant to be limiting. The user interfaces 1000 and 1010 may include an artificial intelligence (AI) search feature 1002. The AI search feature 1002 utilizes AI and machine learning techniques to incorporate the information that has been collected about the traveler in their corresponding traveler profile to generate search term/tag recommendations and search results customized to the traveler's preferences. For example, if the traveler clicks the AI search feature 1002 shown in FIG. 10A, the client application 145 may navigate to the user interface 1100 shown in FIG. 11A. Similarly, if the traveler clicks the AI search feature 1002 shown in FIG. 10B, the client application 145 may navigate to the user interface 1106 shown in FIGS. 11B and 11C.

Figure 11A:
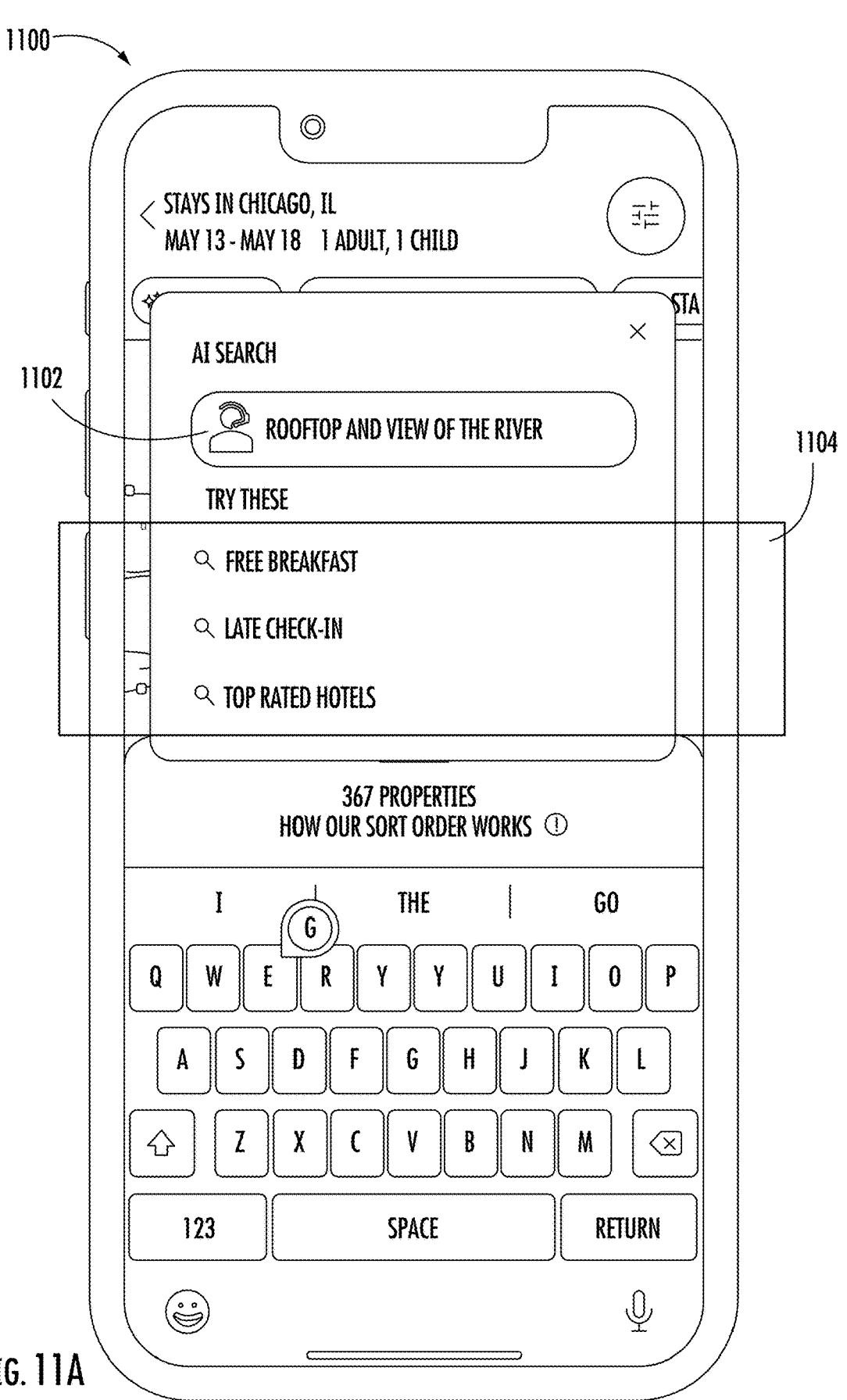
FIGS. 11A-11C depict additional user interfaces of a search feature for finding trip related recommendations, according to an example embodiment.
Figure 11B:
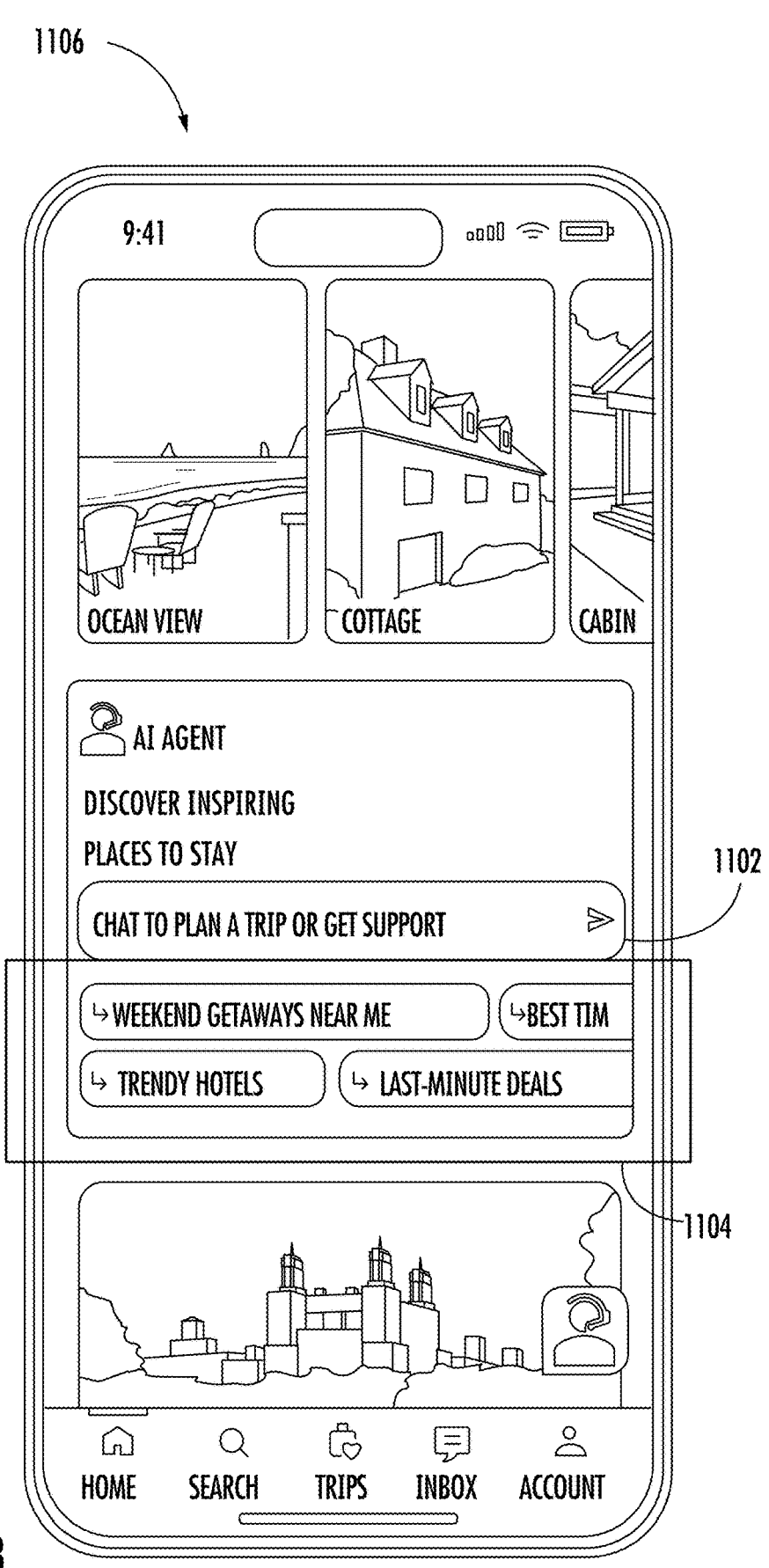
Figure 11C:
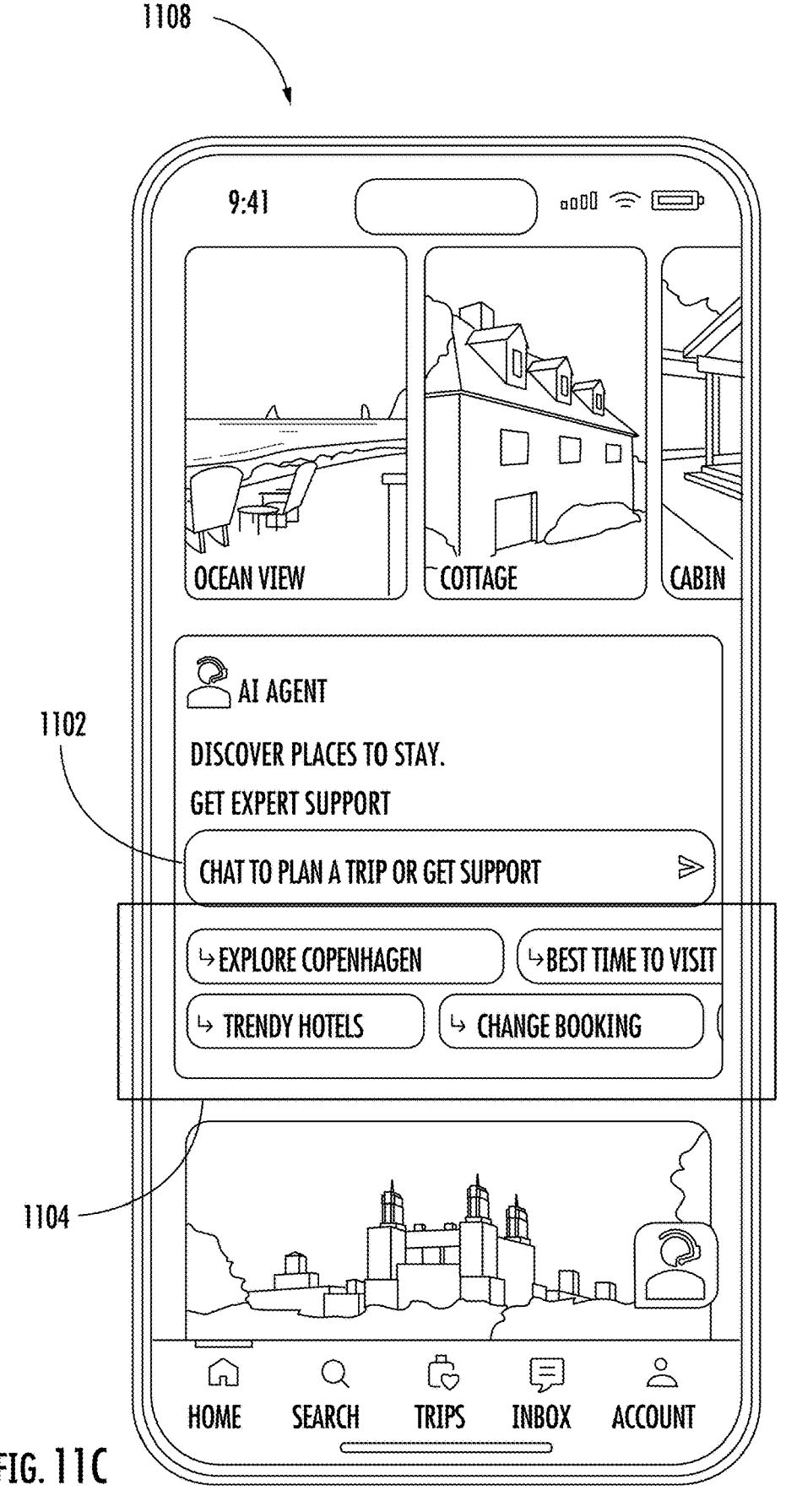

Referring to FIG. 11A-11C, the user device 140 (e.g., the client application 145) or the provider computing system 105 may be configured to display the user interfaces 1100, 1106, and 1008, respectively, on the user device 140. The user interfaces 1100, 1106, and 1108 include a search bar 1102 in which the traveler can type in a search to use the AI search feature. Further, the user interfaces 1100, 1106, and 1108 may include one or more search suggestions 1104 generated by artificial intelligence and machine learning based on the dynamic traveler profile 500. For example, if the traveler profile indicates that the traveler has a preference for free breakfast to be provided by the hotel, the AI search feature may suggest that the traveler search for hotels with free breakfast.

Referring back to FIG. 10A, user interface 1000 includes one or more search filters 1004, 1006, and 1008. In some embodiments, the traveler may prefer to search by using the AI search feature 1002 as described above. In other embodiments, the traveler may prefer to search for hotel recommendations by filtering the larger initial results using the one or more search filters 1004, 1006, or 1008. Specifically, the traveler may select one or more of the search filters to surface hotel recommendations filtered by the search filters 1004, 1006, or 1008. In some embodiments, the traveler may perform an initial search and the provider computing system 105 may generate an initial set of results using the AI search feature 1002, and then the traveler may further filter the results using the search filters 1004, 1006, and 1008. In some embodiments, the search filters 1004, 1006, and 1008 may be generated using one or more artificial intelligence and/or machine learning models. Specifically, the provider computing system 105 may utilize the artificial intelligence/ machine learning models to generate customized search filters for the traveler based on the traveler profile associated with the traveler. For example, if the traveler usually books hotels which are less than $300 dollars a night, this preference may be saved in the traveler profile. The provider computing system 105 could then use AI to generate search filter 1004, as shown in FIG. 10A. Regardless of how the traveler chooses to search, the provider computing system provides one or more search results as shown in FIGS. 12-14, which are described in more detail below.

Figure 12:
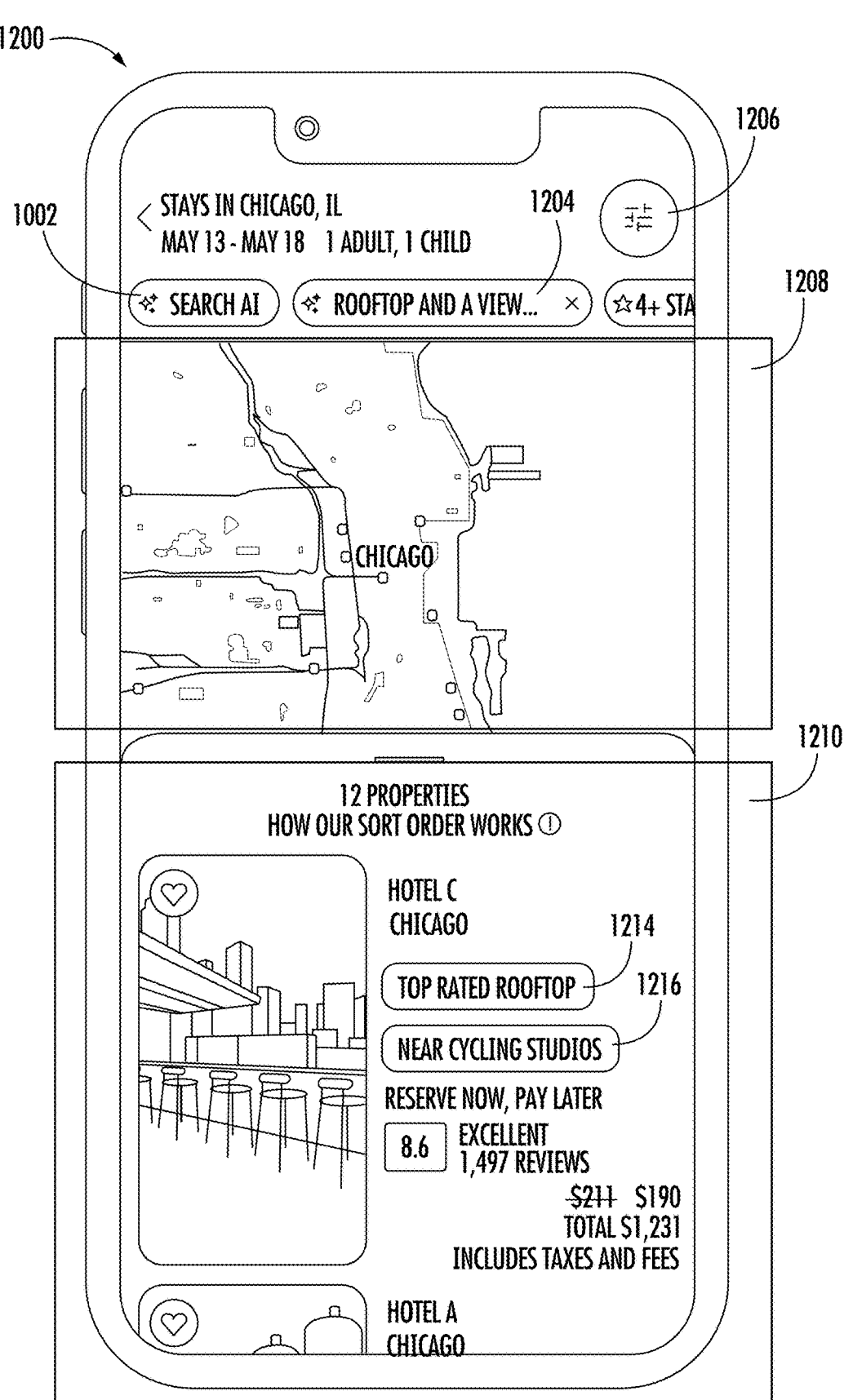
FIG. 12 depicts a user interface which displays one or more search results, according to an example embodiment.

Referring to FIG. 12, the user device 140 (e.g., the client application 145) or the provider computing system 105 may be configured to generate a user interface 1200 which displays one or more search results from the AI search feature 1002 which is described in more detail above. In some embodiments, the user interface 1200 includes a search term 1204. In some embodiments, the search term 1204 may be one of the one or more search suggestions 1104 generated by the AI search feature 1002, as described above with respect to FIGS. 11A-11C. In some embodiments, the search term 1204 may be manually searched by the traveler without input from the AI search feature 1002. In some embodiments, the user interface 1200 includes a filter 1206 which allows the user to filter the search results produced by the AI search. In some embodiments, the user interface 1200 may include a map 1208 which indicates the locations of search results produced by the AI search feature 1002. In some embodiments, the user interface 1200 may display the search results in a list format, as shown by search results list 1210. In the particular example shown in user interface 1200, there are 12 hotel search results displayed. Each of the search results may include descriptive information about the hotel (e.g., hotel name, hotel location, hotel rating, average price, etc.). In some embodiments, the hotel search results may also include descriptive tags 1214 and 1216 which highlight particular things about the hotel which the AI search feature 1002 has determined are of particular interest to the user. For example, the user previously may have expressed interest about "rooftops" or "cycling studios." These features would be highlighted by the descriptive tags 1214 and 1216.

Figure 13A:
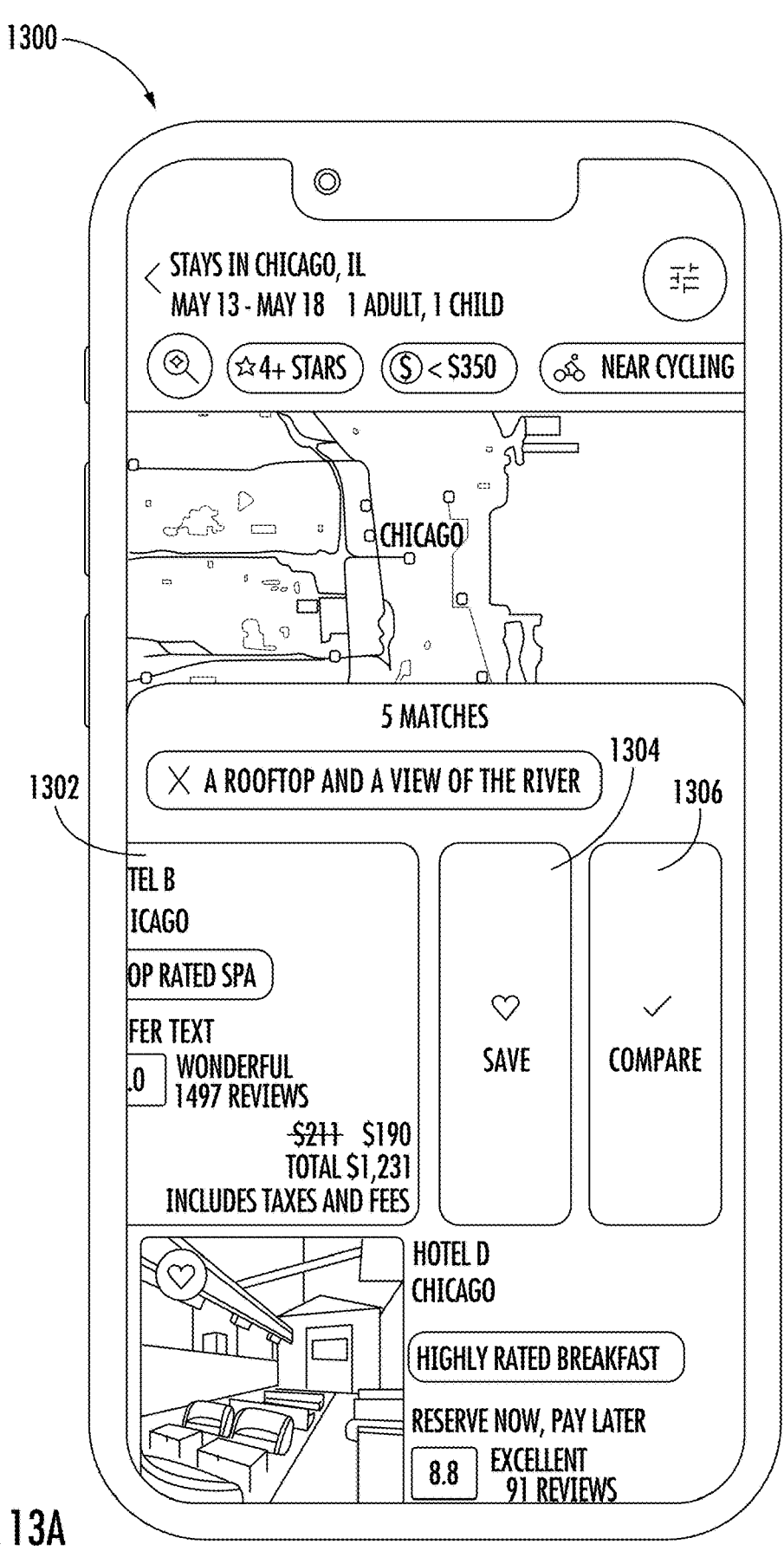
FIGS. 13A-13E depict a first user interface which displays comparing two or more search results from the one or more search results in FIG. 12, according to an example embodiment.
Figure 13B:
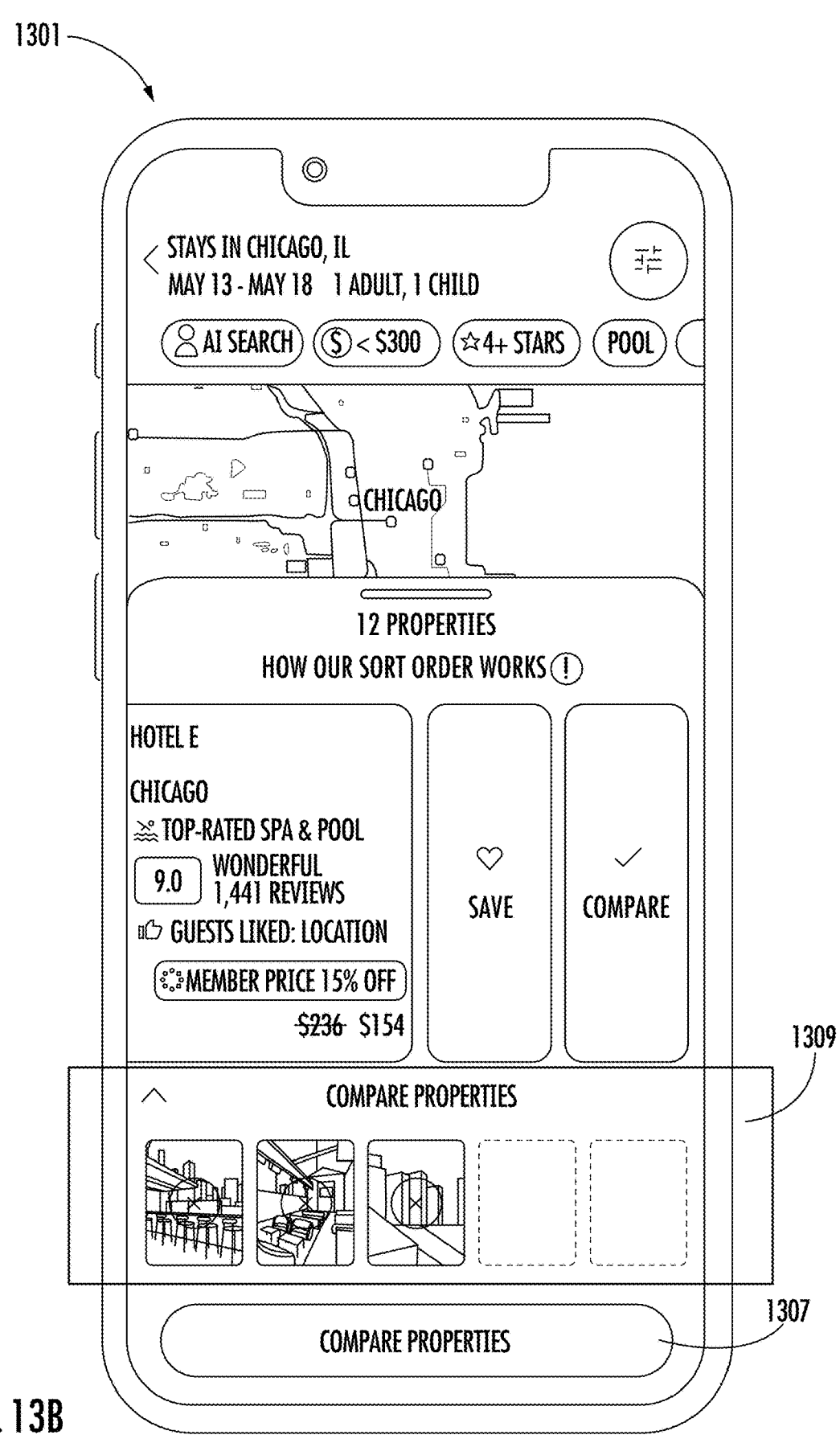
Figure 13C:
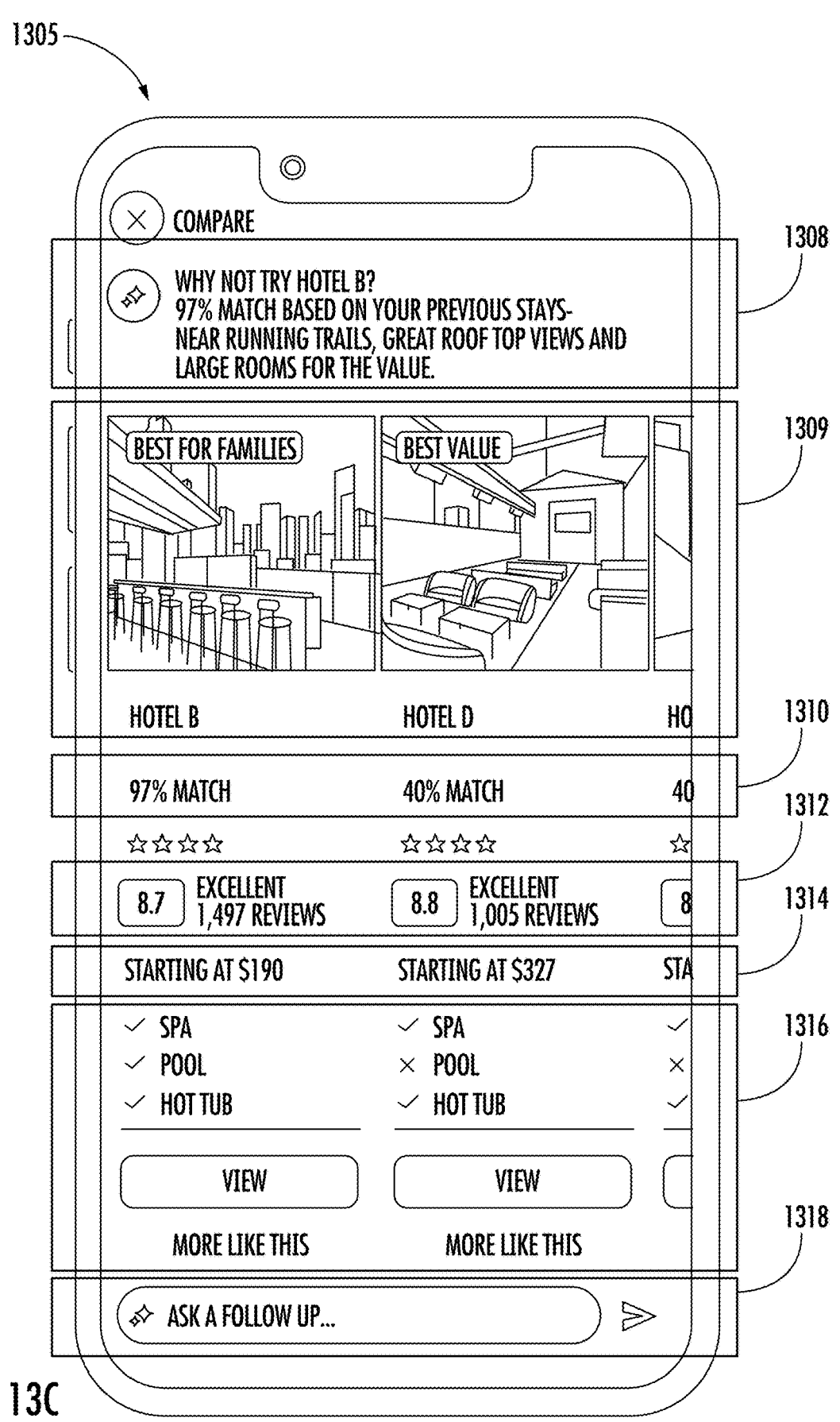
Figure 13D:
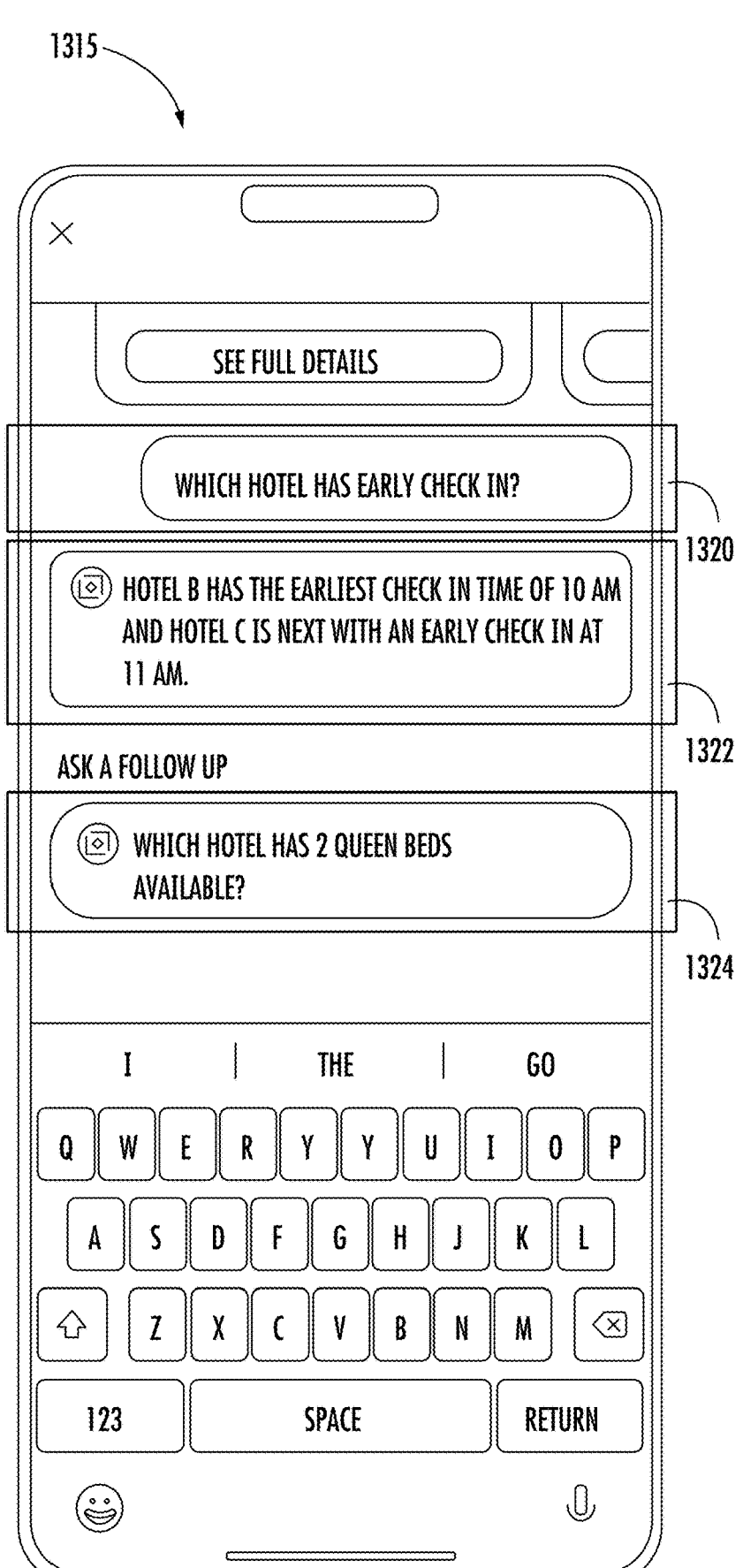
Figure 13E:
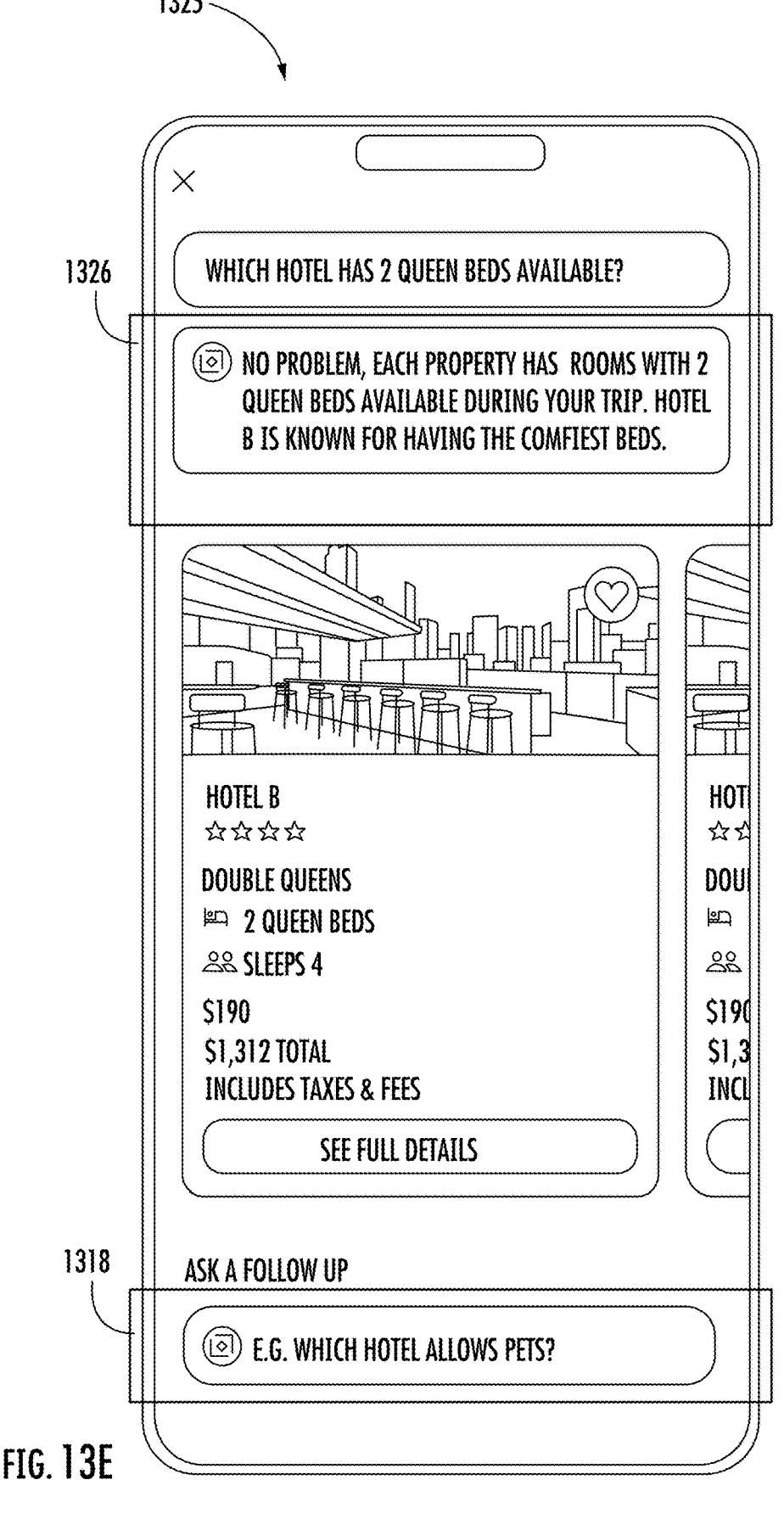

Referring now to FIGS. 13A-13C, the user device 140 (e.g., the client application 145) or the provider computing system 105 may be configured to generate user interfaces 1300, 1301, and 1305 which display comparing two or more search results (e.g., travel items) displayed in search results list 1210 according to a first embodiment. In some embodiments, a user may like to compare multiple travel items (e.g., hotels) which are displayed in the search results list 1210. In such a case, the user may engage with an individual search result 1302 by either swiping the search result 1302 left or right. Swiping the search result 1302 either left or right reveals a save button 1304 and a compare button 1306. In some embodiments, the user can engage (e.g., click, tap, etc.) the save button 1304 to save the search result 1302 to a list of saved hotel recommendations. In some embodiments, the user can engage the compare button 1306 to add the search result to a comparison list, such as comparison list 1309, as shown by user interfaces 1301 and 1305. Once the user has completed adding hotels to the comparison list 1309, the user can click the compare button 1307 which causes the user interface 1305 to be displayed on the user device. In some embodiments, a recommendation match percentage 1310 (e.g., preference match score, etc.) for each recommendation being compared may be displayed on the user interface 1305. For example, the first hotel recommendation (e.g., Hotel B) may have a 97% match rate, while the second hotel recommendation (e.g., Hotel D) may have a 40% match rate. The match rate indicates how well the features of the hotel recommendation match the traveler's preferences according to the traveler's profile. The recommendation match rate may be determined using one or more machine learning models. In some embodiments, a comparison recommendation 1308 may be displayed in the user interface 1305. The comparison recommendation 1308 may indicate the hotel recommendation which the AI search feature 1002 has determined best matches the traveler's preferences according to the traveler profile associated with the traveler (e.g., the hotel recommendation with the highest match percentage 1310). In some embodiments, the comparison recommendation 1308 may be generated using the dynamic traveler profile and may include an explanation as to why the recommendation is being provided based on the dynamically updated preferences within the profile. For example, in the illustrated implementation, Hotel B is being recommended as a 97% match based on information in the dynamic traveler profile indicating that the user prefers accommodations near running trails, with roof top views, and with a large amount of room for the value. In some such embodiments, this summary may provide the user with an immediate, easy understanding of the reasons for the recommendation such that they can quickly conclude whether they agree with the recommendation or prefer an alternative. This may also provide another way through which the user can verify whether the preferences contained within the profile are accurate to the user's actual preferences. In some embodiments, the user interface 1305 includes recommendation ratings 1312 which indicate review ratings associated with each hotel recommendation included in the comparison list 1309. In some embodiments, the user interface 1305 includes prices 1314 which indicate the nightly price for each hotel recommendation included in the comparison list 1309. In some embodiments, the user interface 1305 includes an amenities list 1316 which show which amenities are included for each hotel recommendation in the comparison list 1309. Furthermore, the amenities included in the amenities list 1316 presented via the user interface 1305 may be determined based on the dynamic traveler profile. For example, a first traveler whose profile indicates that the first traveler enjoys hotels with pools may receive an amenities list 1316 in which pools are listed first. Similarly, a second traveler whose profile indicates that the second traveler enjoys hotels with a gym may receive an amenities list 1316 in which the gym is listed first. In this instance, a pool may be included further down the amenities list 1316 presented to the second traveler, or not at all.

In some embodiments, the traveler may search for any follow up questions in search bar 1318. For example, referring now to FIGS. 13D and 13E, the user device 140 (e.g., the client application 145) or the provider computing system 105 may be configured to generate user interfaces 1315 and 1325, respectively, which display the traveler following up with search questions to the AI search feature 1002. As shown in user interface 1315, the traveler inquires about which hotels have early check-in at 1320. The AI search feature 1002 provides an answer to the inquiry at 1322. In some embodiments, a user may ask multiple follow-up questions within the same conversation with the AI search feature 1002. For example, the traveler may also inquire about which hotels have 2 queen beds at 1324. The AI search feature 1002 provides an answer to this additional inquiry at 1326, shown in user interface 1325 of FIG. 13E.

Figure 14A:
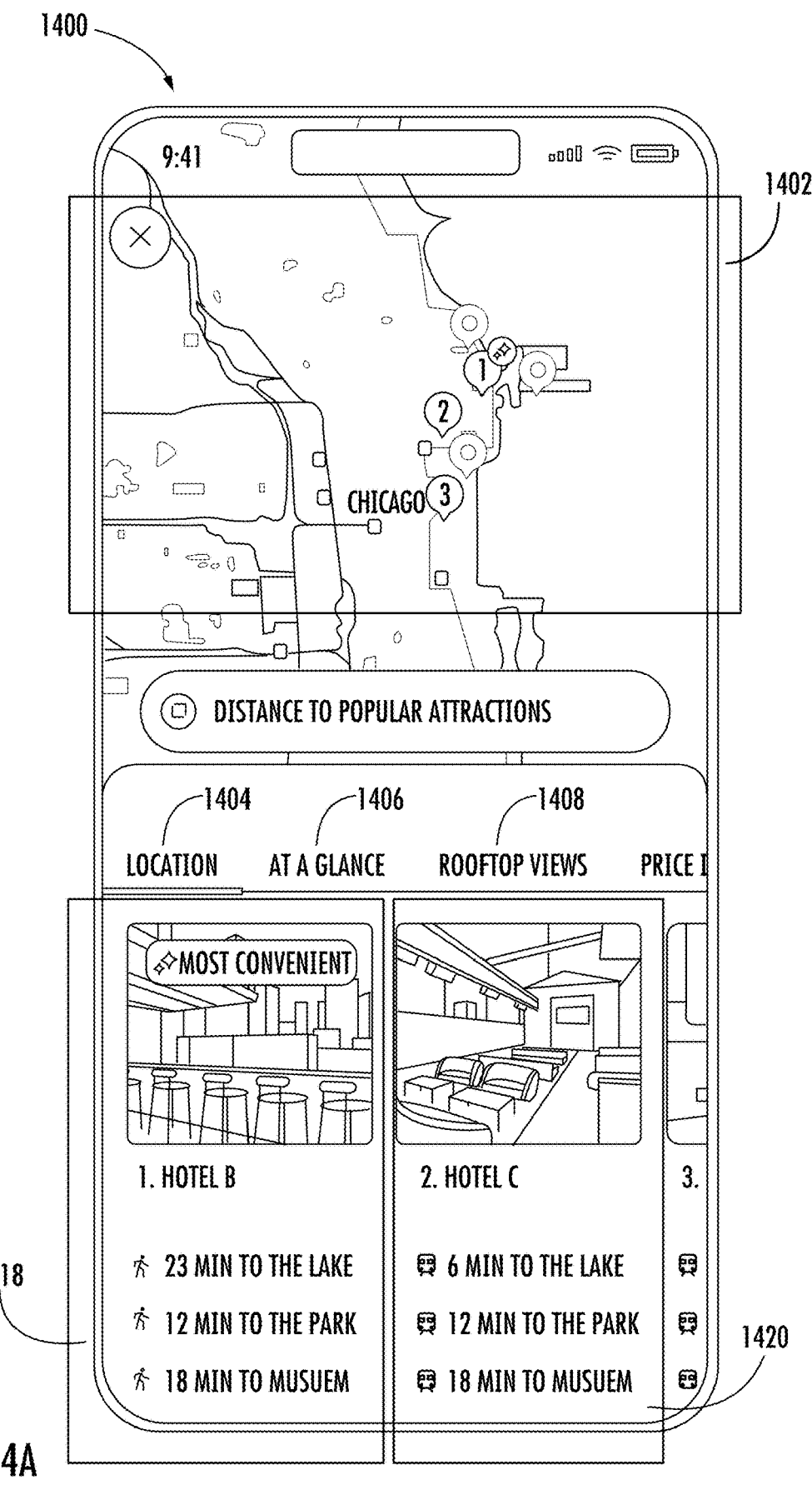
FIGS. 14A-14C depict a first user interface which displays comparing two or more search results from the one or more search results in FIG. 12, according to an example embodiment.
Figure 14B:
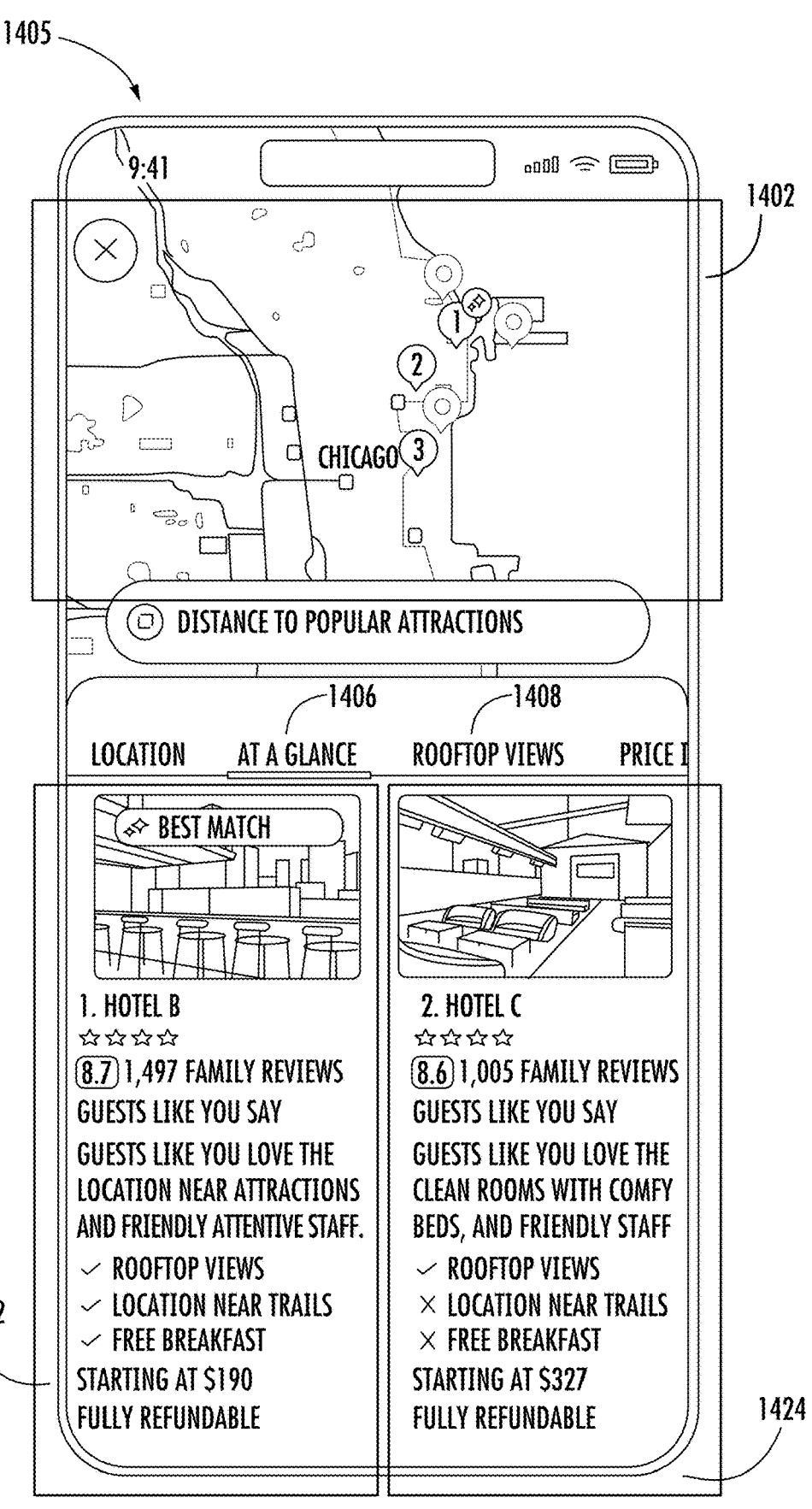
Figure 14C:
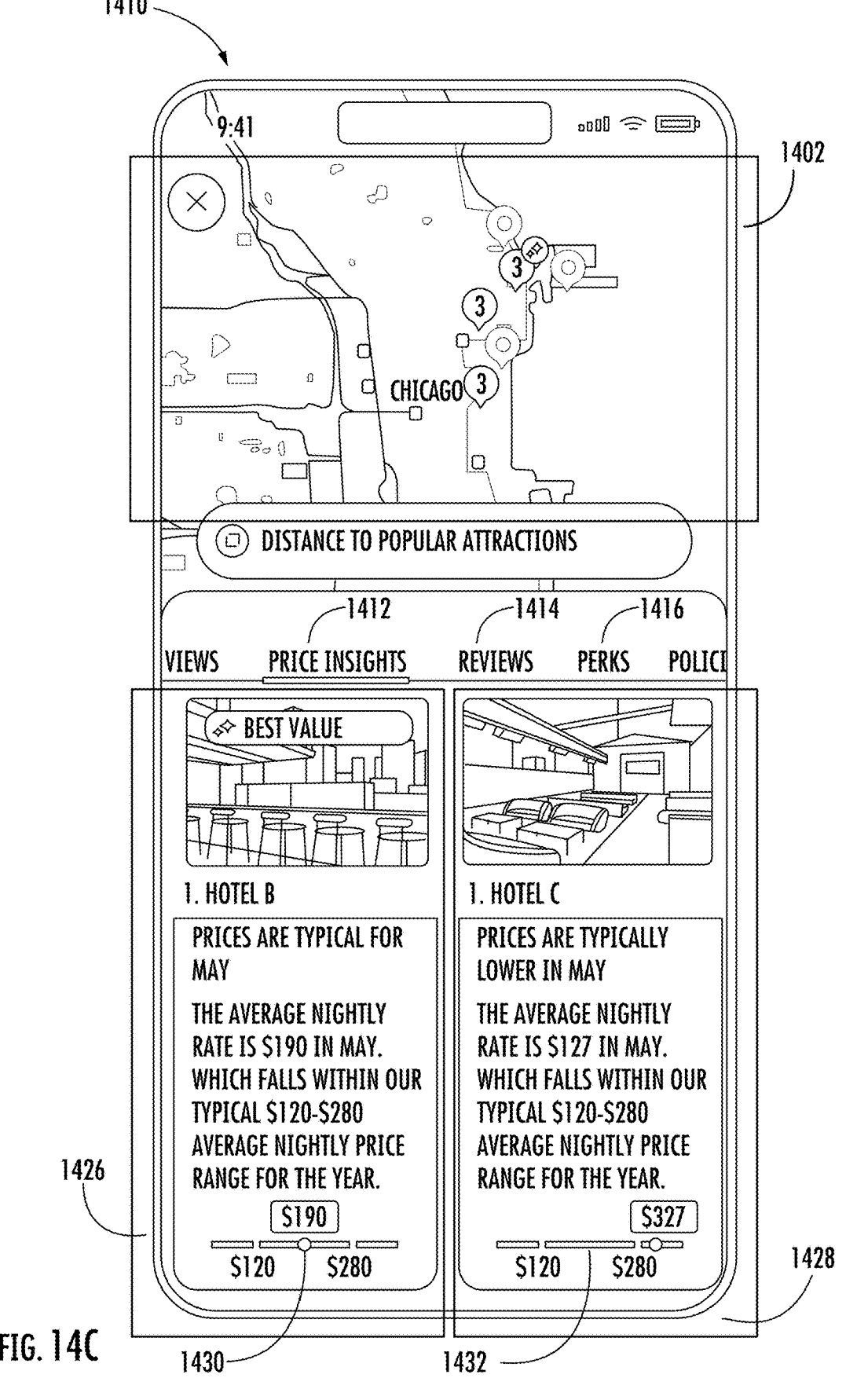

Referring now to FIGS. 14A-14C, the user device 140 (e.g., the client application 145) or the provider computing system 105 may be configured to generate user interfaces 1400, 1405, and 1410 which display a comparison of two or more travel items displayed in search results list 1210 according to a second embodiment. In some embodiments, a user may choose to compare multiple travel items (e.g., hotels) which are displayed in the search results list 1210. In the second embodiment shown in user interfaces 1400, 1405, and 1410, the traveler may compare the different hotel recommendations according to different features of the recommendations. For example, the traveler may wish to compare hotels according to location, price, reviews, perks, or different hotel policies. Furthermore, the different features of the travel items being used in the comparison may be determined based at least in part on one or more characteristics of the dynamic user profile. For example, a first user associated with a dynamic user profile indicating that the first user prioritizes location over price may compare the travel items according to location, while a second user associated with a dynamic user profile indicating that the second user prioritizes price over location may compare the travel items according to price. In some embodiments, as described in greater detail below, generating the comparison may include providing a plurality of categories (e.g., tabs) of types of comparisons based on the dynamic user profile. Furthermore, in some instances, at least one of the categories included in the plurality of categories or an order in which the plurality of categories are presented to the user may be determined using the dynamic user profile. The user interfaces 1400, 1405, and 1410 facilitate such a comparison.

In some embodiments, each of the user interfaces 1400, 1405, and 1410 may include a map 1402 which displays the locations of the different hotel recommendations selected for comparison on a map. As mentioned above, the traveler may wish to compare the different hotel recommendations based on different features of the hotels. In some embodiments, the traveler may wish to compare the selected hotel recommendations according to the location of each of the hotels. In such a case, the traveler may select the location tab 1404. Selecting the location tab 1404 may cause a display of location comparison cards 1418 and 1420. The location comparison cards 1418 and 1420 may each include the name of the hotel and highlight the location of hotel relative to one or more relevant attractions which may be of interest to the user (e.g., tourist attractions, restaurants, etc.).

In some embodiments, the traveler may wish to compare the selected hotel recommendation according to a general summary about each hotel. In such a case, the traveler may select the at a glance tab 1406. Selecting the at a glance tab 1406 may cause a display of summary comparison cards 1422 and 1424. The summary comparison cards 1422 and 1424 may each include the name of the hotel and summary of the hotel features which the AI search features has determined may be of interest to the traveler. For example, the summary comparison cards 1422 and 1424 may include a review rating for the hotel, a summary of written reviews for the hotel, and an indication of whether the hotel includes amenities that the traveler has indicated interest in (e.g., rooftop views, location near trails, free breakfast, etc.). In some embodiments, the summary comparison cards 1422 and 424 may include a price for the hotel recommendation.

In some embodiments, the traveler may wish to compare the selected hotel recommendations according to price insights about each hotel. In such a case, the traveler may select the price insights tab 1412. Selecting the price insights tab 1412 may cause a display of price comparison cards 1426 and 1428. The price comparison cards 1426 and 1428 may each include the name of the hotel and a description of price insights for the hotel. In some embodiments, the price insights may include an indication of how typical the current price listed for each hotel recommendation is for the time period the hotel is being booked for. For example, the current prices for the hotel in the price comparison card 1426 are typical for the time period the hotel is being booked for (May), whereas the current prices for the hotel in the price comparison card 1428 are higher than typical for the time period the hotel is being booked for (May). In some embodiments, the typical prices may be based on an average taken across multiple hotels within a region. In other embodiments, the typical prices may be based on the average prices for the specific hotel over time. In some embodiments, the price comparison cards 1426 and 1428 may each include price graphs 1430 and 1432, respectively, which display where the current prices of the hotel falls within the typical process for the hotel.

In some embodiments, the different tabs (e.g., 1404, 1406, 1408, 1412, 1414, 1416, etc.) presented to the user for generating the different comparison interfaces may be dynamically generated and/or reordered based on the preferences of the user as reflected within the dynamic traveler profile. For example, in some implementations, the particular categories of the tabs may change for different users based on the preferences in their profiles (e.g., a first user whose profile indicates they prefer rooftop patios may include the "rooftop views" tab 1408, whereas a second user whose profile does not indicate a preference for rooftop patios but does indicate a preference for ocean views may not be provided the "rooftop views" tab 1408 option but may instead be provided an "ocean views" tab that provides information about and example views of the ocean views of different compared properties). In some implementations, the order of the tabs may be determined in part based on the user's preferences indicated by the dynamic traveler profile (e.g., such that the "rooftop views" tab 1408 may be the first, or leftmost, tab for a user for whom the profile indicates a strong preference for rooftop views, and may be provided to a second user but further down the list of tabs, or more to the right, and with the leftmost option being the "price insights" tab 1412 where the profile of the second user indicates that price is the most important factor for their preferences).

Figure 15:
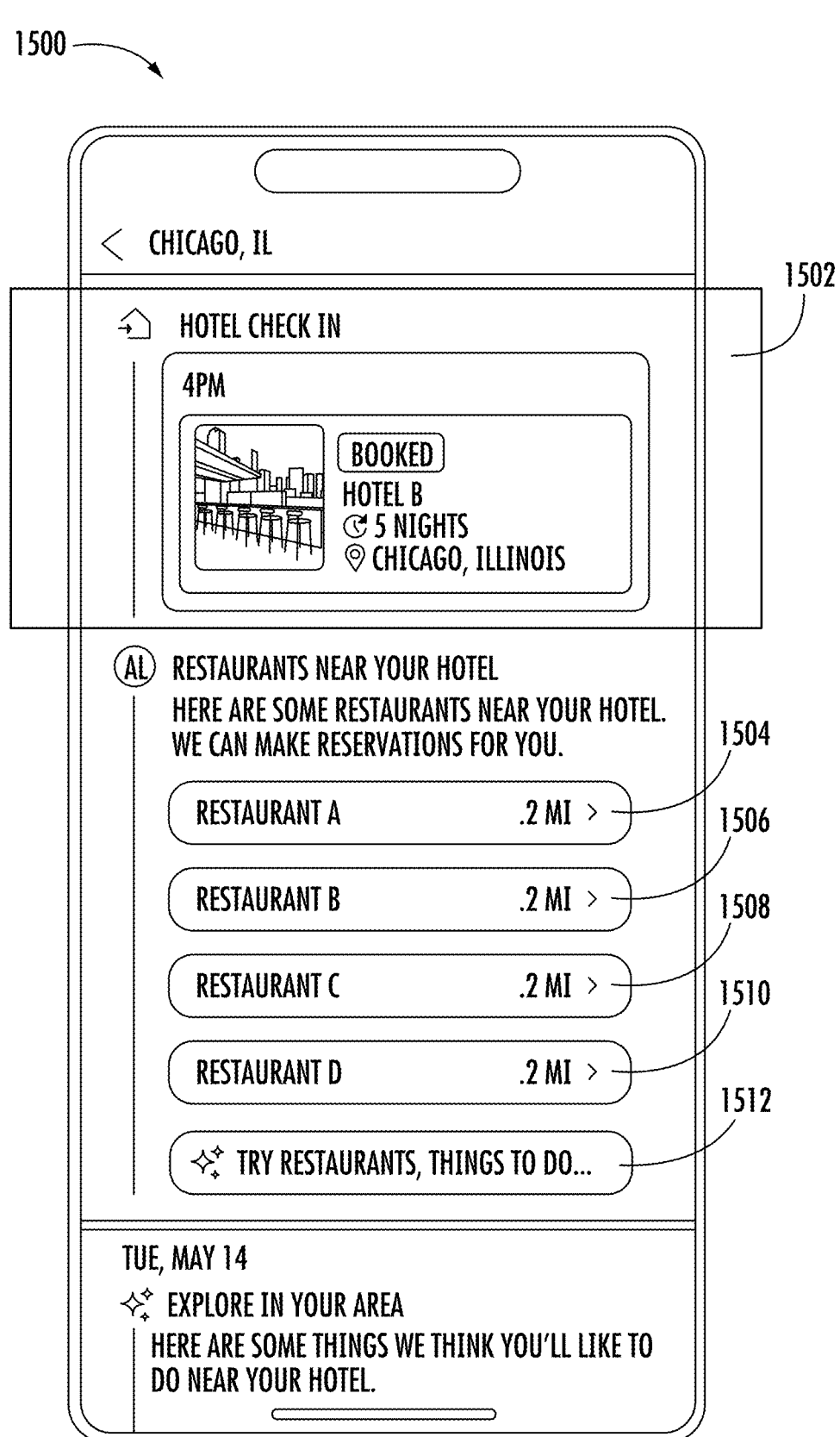
FIG. 15 depicts a user interface which displays one or more additional restaurant recommendations related to search results in FIG. 12, according to an example embodiment.
Figure 16:
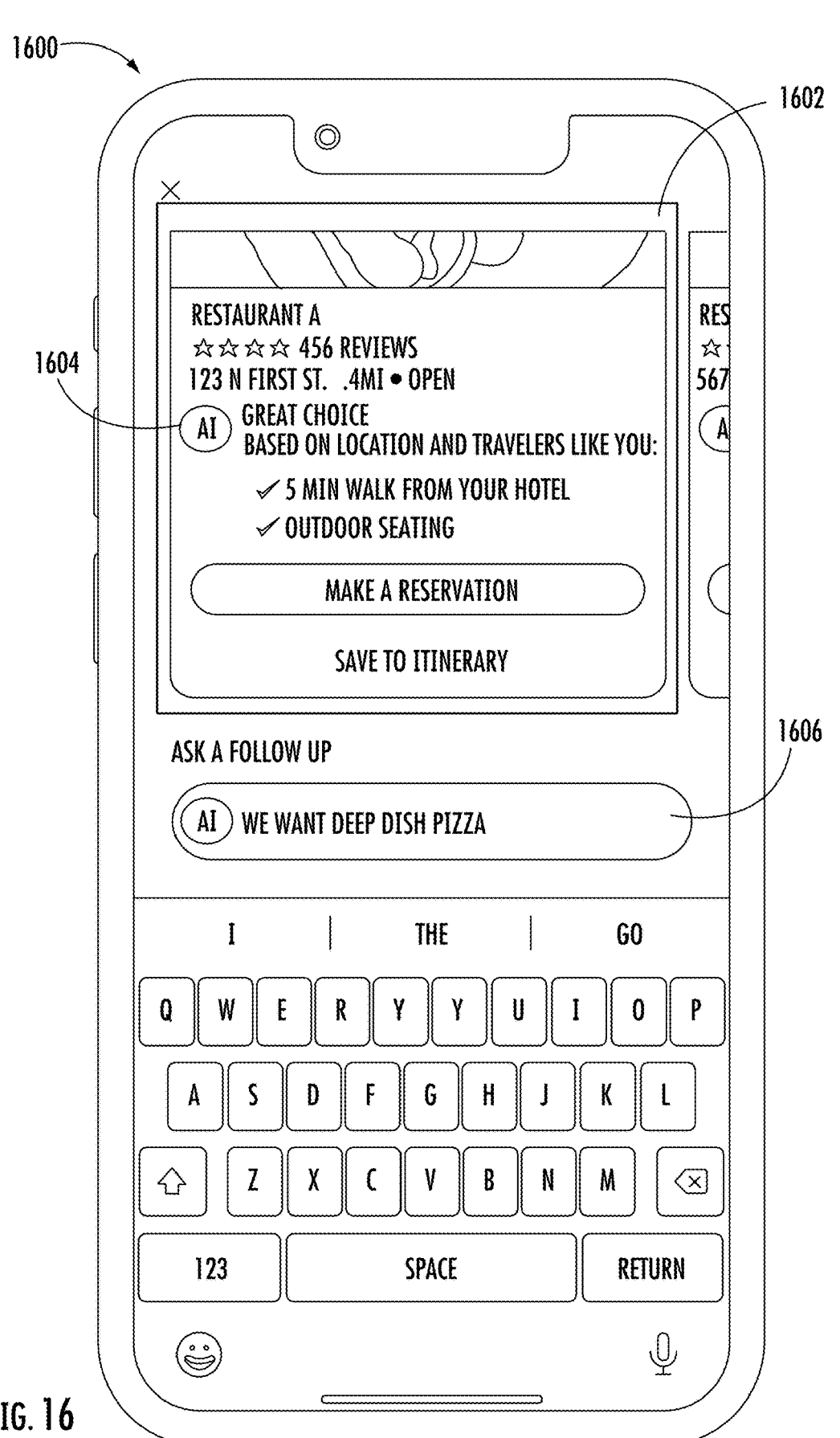
FIG. 16 depicts a user interface which displays information for the additional restaurant recommendations of FIG. 15, according to an example embodiment.

Referring now to FIG. 15, the user device 140 (e.g., the client application 145) or the provider computing system 105 may be configured to generate user interface 1500 which displays one or more additional recommendations which are related to hotel recommendations previously described. For example, a traveler may make the hotel reservation 1502 based on the hotel recommendations described above with respect to FIGS. 10A-14C. In the particular example shown in FIG. 15, the provider computing system 105 may generate one or more related recommendations (e.g., restaurant recommendations 1504, 1506, 1508, and 1510) which are related (e.g., near, associated with, etc.) to the hotel (e.g., Hotel B) in the hotel reservation 1502. In some embodiments, the restaurant recommendations 1504, 1506, 1508, and 1510 may be generated using one or more artificial intelligence/machine learning models. Particularly, the artificial intelligence/machine learning models use a traveler profile associated with the traveler to generate customized restaurant recommendations for the traveler that are near the hotel reservation 1502. In some embodiments, the user can click on any of the restaurant recommendations 1504, 1506, 1508, and 1510 to navigate to more details about the restaurants, as shown in FIG. 16. In some embodiments, the traveler may enter a follow up query regarding the restaurant recommendations (e.g., question, comment, etc.) in a follow up search bar 1512.

In some embodiments, any type of recommendation may be generated and displayed on user interface 1500 and/or as a part of any other types of recommendations, such as various other recommendations discussed herein. For example, shopping recommendations, tourist attraction recommendations, product recommendations, entertainment recommendations, transportation recommendations, and/or any other travel recommendations may be generated and displayed. In some embodiments, the recommendations may be based on one or more machine learning or other AI models comparing images and/or videos (and/or images extracted from videos) from one or more content sources (e.g., social media, web searching, etc.) with images and/or videos stored in the dynamic traveler profile (e.g., such that the images themselves are stored as part of the profile and/or links or other references to the images or the information presented therein are stored as part of the profile) which the traveler has expressed interest in. For example, a user may engage with (e.g., like, save, share, etc.) certain images related to travel which indicate their preferences for travel. The dynamic traveler profile may be updated to include the images with which the user has engaged. Specifically, one or more preferences may be determined based on the images with which the user engages. For example, if a user likes multiple pictures of certain types of food, certain types of architecture, certain types of hotels, or certain types of activities, the dynamic traveler profile circuit 500 may determine that the user has preferences for those particular things. Based on these images stored in the dynamic traveler profile, the one or more machine learning models may crawl one or more content sources (e.g., websites, travel reviews, social media, etc.) to generate recommendations for the traveler based on finding images which match up with the traveler's preferences stored in the dynamic traveler profile. In some embodiments, the machine learning models may use traditional image classification techniques to evaluate the images to determine preferences for the dynamic traveler profile and recommendations based on the dynamic traveler profile. In some embodiments, the machine learning models may utilize multi-modal embeddings to classify the images and determine similarities between the images found through the one or more content sources and the preferences/images stored in the dynamic traveler profile.

In some embodiments, the travel recommendations may be generated based on correlating preferences in the dynamic traveler profile with images associated with the travel recommendations by using artificial intelligence and/or machine learning models. As described above, the preferences in the dynamic traveler profile may be generated based on user interactions with images on social media, websites, travel planning sites, etc. The artificial intelligence and/or machine learning models may then determine a similarity or correlation between the travel preferences stored in the dynamic traveler profile with images associated in the travel recommendations. In some embodiments, the similarity or correlation may be determined using image classification techniques such as those described above. The images associated with the travel recommendation may be retrieved, in some embodiments, using web scraping techniques which are configured to find images which describe the travel recommendations (e.g., images associated with the restaurants, images associated with hotels, images associated with tourist attractions, etc.).

In some embodiments, the travel recommendations may be generated based on correlating preferences in the dynamic traveler profile with a combination of multiple types of content, such as in an "ensemble" fashion. For example, in some embodiments, preferences in the dynamic traveler profile may be correlated with or otherwise compared to aspects of two or more of images associated with travel items, reviews associated with the travel items, ratings associated with the travel items, other information such as item descriptions, or any other data relating to the items to generate recommendations, such as by using artificial intelligence or machine learning models. For example, in some implementations, a recommendation for a particular restaurant may be provided responsive to a model determining, from the dynamic traveler profile, that the traveler has a preference for restaurants that have at least a four star rating on a restaurant review platform, Italian cuisine, and thick cut bone in pork chops and determining that the particular restaurant has a 4.5 star rating on the restaurant review platform based on the restaurant review platform star data, that the restaurant is an Italian restaurant based on information about the restaurant from a website or the restaurant review platform, and that the restaurant offers a thick cut bone in pork chop based on image processing/comparison of images associated with the restaurant.

Figure 17:
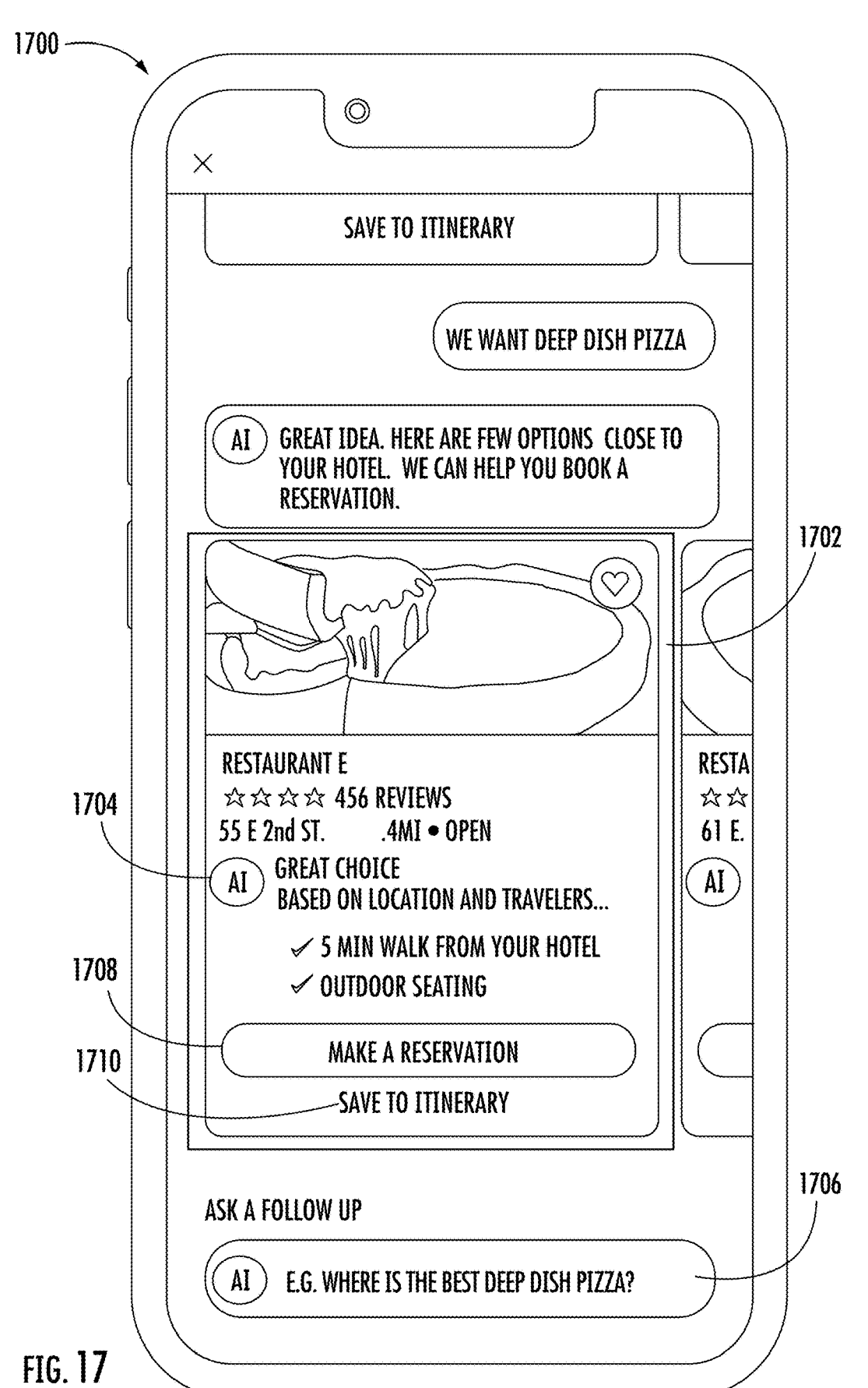
FIG. 17 depicts a user interface which displays updated additional restaurant recommendations related to search results in FIG. 12, according to an example embodiment.

In FIG. 16, the user device 140 (e.g., the client application 145) or the provider computing system 105 may be configured to generate user interface 1600 which displays additional information about the restaurants 1504, 1506, 1508, and 1510. Particularly, the user interface 1600 may include one or more restaurant description cards 1602 which include information about the restaurants 1504, 1506, 1508, and 1510 including, but not limited to, restaurant name, reviews and ratings, address, hours of operation, and a summary 1604 of why the system/AI search model is recommending that particular restaurant for that particular traveler. The AI search feature 1002 generates customized restaurant recommendations for the traveler based on the traveler profile using artificial intelligence/machine learning models. In some embodiments, the traveler may enter a follow up query (e.g., question, comment, etc.) in a follow up search bar 1606. For example, if the user would like to tailor the restaurant recommendations further, they can type a query (e.g., "we want deep dish pizza"), into the follow up search bar 1606. Based on the traveler entered query, the AI search feature 1002 can generate new or updated customized restaurant recommendations. The new or updated restaurant recommendations may be displayed to the traveler through graphical user interface 1700, as shown in FIG. 17. The graphical user interface 1700 is similar to the graphical user inter 1600 in that it includes one or more restaurant description cards 1702 similar to the restaurant description cards 1602, a summary 1704 similar to the summary 1604, and a follow up search bar 1706 similar to the follow up search bar 1606. In some embodiments, the traveler may click on button 1708 to make a reservation at the restaurant shown in the restaurant description card 1702. In some embodiments, the traveler may click on button 1710 to add the restaurant shown in the restaurant description card 1702 to a trip planning itinerary.

Figure 18:
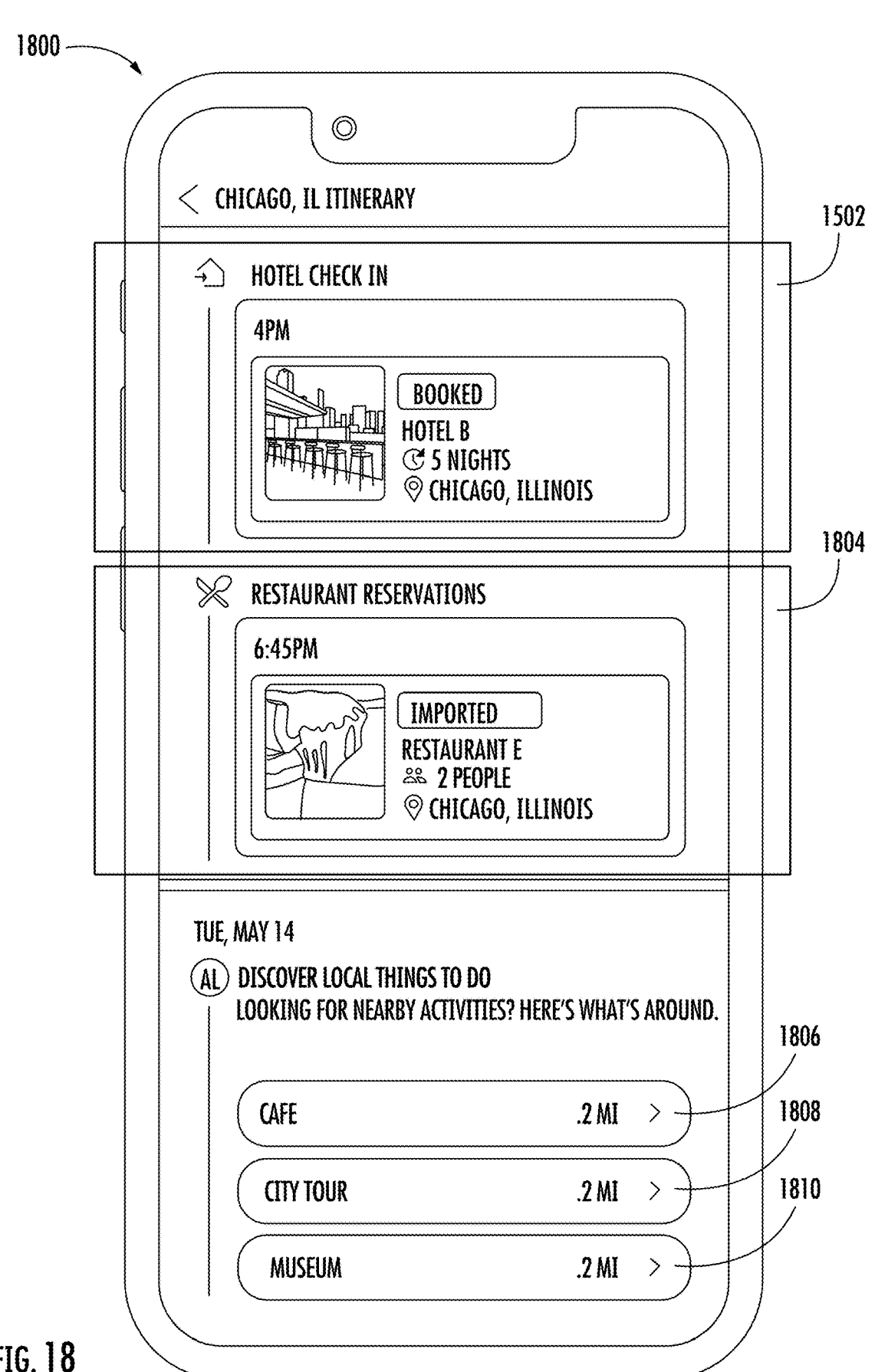
FIG. 18 depicts a user interface which displays one or more additional attraction recommendations related to search results in FIG. 12, according to an example embodiment.

Referring now to FIG. 18, the user device 140 (e.g., the client application 145) or the provider computing system 105 may be configured to generate user interface 1800 which displays one or more additional recommendations which are related to hotel recommendations and/or restaurant recommendations previously described. For example, a traveler may make the hotel reservation 1502 based on the hotel recommendations described above with respect to FIGS. 10A-14C and the restaurant reservation 1804 based on the restaurant recommendations described above with respect to FIGS. 15-17. In the particular example shown in FIG. 18, the provider computing system 105 may generate one or more related recommendations (e.g., tourist attraction recommendations, etc.) which are related (e.g., near, associated with, etc.) to the hotel in the hotel reservation 1502 and the restaurant in the restaurant reservation 1804. In some embodiments, the tourist attraction recommendations 1806, 1808, and 1810 may be generated using one or more artificial intelligence/machine learning models. Particularly, the artificial intelligence/machine learning models use a traveler profile associated with the traveler to generate customized tourist attraction recommendations for the traveler that are near the hotel reservation 1502 and restaurant recommendation 1804. In some embodiments, the user can click on any of the tourist attraction recommendations 1806, 1808, and 1810 to navigate to more details about the tourist attractions.

Figure 19:
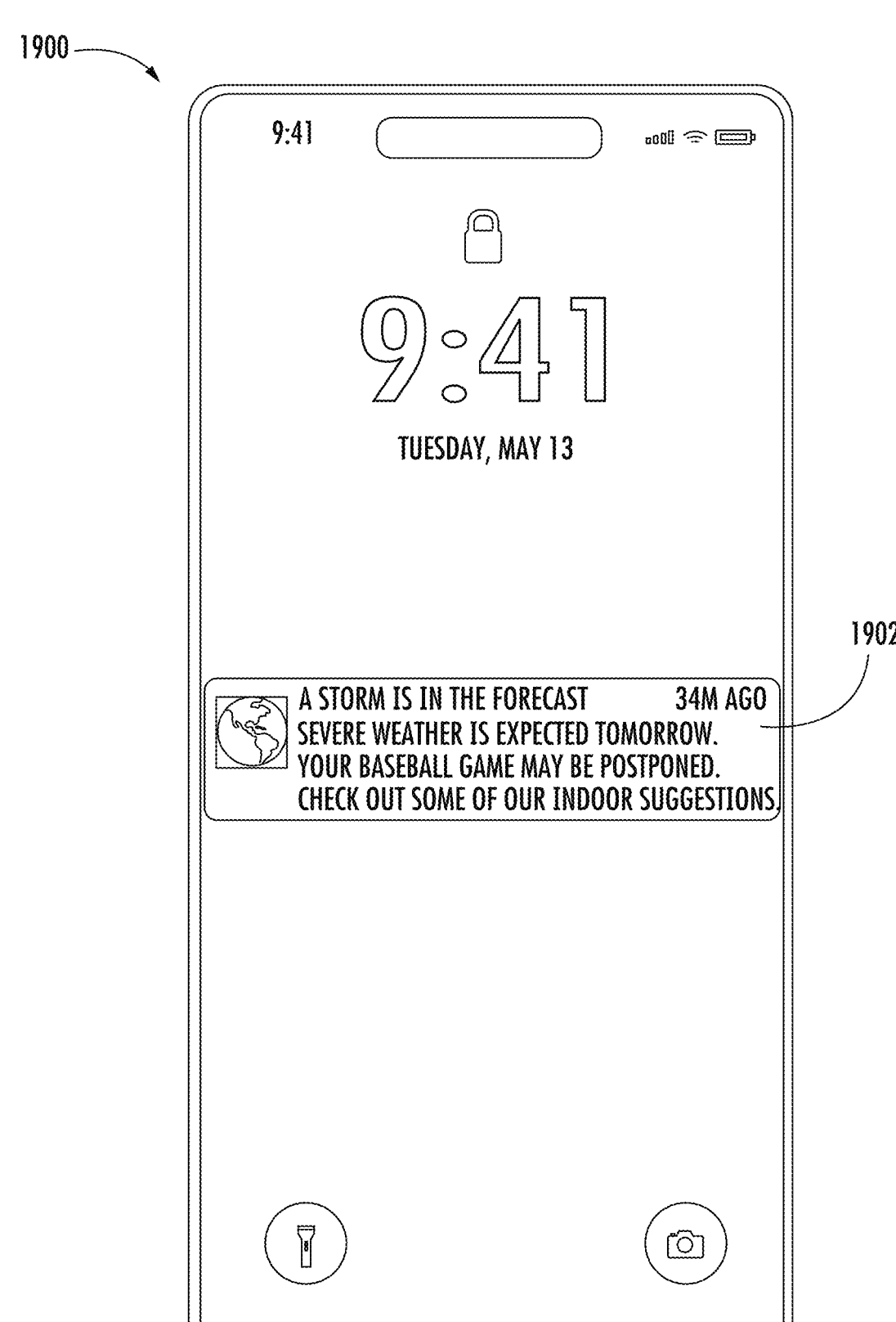
FIG. 19 depicts a user interface of a push notification to prompt a user to update their trip plan, according to an example embodiment.

Referring to FIG. 19, the user device 140 (e.g., the client application 145) or the provider computing system 105 may be configured to generate a notification 1902 to be displayed on a user interface 1900 on the user device 140. For example, after a user has indicated an interest in planning a trip or is currently on the planned trip, the user device 140 may prompt the user with updated real-time information about their current or upcoming trip and may prompt the user to update their trip plan based on the updated real-time information. In some embodiments, the updated real-time information may be related real-time weather forecasts, traffic information, flight information, or news information which may impact the trip. The user interface 1900 includes the notification 1902. The notification 1902 refers to an invitation to the traveler to update their trip plan based on the real-time information. In the example shown in user interface 1900, the traveler may specifically be prompted to update their trip plan which includes an outdoor sporting event which is likely to be postponed due to severe weather. However, this example is not meant to be limiting. The user interface 1900 may prompt the user to update their trip plan based on any other real-time information. In some embodiments, the notification 1902 may indicate that the provider computing system 105 has generated one or more recommendations (e.g., hotel recommendations, restaurant recommendations, activity recommendations, etc.) for updating the trip plan. In some embodiments, the recommendations may be based on the dynamic traveler profile 500 which is automatically updated in real time based on various interactions/touchpoints received from the user as described above. More details regarding the recommendations are provided with regards to FIGS. 20A-21. Upon receiving the notification 1902, the traveler may choose to begin updating the trip plan (e.g., by clicking on the notification 1902) or may choose to ignore the notification 1902. If the traveler clicks the notification 1902, the user interface shown in FIG. 20A may be displayed.

Figure 20A:
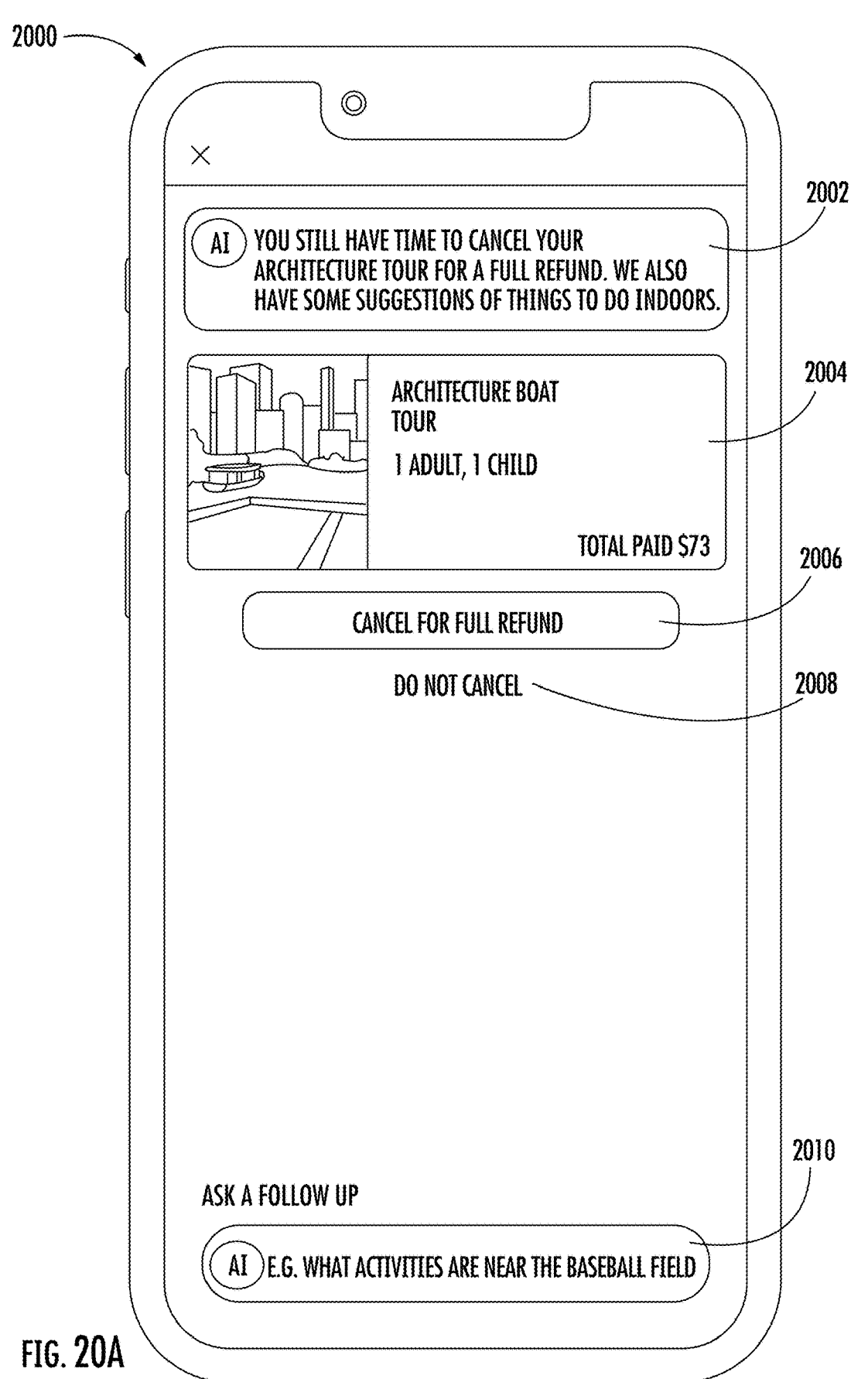
FIGS. 20A-20C depicts user interfaces which allow the user to update their trip plan, according to an example embodiment.
Figure 20B:
Figure 20C:
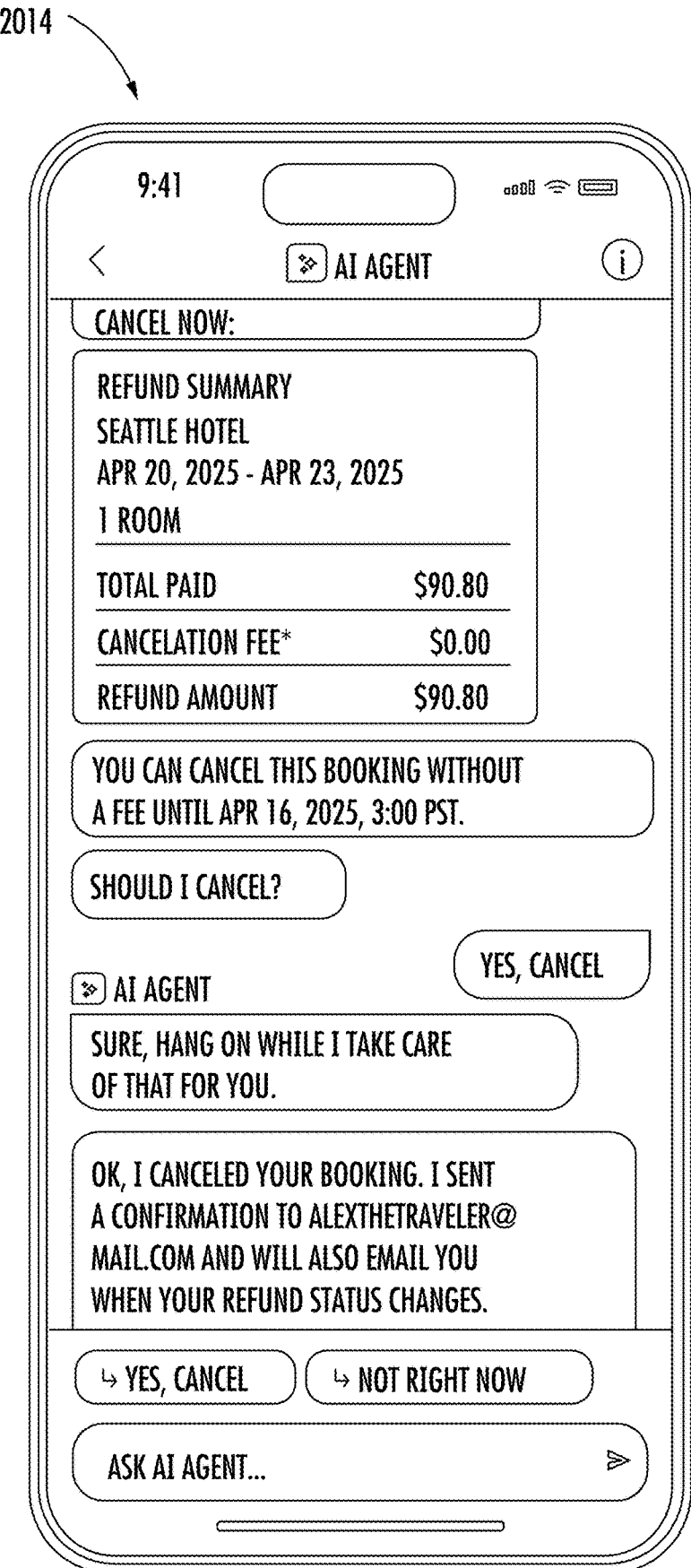

Referring to FIGS. 20A-20C, the user device 140 (e.g., the client application 145) or the provider computing system 105 may be configured to display the user interfaces 2000,

2012, and 2014, respectively, on the user device 140. Particularly, the user interface 2000 shown in FIG. 20A allows the user to update their trip plan according to the real-time information received in the notification 1902. In some embodiments, the user interface 2000 may include a suggested action 2002. The suggested action 2002 describes an action the AI search feature believes the user should take to update their trip plan in response to receiving the real-time information. In the example shown in user interface 2000, the suggested action 2002 suggests that the traveler cancel an architecture tour due to severe weather. The suggested action 2002 may also indicate that the AI search feature 1002 has determined some activity suggestions to replace the activity which will be affected by severe weather. The user interface 2000 displays one or more tickets 2004 for the activity which will be affected by the severe weather. The user interface 2000 provides the traveler with the opportunity to cancel the ticket 2004 for a full refund by clicking cancel button 2006. The user interface 2000 also provides the traveler with the option to not cancel the tickets by clicking button 2008. In some embodiments, the user interface 2000 includes a follow up search bar 2010. For example, if the user would like to request more information about real-time information or request that the updated recommendations be customized in a specific way, the user can type a query (e.g., "we want to visit a museum," "we want to take an art class," "we want to take a cooking class," etc.), into the follow up search bar 2010. Based on the traveler entered query, the AI search feature 1002 can provide replacement suggestions. FIGS. 20B and 20C depict the user interfaces 2012 and 2014, respectively, configured to facilitate cancelation of a booking. As shown, the user may cancel a booking via a chat session between the AI search feature 1002 and the user. In this way, the user can either cancel a booking with a chat response or by clicking on the cancel button 2006, as shown in FIG. 20B.

Figure 21:
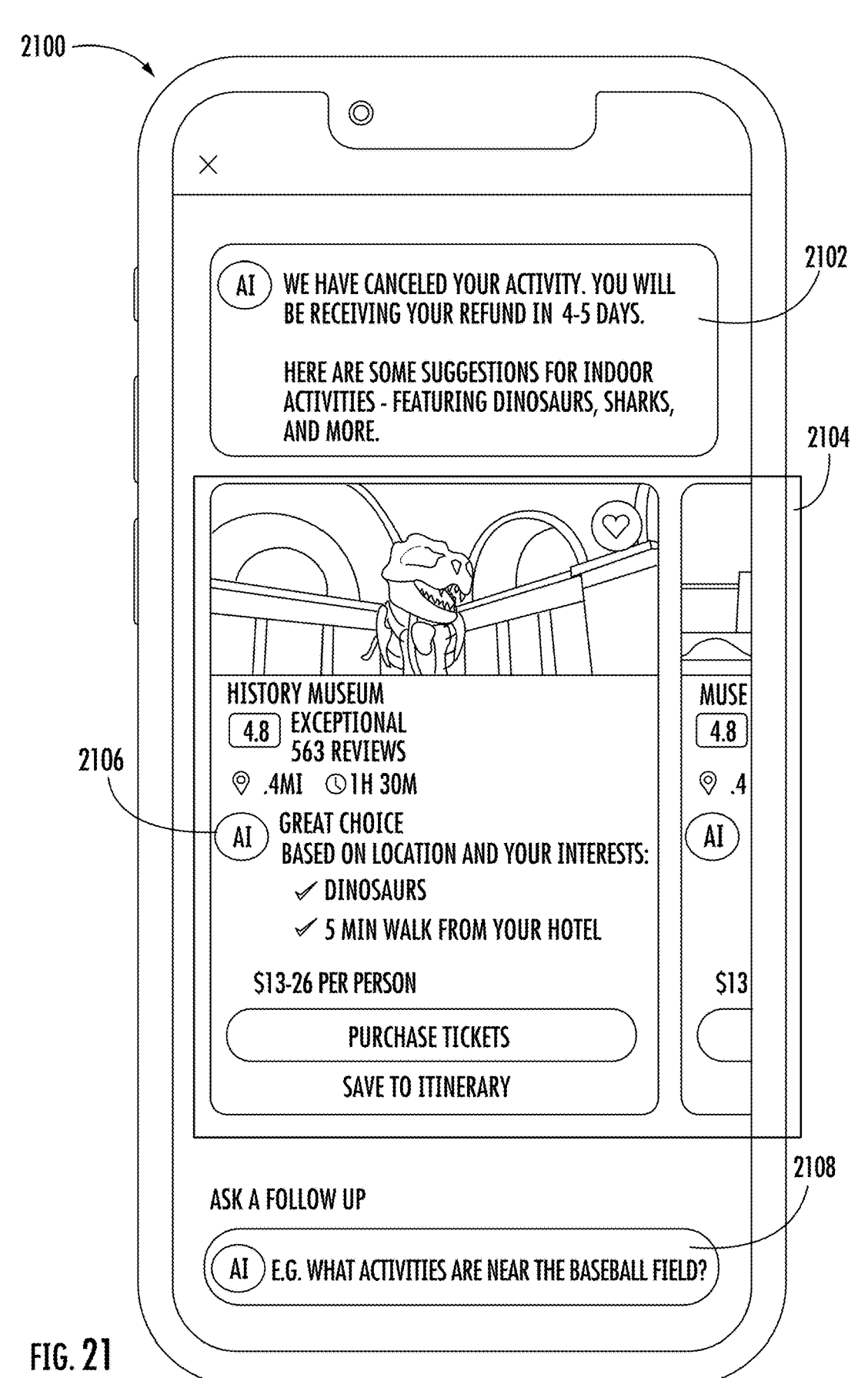
FIG. 21 depicts a second user interface which allows the user to update their trip plan, according to an example embodiment.

In response to the traveler clicking the cancel button 2006 via the user interface 2000 shown in FIG. 20A, the user interface 2100 shown in FIG. 21 may be displayed. In FIG. 21, the user device 140 (e.g., the client application 145) or the provider computing system 105 may be configured to display the user interface 2100 on the user device 140. The user interface 2100 includes a confirmation message 2102. In some embodiments, the confirmation message 2102 confirms that that the ticket 2004 has been canceled. Further, the confirmation message 2102 may indicate that the AI search feature 1002 has found some indoor activities that won't be affected by the severe weather. The indoor activities may be based on the traveler profile associated with the traveler and may be determined using one or more artificial intelligence or machine learning models. The suggested indoor activities are displayed via suggested activity cards 2104. The suggested activity cards 2104 include information including, but not limited to, suggested activity name, reviews and ratings, address, hours of operation, and a summary 2106 of why the AI search is recommending that particular activity/attraction for that particular traveler. The AI search feature 1002 generates customized activity/attraction recommendations for the traveler based on the traveler profile using artificial intelligence/machine learning models. In some embodiments, the traveler may enter a follow up query (e.g., question, comment, etc.) in a follow up search bar 2108. For example, if the user would like to tailor the suggested activity recommendations further, they can type a query (e.g., "we want to visit a museum), into the follow up search bar 2108. Based on the traveler entered query, the AI search feature 1002 can generate new or updated customized activity/attraction recommendations.

Figure 22A:
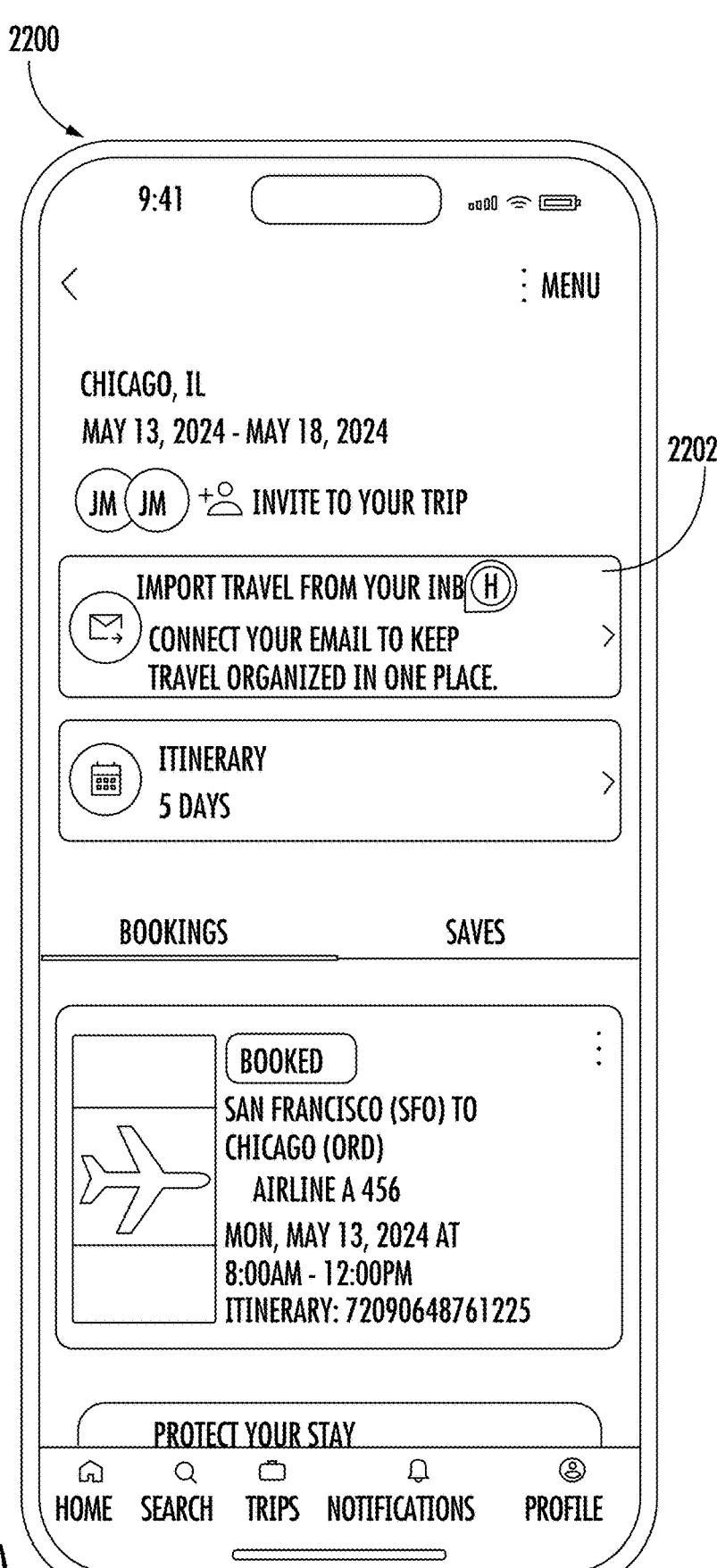
FIGS. 22A-22B depict trip consolidation across multiple different platforms, according to an example embodiment.
Figure 22B:
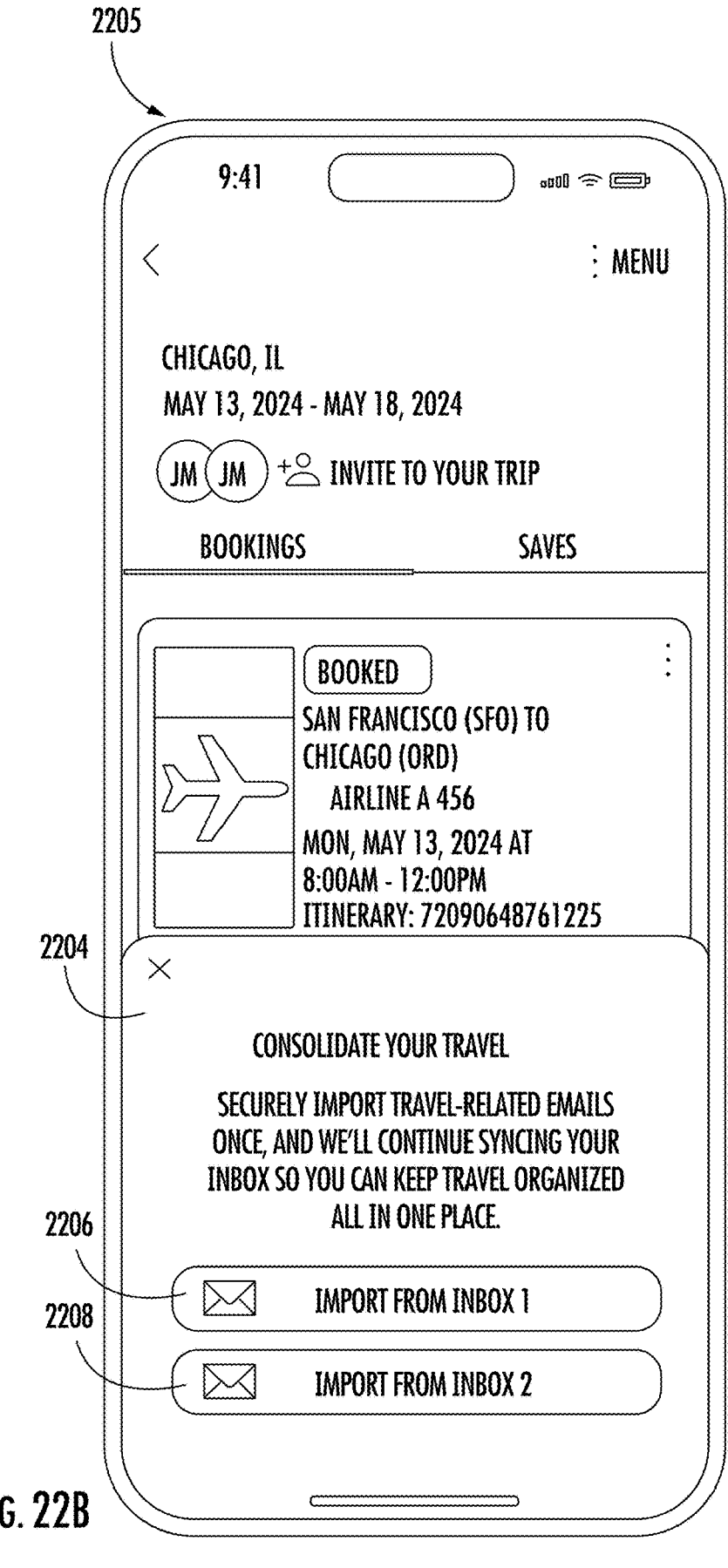

Referring now to FIGS. 22A-22B, the user device 140 (e.g., the client application 145) or the provider computing system 105 may be configured to generate user interfaces 2200 and 2205 which displays trip consolidation across multiple different platforms. Trip information can be stored or sent to a variety of different platforms. For example, if a traveler books a plane ticket, the airline ticket reservation may be sent to the traveler's email. Similarly, activity reservations, restaurant reservations, and any other type of travel reservations may be sent to the travel's email. In some cases, the user may wish to combine all the travel reservations they have over a variety of different platforms (e.g., email, etc.) into one trip planning platform. The user interface 2200 allows the traveler to consolidate their travel information by importing travel information from their email inbox by clicking an import button 2202 as shown in user interface 2200. Clicking the import button 2202 causes consolidation pop-up 2204 to be displayed on user interface 2205. The consolidation pop-up 2204 includes import button 2206 (e.g., for importing travel information from a first inbox) and 2208 (e.g., for importing travel information from a second inbox). The user may click the import buttons 2206 and 2208 to import travel information from different platforms into the one trip planning platform.

Figure 23:
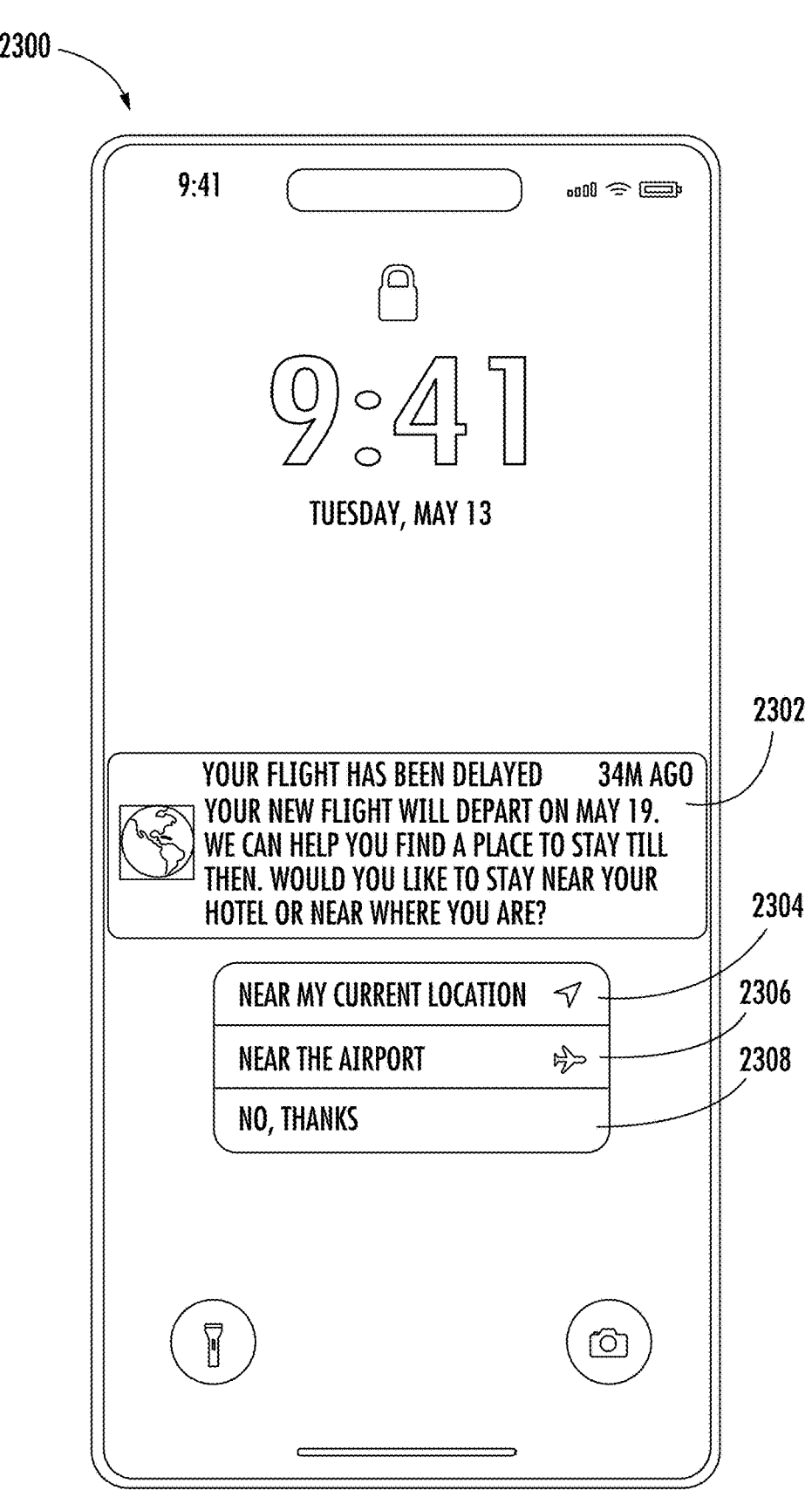
FIG. 23 depicts a user interface of a push notification to prompt a user to update their trip plan, according to an example embodiment.

Referring now to FIG. 23, the user device 140 (e.g., the client application 145) or the provider computing system 105 may be configured to generate a notification 2302 to be displayed on a user interface 2300 on the user device 140. For example, after a user has indicated an interest in planning a trip or is currently on the planned trip, the user device 140 may prompt the user with updated real-time information about their transportation plans. In some embodiments, the updated real-time information may be related flight information, rental car information, ferry information, or any other transportation information. The user interface 2300 includes the notification 2302. The notification 2302 refers to an invitation to the traveler to update their trip plan based on the real-time transportation information. In the example shown in user interface 2300, the traveler may specifically be prompted to update their trip plan to book a hotel because their flight has been delayed and they won't be leaving until the next day. Clicking on the notification 2302 may cause pop-up buttons 2304, 2306, and 2308 to be displayed on the user interface 2300. In some embodiments, upon receiving the notification 2302, the traveler may choose to request hotel suggestions near their current location by clicking pop-up button 2304. In some embodiments, upon receiving the notification 2302, the traveler may choose to request hotel suggests near the airport they will be departing from. In some embodiments, upon receiving the notification 2302, the user may choose to ignore the notification 2302 by clicking pop-up button 2308.

Figure 24:
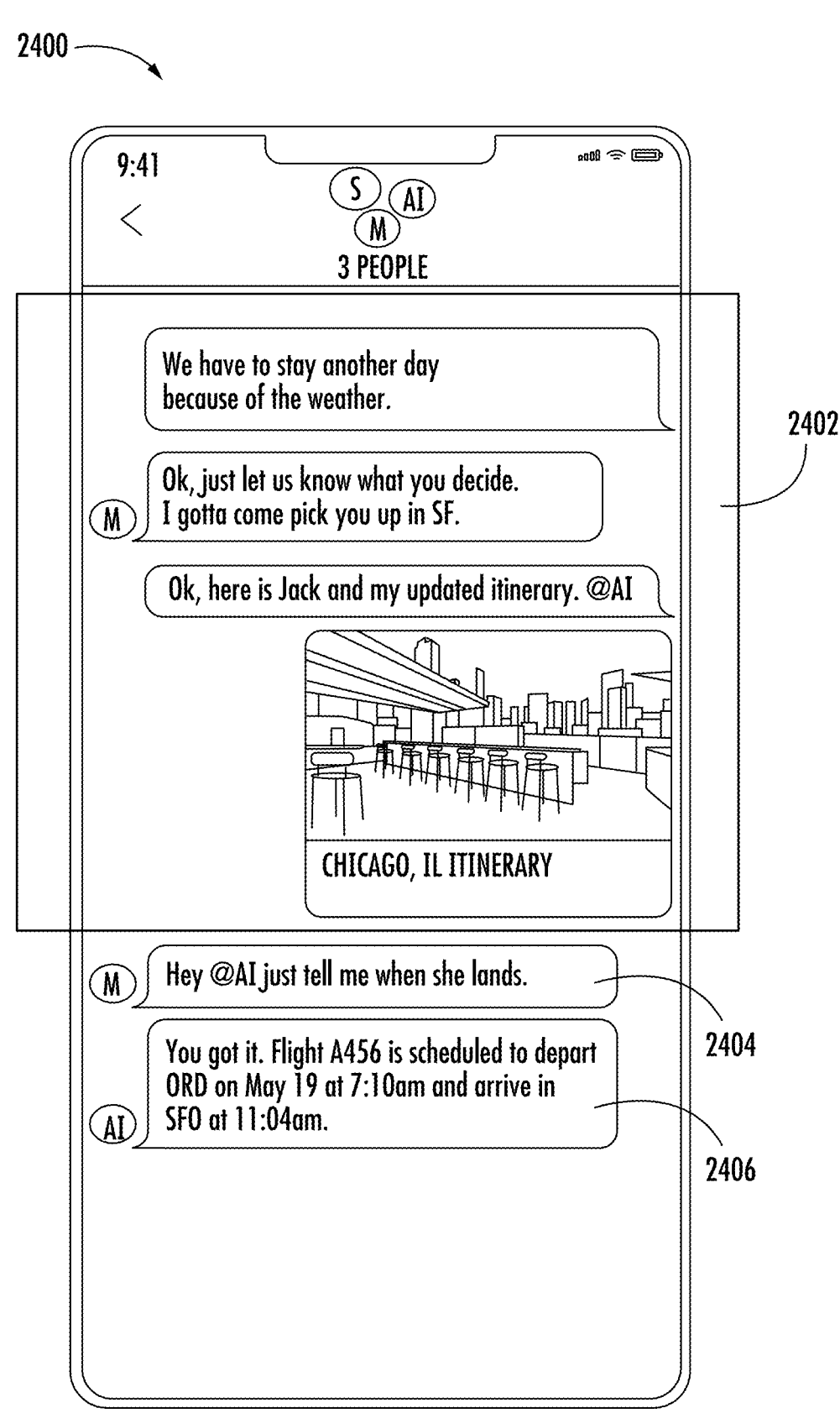
FIG. 24 depicts a user interface of a chat interface for a chat session in which users discuss a trip, according to an example embodiment.

In some embodiments, a traveler may wish to inform another person about their delayed flight based on the notification 2302. In such a case, the user may participate in a group chat conversation with the other person and the digital AI agent 602 as shown in FIG. 24. In FIG. 24, the user device 140 (e.g., the client application 145) or the provider computing system 105 may be configured to generate a user interface 2400 to be displayed on the user device 140. The user interface 2400 is a depiction of a chat interface configured to allow multiple users to initiate a chat session in which the users collaborate to plan a trip. A user may bring the digital AI agent 602 into the chat conversation by adding the digital agent contact information 604 to the group chat session (e.g., by texting the number included in the contact information 604) or tagging the digital AI agent 602 in the conversation (e.g., "@digitalAIagent," "@AI," etc.). The conversation platform may include the traveler who initiates the chat session, one or more other users associated with the trip the traveler is planning, and the digital AI agent 602 (e.g., chat bot, a virtual agent, a virtual assistant, a conversational assistant, etc.), as described above. The digital AI agent 602 may allow the provider computing system 105 to automatically interact with the users in the group chat session to discuss the trip. For example, in the messages 2402, the traveler informs the other user that their flight is delayed and requests that the digital AI agent 602 provide their updated itinerary with the members of the group chat. In some embodiments, the users in the group chat may request that the digital AI agent 602 provide specific information about the updated trip itinerary (e.g., "tell me when the traveler lands" as shown in message 2404, "tell me the flight information for the new flight," etc.). In some embodiments, the digital AI agent 602 may respond to the message 2404 with message 2406 including the updated flight information, as shown in FIG. 24.

Figure 25:
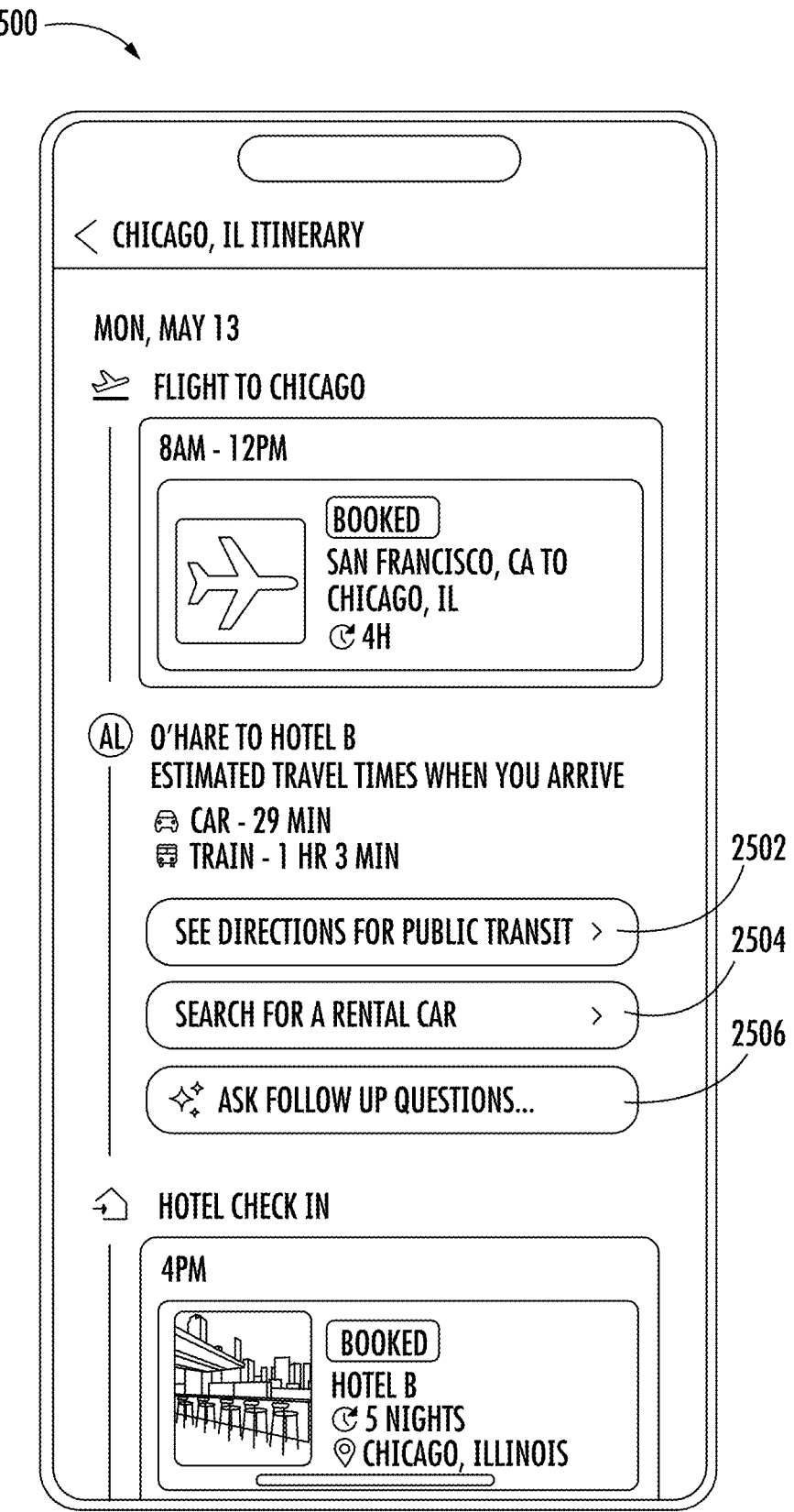
FIG. 25 displays transportation recommendations provided within the traveler's itinerary, according to an example embodiment.

Referring now to FIG. 25, the user device 140 (e.g., the client application 145) or the provider computing system 105 may be configured to generate user interface 2500 which displays transportation recommendations provided within the traveler's itinerary. In some embodiments, the transportation recommendations may provide transportation options between the various different locations included in the trip itinerary (e.g., airport, hotel, restaurant, activity, attraction, etc.). For example, in the user interface 2500, transportation recommendations 2502 and 2504 between the airport and the hotel are provided. In some embodiments, the transportation recommendations 2502 and 2504 may be generated using one or more artificial intelligence/machine learning models. Particularly, the artificial intelligence/machine learning models use a traveler profile associated with the traveler to generate customized transportation recommendations for the traveler. In some embodiments, the traveler may enter a follow up query regarding the transportation recommendations (e.g., question, comment, etc.) in a follow up search bar 2506.

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

The implementations described herein have been described with reference to drawings. The drawings illustrate certain details of specific implementations that implement the systems, methods, and programs described herein. Describing the implementations with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include or otherwise utilize hardware structured to execute the functions described herein. In some implementations, each respective "circuit" may be or include instructions stored on machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. In a non-limiting example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor, which, in some example implementations, may execute instructions stored, or otherwise accessed, via different areas of memory). Alternatively or additionally, the one or more processors may be structured to perform or otherwise execute certain operations independent of one or more co-processors.

In other example implementations, two or more processors may be coupled via a bus to enable independent, parallel, pipelined, or multi-threaded instruction execution. Each processor may be implemented as one or more processors, ASICs, FPGAs, GPUs, TPUs, digital signal processors (DSPs), or other suitable electronic data processing components structured to execute instructions provided by memory. The one or more processors may take the form of a single core processor, multi-core processor (e.g., a dual core processor, triple core processor, or quad core processor), microprocessor, etc. In some implementations, the one or more processors may be external to the apparatus, in a non-limiting example, the one or more processors may be a remote processor (e.g., a cloud-based processor). Alternatively or additionally, the one or more processors may be internal or local to the apparatus. In this regard, a given circuit or components thereof may be disposed locally (e.g., as part of a local server, a local computing system) or remotely (e.g., as part of a remote server such as a cloud-based server). To that end, a "circuit" as described herein may include components that are distributed across one or more locations.

An exemplary system for implementing the overall system or portions of the implementations might include general-purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard disks, optical disks, etc. In other implementations, the volatile storage media may take the form of RAM, TRAM, ZRAM, etc. Combinations of the above are also included within the scope of machine-readable media. In this regard, machine-executable instructions comprise, in a non-limiting example, instructions and data, which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. In a non-limiting example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementations," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions, and implementation of the implementations without departing from the scope of the present disclosure as expressed in the appended claims.

What is claimed is:

1. A method for searching for travel items, comprising:
   obtaining, by one or more processing circuits, interaction data indicating a set of interactions of a first user across a plurality of platforms, wherein the set of interactions of the first user across the plurality of platforms includes active interactions and passive interactions, wherein the active interactions include the first user directly providing feedback regarding one or more of a plurality of travel preferences, and wherein the passive interactions include interactions with the first user through which the first user does not expressly provide feedback regarding the plurality of travel preferences but from which one or more of the plurality of travel preferences can be inferred;
   generating, by the one or more processing circuits, a dynamic user profile indicating the plurality of travel preferences for the first user using the interaction data;
   generating, by the one or more processing circuits, a plurality of search suggestions for the first user based on the dynamic user profile, the plurality of search suggestions specific to the first user and generated based at least in part on one or more characteristics of the dynamic user profile, the plurality of search suggestions comprising at least one of a plurality of suggested search queries or a plurality of suggested filters, generating the plurality of search suggestions comprising:
      determining, by the one or more processing circuits, that a portion of the interaction data is related to an upcoming trip for the first user;
      processing, by the one or more processing circuits, the portion of the interaction data to determine one or more travel preferences related to the upcoming trip; and
      generating, by the one or more processing circuits, the plurality of search suggestions for the first user based on the dynamic user profile and relating to the upcoming trip;
   receiving, by the one or more processing circuits, a selection from the first user of a first search suggestion of the plurality of search suggestions;

identifying, by the one or more processing circuits, a first plurality of travel items using the selected first search suggestion; and providing, by the one or more processing circuits to the first user, the identified first plurality of travel items.

2. The method of claim 1, wherein the interaction data is first interaction data indicating a first set of interactions of the first user, the method further comprising:

obtaining, by the one or more processing circuits, second interaction data indicating a second set of interactions of the first user across the plurality of platforms;

processing, by the one or more processing circuits, the second interaction data to infer changes to the plurality of travel preferences indicated by the dynamic user profile; and updating, by the one or more processing circuits, the dynamic user profile to include the changes to the plurality of travel preferences.

3. The method of claim 2, wherein the plurality of search suggestions are a first plurality of search suggestions provided to the first user at a first time, the method further comprising:

generating and providing, by the one or more processing circuits, a second plurality of search suggestions to the first user at a second time, wherein the second time is later than the first time, and wherein the second plurality of search suggestions are based on the updated dynamic user profile including the changes.

4. The method of claim 3, wherein the second plurality of search suggestions differ from the first plurality of search suggestions based on at least one of a content of the second plurality of search suggestions or an order in which the second plurality of search suggestions are provided to the first user.

5. The method of claim 3, the method further comprising:

receiving, by the one or more processing circuits, a selection from the first user of a second search suggestion of the second plurality of search suggestions;

identifying, by the one or more processing circuits, a second plurality of travel items using the selected second search suggestion; and providing, by the one or more processing circuits to the first user, the identified second plurality of travel items.

6. The method of claim 1, wherein the plurality of search suggestions are generated using an artificial intelligence (AI) model.

7. The method of claim 6, wherein the AI model is a generative AI model, and wherein generating the plurality of search suggestions using the generative AI model comprises:

extracting, by the one or more processing circuits, the one or more characteristics from the dynamic user profile; and generating, by the one or more processing circuits, a prompt for the generative AI model including the one or more characteristics.

8. The method of claim 1, wherein the plurality of search suggestions comprise the plurality of suggested search queries, and wherein the plurality of suggested search queries are automatically provided to the first user in response to the first user selecting a search interface.

9. The method of claim 1, wherein the plurality of search suggestions comprise the plurality of suggested filters, and wherein the plurality of suggested filters are provided to the first user via an interface on which a first set of travel items are displayed, and wherein selection of at least one of the plurality of suggested filters causes the one or more processing circuits to filter the displayed first set of travel items based on the selection of the at least one of the plurality of suggested filters.

10. The method of claim 1, wherein the dynamic user profile is a first dynamic user profile, and wherein the plurality of search suggestions are a first plurality of search suggestions, the method further comprising:

receiving, by the one or more processing circuits, a second dynamic user profile indicating a plurality of travel preferences for a second user; and generating, by the one or more processing circuits, a second plurality of search suggestions for the second user based on the second dynamic user profile, wherein the second plurality of search suggestions differ from the first plurality of search suggestions based on the second dynamic user profile being different than the first dynamic user profile.

11. The method of claim 10, wherein the second plurality of search suggestions differ from the first plurality of search suggestions based on at least one of a content of the second plurality of search suggestions or an order in which the second plurality of search suggestions are provided to the second user.

12. The method of claim 1, wherein the first plurality of travel items include at least one of an accommodation recommendation, a restaurant recommendation, an activity recommendation, or an event recommendation.

13. The method of claim 1, further comprising:

receiving, by the one or more processing circuits, feedback from the first user regarding one or more of the plurality of travel preferences; and updating, by the one or more processing circuits, the dynamic user profile based on the feedback from the first user.

14. A computing system, comprising:

at least one processing circuit comprising at least one processor and at least one memory, the at least one memory storing instructions thereon that, when executed by the at least one processor, cause the at least one processor to:

obtain first interaction data indicating a set of first interactions of a first user across a plurality of platforms at a first time, wherein the set of first interactions of the first user across the plurality of platforms includes active interactions and passive interactions, wherein the active interactions include the first user directly providing feedback regarding one or more of a plurality of travel preferences, and wherein the passive interactions include interactions with the first user through which the first user does not expressly provide feedback regarding the plurality of travel preferences but from which one or more of the plurality of travel preferences can be inferred;

generate a dynamic user profile indicating the plurality of travel preferences for the first user using the first interaction data;

generate a first plurality of search suggestions for the first user based on the dynamic user profile, the first plurality of search suggestions specific to the first user and generated based at least in part on one or more characteristics of the dynamic user profile, the first plurality of search suggestions comprising at least one of a plurality of suggested search queries or a plurality of suggested filters, generating the first plurality of search suggestions comprising:

determining that a portion of the first interaction data is related to an upcoming trip for the first user;

processing the portion of the first interaction data to determine one or more travel preferences related to the upcoming trip; and generating the first plurality of search suggestions for the first user based on the dynamic user profile and relating to the upcoming trip;

receive a selection from the first user of a first search suggestion of the first plurality of search suggestions;

identify a first plurality of travel items using the selected first search suggestion; and provide, to the first user, the identified first plurality of travel items.

15. The computing system of claim 14, wherein the instructions, when executed by the at least one processor, further cause the at least one processor to:

obtain second interaction data indicating a set of second interactions of the first user across the plurality of platforms at a second time;

update the dynamic user profile to include changes to the plurality of travel preferences indicated by the second interaction data; and generate a second plurality of search suggestions for the first user based on the updated dynamic user profile, wherein the second plurality of search suggestions differ from the first plurality of search suggestions based on at least one of a content of the second plurality of search suggestions or an order in which the second plurality of search suggestions are provided to the first user.

16. The computing system of claim 14, wherein the dynamic user profile is a first dynamic user profile, and wherein the instructions, when executed by the at least one processor, further cause the at least one processor to:

receive a second dynamic user profile indicating a plurality of travel preferences for a second user; and generate a second plurality of search suggestions for the second user based on the second dynamic user profile, wherein the second plurality of search suggestions differ from the first plurality of search suggestions based on the second dynamic user profile being different than the first dynamic user profile.

17. A non-transitory computer-readable medium having computer-executable instructions embodied therein that, when executed by at least one processor of a computing system, cause the computing system to perform operations comprising:

obtaining interaction data indicating a set of interactions of a first user across a plurality of platforms, wherein the set of interactions of the first user across the plurality of platforms includes active interactions and passive interactions, wherein the active interactions include the first user directly providing feedback regarding one or more of a plurality of travel preferences, and wherein the passive interactions include interactions with the first user through which the first user does not expressly provide feedback regarding the plurality of travel preferences but from which one or more of the plurality of travel preferences can be inferred;

generating a dynamic user profile indicating a plurality of travel preferences for the first user using the interaction data;

generating a plurality of search suggestions for the first user based on the dynamic user profile, the plurality of search suggestions specific to the first user and generated based at least in part on one or more characteristics of the dynamic user profile, the plurality of search suggestions comprising at least one of a plurality of suggested search queries or a plurality of suggested filters, generating the plurality of search suggestions comprising:

determining that a portion of the interaction data is related to an upcoming trip for the first user;

processing the portion of the interaction data to determine one or more travel preferences related to the upcoming trip; and generating the plurality of search suggestions for the first user based on the dynamic user profile and relating to the upcoming trip;

receiving a selection from the first user of a first search suggestion of the plurality of search suggestions;

identifying a first plurality of travel items using the selected first search suggestion; and providing, to the first user, the identified first plurality of travel items.

18. The non-transitory computer-readable medium of claim 17, wherein the interaction data is first interaction data indicating a first set of interactions of the first user, wherein the plurality of search suggestions are a first plurality of search suggestions provided to the first user at a first time, and wherein the operations further comprise:

obtaining second interaction data indicating a second set of interactions of the first user across the plurality of platforms;

processing the second interaction data to infer changes to the plurality of travel preferences indicated by the dynamic user profile;

updating the dynamic user profile to include the changes to the plurality of travel preferences; and providing a second plurality of search suggestions to the first user at a second time, wherein the second time is later than the first time, and wherein the second plurality of search suggestions are based on the updated dynamic user profile including the changes.

* * * * *